US009923678B2

(12) United States Patent
Abeysekera et al.

(10) Patent No.: US 9,923,678 B2
(45) Date of Patent: Mar. 20, 2018

(54) WIRELESS COMMUNICATION SYSTEM, AND WIRELESS COMMUNICATION METHOD

(71) Applicant: NIPPON TELEGRAPH AND TELEPHONE CORPORATION, Tokyo (JP)

(72) Inventors: Hirantha Sithira Abeysekera, Yokosuka (JP); Yasuhiko Inoue, Yokosuka (JP); Yusuke Asai, Yokosuka (JP); Shoko Shinohara, Yokosuka (JP); Takeo Ichikawa, Yokosuka (JP); Masato Mizoguchi, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 337 days.

(21) Appl. No.: 14/414,837

(22) PCT Filed: Jul. 19, 2013

(86) PCT No.: PCT/JP2013/069647
§ 371 (c)(1),
(2) Date: Jan. 14, 2015

(87) PCT Pub. No.: WO2014/014084
PCT Pub. Date: Jan. 23, 2014

(65) Prior Publication Data
US 2015/0188675 A1  Jul. 2, 2015

(30) Foreign Application Priority Data

Jul. 19, 2012 (JP) ................. 2012-160845
Jul. 19, 2012 (JP) ................. 2012-160872
Jul. 19, 2012 (JP) ................. 2012-160873

(51) Int. Cl.
*H04W 4/00* (2009.01)
*H04L 5/00* (2006.01)
(Continued)

(52) U.S. Cl.
CPC .......... *H04L 5/0007* (2013.01); *H04J 11/005* (2013.01); *H04J 11/0063* (2013.01);
(Continued)

(58) Field of Classification Search
CPC ... H04L 5/0007; H04L 5/0098; H04L 5/0044; H04L 5/0023; H04J 11/005; H04J 11/0063; H04W 72/04; H04W 84/12; H04B 7/0413
See application file for complete search history.

(56) References Cited

U.S. PATENT DOCUMENTS

2009/0310692 A1* 12/2009 Kafle .................... H04L 5/0007
375/260
2011/0222486 A1* 9/2011 Hart ....................... H04L 5/001
370/329

FOREIGN PATENT DOCUMENTS

CN        1697352 A      11/2005
JP     2011-188382 A     9/2011

OTHER PUBLICATIONS

Wang, Chao-Chun, et al., "MU with Frequency Domain Multiplexing," IEEE 802.11-10/0787r1, IEEE mentor, Jul. 12, 2010.
(Continued)

*Primary Examiner* — Afshawn Towfighi
(74) *Attorney, Agent, or Firm* — Harness, Dickey & Pierce, P.L.C.

(57) ABSTRACT

There is provided a wireless communication system which can improve throughputs in wireless communication by effectively using frequency resources. In the wireless communication system including a plurality of wireless communication stations which may operate as wireless communication terminals or wireless base stations, the wireless communication station includes an access right acquisition means of acquiring an access right upon generating transmitting data; a determination means of determining whether
(Continued)

or not different data destined to a plurality of wireless communication stations can be transmitted on different channels according to OFDMA; and a data transmitting means of transmitting data to the receivable wireless communication stations using OFDMA when the determination means determines that different data destined to a plurality of wireless communication stations can be transmitted on different channels.

38 Claims, 55 Drawing Sheets

(51) Int. Cl.
  *H04W 72/04* (2009.01)
  *H04J 11/00* (2006.01)
  *H04W 84/12* (2009.01)
  *H04B 7/0413* (2017.01)

(52) U.S. Cl.
  CPC .......... *H04L 5/0044* (2013.01); *H04L 5/0098* (2013.01); *H04W 72/04* (2013.01); *H04B 7/0413* (2013.01); *H04L 5/001* (2013.01); *H04L 5/0023* (2013.01); *H04W 84/12* (2013.01)

(56) References Cited

OTHER PUBLICATIONS

Notice of Reasons for Rejection, Japanese Patent Application No. 2014-525880, dated Aug. 18, 2015.

Extended Search Report, European Patent Application No. 13820179.3, dated Feb. 8, 2016.

"802.11 High-Speed Wireless LAN Text" under the supervision of Masahiro Morikura, Shuji Kubota, third revised edition, Kabushiki-Kaisha Impress R&D, Apr. 11, 2008.

IEEE P802.11ac Draft Standard, D3.0, Jun. 2012.

IEEE, "IEEE Std 802.11-2012".

Eldad Perahia and Robert Stacey, "Next Generation Wireless LANs", Cambridge University Press, 2010.

K. Kim, et al, "Joint Subcarrier and Power Allocation in Uplink OFDMA Systems", IEEE Communications Letters, vol. 9, No. 6, Jun. 2005.

James Wang, HuanChun Ye, Alvin Hsu, Wide Band OBSS Friendly PSMP, IEEE 802.11-10/1054-00, IEEE mentor, Sep. 13, 2010, slide 3,9.

Yasuhiko Inoue, Yusuke Asai, Tomoki Murakami, Masato Mizoguchi, Discussions on the better resource utilization for the next generation WLANs, IEEE 802.11-12/0068r0, IEEE mentor, Jan. 17, 2012, slide 6.

Brian Hart, Andrew Myles, Douglas Chan, DL-OFDMA for Mixed Clients, IEEE 802.11-10/0317r0, IEEE mentor, Mar. 6, 2010, slide 9,10,14.

Allan Zhu, Youngsoo Kim, Matt Fischer, Yong Liu, Robert Stacey, Hemanth Sampath, James Cho, Jae Seung Lee, Yongho Seok, TXOP Sharing for DL MU-MIMO Support, IEEE 802.11-10/1123r0, IEEE mentor, Sep. 13, 2010, slide 11.

Liwen Chu, George Vlantis, 80MHz/160MHz Protection, IEEE 802.11-10/1096r2, IEEE mentor, Sep. 14, 2010, slide 2,4.

International Search Report for PCT/JP2013/069647, ISA/JP, dated Sep. 24, 2013.

Chinese Office Action in corresponding application CN 201380037738.9, dated Dec. 1, 2017, with partial translation of search report.

* cited by examiner

FIG. 5

FIG. 9
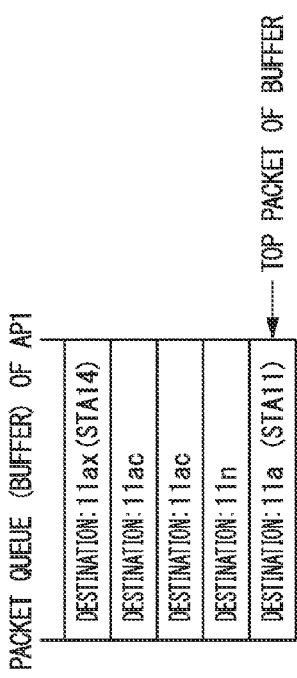
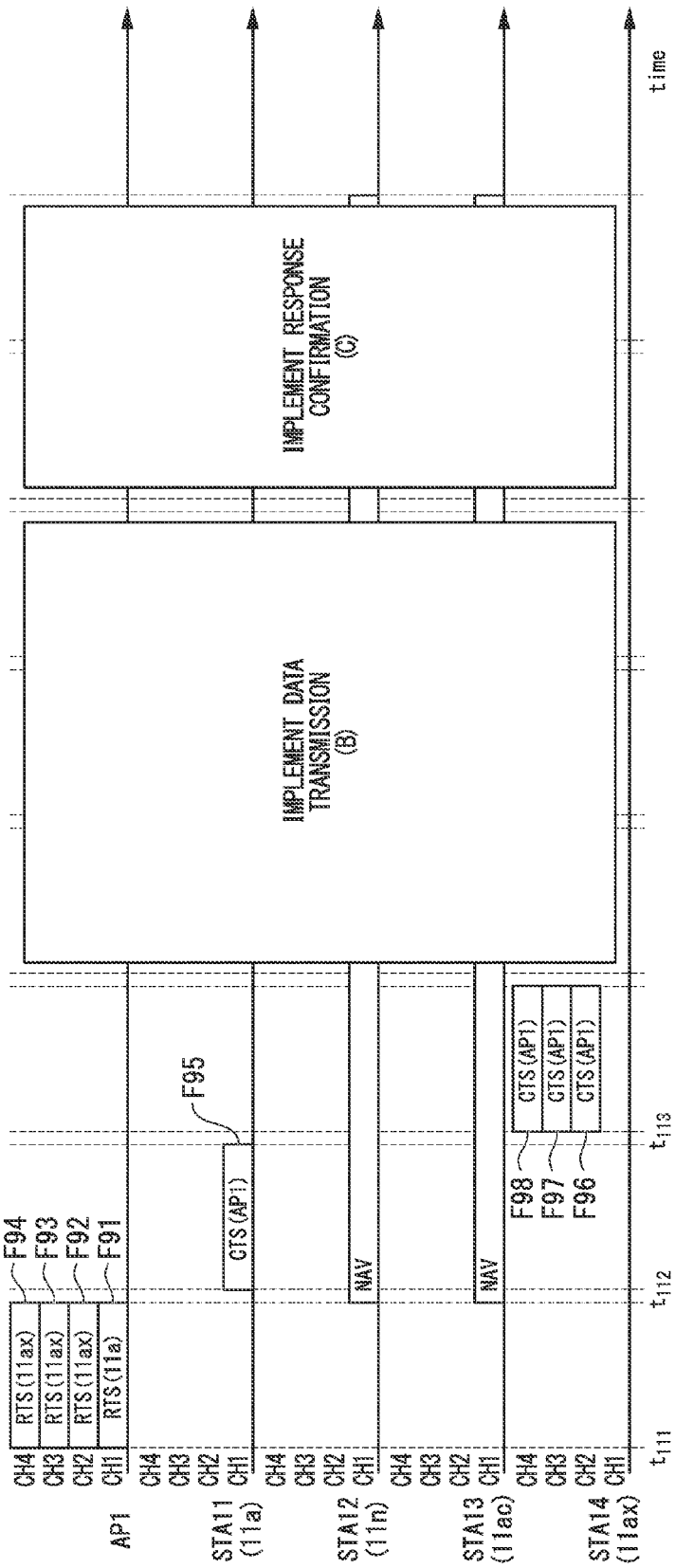

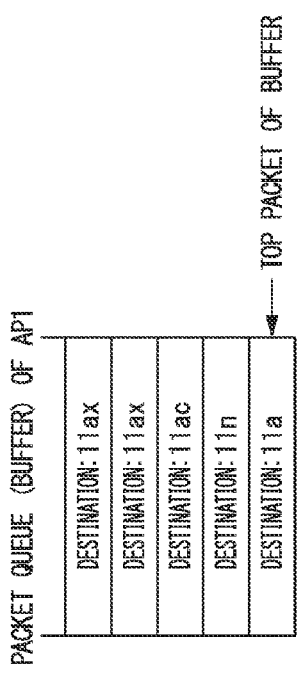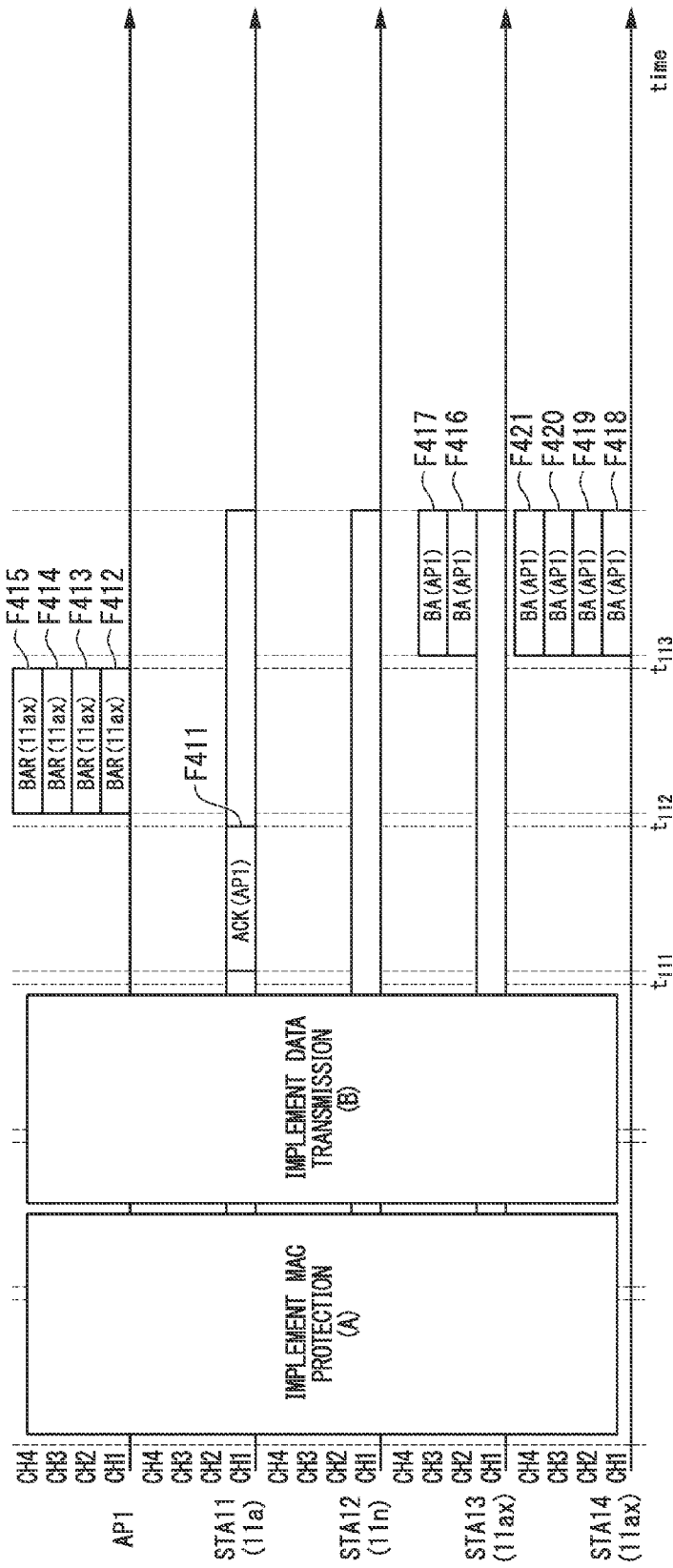
FIG. 40

FIG. 41

| | | | | CTS response STAs=1 | RTS | | | | | | | |
|---|---|---|---|---|---|---|---|---|---|---|---|---|
| | | | | | | CTS response STAs>1 | | | | | | |
| | | | | | Polled CTS | | | | Scheduled CTS | Multiplexed CTS | | |
| | | | | | FIXED BANDWIDTH | | VARIABLE BANDWIDTH | | | OFDMA+MU-MIMO | | |
| | | | | w/o legacy | w/o legacy | w/ legacy | w/o legacy | w/ legacy | w/ legacy | w/o legacy | | w/ legacy |
| | | | | A1-1 | A1-2 | A1-3 A1-3(1) A1-3(2) | A1-4 | A1-5 | A1-8 | A1-6 A1-6(1) A1-6(2) | | A1-7 A1-7(1) A1-7(2) |
| CTS response STAs=1 | | | w/o legacy | A1-1 | — | | | | | | | | |
| | Polled CTS | FIXED BANDWIDTH | w/o legacy | A1-2 | ○ | | | | | | | | |
| | | | w/ legacy | A1-3 A1-3(1) | ○ | | | | | | | | |
| | | | | A1-3(2) | ○ | | | | | | | | |
| | | VARIABLE BANDWIDTH | w/o legacy | A1-4 | ○ | | | | | | | | |
| | | | w/ legacy | A1-5 | ○ | | | | | | | | |
| | Scheduled CTS | | w/ legacy | A1-8 | ○ | | | | | | | | |
| | Multiplexed CTS | OFDMA +MU-MIMO | w/o legacy | A1-6 A1-6(1) | ○ | | | | | | | | |
| | | | | A1-6(2) | ○ | | | | | | | | |
| | | | w/ legacy | A1-7 A1-7(1) | ○ | | | | | | | | |
| | | | | A1-7(2) | ○ | | | | | | | | |
| CTS response STAs>1 | Polled CTS | FIXED BANDWIDTH | w/o legacy | A1-2 | | — | — | — | — | — | — | — | — |
| | | | w/ legacy | A1-3(1) | | — | — | — | — | — | — | — | — |
| | | | | A1-3(2) | | × | × | × | — | — | — | — | — |
| | | VARIABLE BANDWIDTH | w/o legacy | A1-4 | | × | × | × | — | — | — | — | — |
| | | | w/ legacy | A1-5 | | ○ | ○ | ○ | ○ | | | | |
| | Scheduled CTS | | w/ legacy | A1-8 | | ○ | ○ | ○ | ○ | — | | | |
| | Multiplexed CTS | OFDMA +MU-MIMO | w/o legacy | A1-6(1) | | ○ | ◎ | ◎ | ○ | ◎ | ○ | | |
| | | | | A1-6(2) | | ○ | ○ | ○ | ○ | ○ | ○ | | |
| | | | w/ legacy | A1-7(1) | | × | × | × | ○ | × | × | | |
| | | | | A1-7(2) | | ○ | × | × | × | × | × | | |

FIG. 45

| ERTS | | | | CTS response STAs=1 | | CTS response STAs>1 | | | | | | |
|---|---|---|---|---|---|---|---|---|---|---|---|---|
| | | | | | | Scheduled CTS | Polled CTS | | Multiplexed CTS | | | |
| | | | | | | | FIXED BANDWIDTH | VARIABLE BANDWIDTH | OFDMA+MU-MIMO | | | |
| | | | | w/o legacy | w/o legacy | w/o legacy | w/o legacy | w/o legacy | | | | |
| | | | | A2-1(1) | A2-1(2) | A2-2 | A2-3 | A2-4 | A2-5(1) | A2-5(2) | A2-5(3) | A2-5(4) |
| CTS response STAs=1 | Scheduled CTS | | w/o legacy | A2-1(1) | — | — | | | | | | | |
| | | | | A2-1(2) | — | — | | | | | | | |
| | Polled CTS | FIXED BANDWIDTH | w/o legacy | A2-2 | ○ | ○ | — | × | × | | | | |
| | | VARIABLE BANDWIDTH | w/o legacy | A2-3 | ○ | ○ | × | — | — | | | | |
| | | | | A2-4 | ○ | ○ | × | — | — | | | | |
| CTS response STAs>1 | Multiplexed CTS | OFDMA+MU-MIMO | w/o legacy | A2-5(1) | ○ | ○ | ○ | ○ | ○ | — | — | — | — |
| | | | | A2-5(2) | ○ | ○ | ○ | ○ | ○ | — | — | — | — |
| | | | | A2-5(3) | ○ | ○ | ○ | ○ | ○ | — | — | — | — |
| | | | | A2-5(4) | ○ | ○ | ○ | ○ | ○ | — | — | — | — |

WIRELESS COMMUNICATION SYSTEM, AND WIRELESS COMMUNICATION METHOD

TECHNICAL FIELD

The present invention relates to a wireless communication system and a wireless communication method, each of which is configured to carry out wireless communication effectively using frequency resources.

The present application is based on Japanese patent applications (i.e. Japanese Patent Application No. 2012-160845, Japanese Patent Application No. 2012-160872, and Japanese Patent Application No. 2012-160873), whose descriptions are partially incorporated into the present specification.

BACKGROUND ART

Recently, high-speed wireless access systems using 2.4 GHz bands or 5 GHz bands, such as the standards of IEEE802.11g and IEEE802.11a, have been spreading remarkably. These systems may adopt orthogonal frequency division multiplexing (OFDM) modulation methods, i.e. technologies used to stabilize characteristics in multipath fading environments, so as to achieve a physical-layer transmission speed of maximally 54 Mbps (see Non-Patent Literature Document 1).

The above transmission speed indicates a transmission speed on a physical layer. In actuality, due to a transmission efficiency of 50-70% on a MAC (Medium Access Control) layer, the upper limit of an actual throughput may be limited to about 30 Mbps, and therefore characteristics may be further reduced due to the increasing number of wireless communication stations used to send information. The spread of wired LANs (Local Area Network) such as 100 Base-T interfaces of Ethernet (registered trademark) and FTTH (Fiber to Home) using optical fibers in households may promote the spread of high-speed lines at 100 Mbps, which in turn further increases transmission speeds in wireless LANs.

As technologies aiming for higher speeds, the IEEE802.11n standard introduced increased channel bandwidths and spatial multiplexing techniques (MIMO: Multiple Input Multiple Output). In drafting the IEEE802.11ac standard, it has been considered to employ further increased channel widths and multiuser MIMO (MU-MIMO) transmission methods adopting space division multiple access (SDMA) techniques expanding spatial multiplexing techniques (see Non-Patent Literature Document 2). In drafting the IEEE802.11ac standard, it has been considered to employ a new concept of group IDs (GID). Using group IDs, it is possible to concurrently transmit data to all of or part of wireless communication terminals belonging to a group specified via a GID field of each frame.

Among the technologies aiming for higher speeds, it is easy to facilitate speed increasing methods using increased channel bandwidths rather than spatial multiplexing techniques and space division multiple access techniques, and therefore speed increasing functions have been installed in numerous devices. For example, it is possible to increase speeds in such a way that the channel bandwidth of 20 MHz fixed to the IEEE802.11a standard is increased to 40 MHz in the IEEE802.11n standard. Additionally, the IEEE802.11 TGac (Task Group ac) has been currently working on a draft of the IEEE802.11ac standard considering an increase of the channel bandwidth to 80 MHz or 160 MHz. For example, it is possible to use two adjacent channels, each having the bandwidth of 20 MHz, for use in the total bandwidth of 40 MHz while it is possible to use four adjacent channels, each having the bandwidth of 20 MHz, for use in the total bandwidth of 80 MHz.

In wireless LAN systems based on the IEEE802.11 standards, wireless base station devices (which may be referred to as access points, hereinafter referred to as wireless base stations) having broadband transmission/reception abilities or functions at 40 MHz, 80 MHz, or 160 MHz may actually perform transmission/reception using channel bandwidths which should be limited to channel bandwidths supported by wireless communication terminal devices (hereinafter, referred to as wireless communication terminals) under command of wireless base stations. For wireless communication terminals unable to transmit or receive broadband signals at 40 MHz, 80 MHz, or 160 MHz, it is necessary for wireless base stations to transmit or receive data by use of available channel bandwidths for each wireless communication terminal.

The following description is made by taking an example of a wireless base station which is able to transmit or receive data via 80 MHz bands based on the standard (or draft) of IEEE802.11ac. At this time, it is possible for the wireless base station to transmit or receive data via 80 MHz bands with wireless communication terminals, employing 80 MHz modes based on the IEEE802.11ac standard (or draft), under command of the wireless base station. However, it is necessary for the wireless base station to transmit data on a single channel of 20 MHz with wireless communication terminals employing 20 MHz bands based on the IEEE802.11a standard.

In the systems based on IEEE802.11 standards, it is impossible to adequately demonstrate abilities of wireless base stations due to differences of channel bandwidths supported by wireless base stations and wireless communication terminals. Additionally, the increasing number of wireless communication terminals having low functions and abilities may degrade throughput characteristics and frequency usage efficiencies in the entirety of systems.

Next, a wireless data transmission/reception method adapted to a wireless LAN system based on IEEE802.11 will be described. In the wireless LAN system based on IEEE802.11 employing an access control procedure based on CSMA/CA (Carrier Sense Multiple Access with Collision Avoidance), wireless communication stations (hereinafter, wireless base stations and wireless communication terminals will be generally referred to as wireless communication stations) may avoid collision of signals with other wireless communication stations. A wireless communication station receiving a transmission request carries out a series of steps of: monitoring the states of wireless media during the predetermined sensing period (DIFS: Distributed Inter-Frame Space); assuming an unused state of channels (which may be referred to as an idle state) when other wireless communication stations do not transmit signals during the period; and then initiating a random backoff procedure (i.e. a process of deterring transmission for a waiting time which is used to control collision avoidance and determined based on a random number generated within the predetermined range). The wireless communication station continuously monitors wireless media during the random backoff period and then gets an exclusive channel transmission opportunity for the predetermined period (TXOP: Transmission Opportunity) when other wireless communication stations do not transmit signals during the random backoff period. The wireless communication station obtaining a transmission opportunity (TXOP) is called TXOP Holder (hereinafter, referred to as a TXOP-Holder wireless communication station). The wireless communication station serving as TXOP Holder may continuously transmit frames with very short time intervals, called SIFS (Short Inter-Frame Space), without performing CSMA/CA again in the TXOP period.

It is possible to provide "virtual carrier sense" as a method of solving concealed problems of terminals in wireless communications. Upon receiving frames including Duration (i.e. a continuous usable period) information used to notify a usable time of wireless media, wireless communication stations assume that wireless media are occupied in the period corresponding to Duration information (virtual carrier sense), and therefore wireless communication stations determine the period as a transmission suspension period (i.e. a NAV (Network Allocation Vector) period) so as to suspend transmitting frames in the NAV period. Thus, it is possible to guarantee exclusive usage of channels during the TXOP period.

A wireless communication station receiving a frame may implement NAV setting as necessary while simultaneously storing information (e.g. a MAC address) used to identify a TXOP-Holder wireless communication station, i.e. a wireless communication station serving as a source of transmitting the received frame indicating a frame used to start the TXOP period (see Non-Patent Literature Document 3). The wireless communication station deletes the information identifying a TXOP-Holder wireless communication station at the end of the TXOP period. As a frame used to start the TXOP period, it is unnecessary to use a special frame, but it is possible to use a signal which is used to reserve channels by transmitting a control frame such as an RTS (Request To Send) frame.

Upon receiving a frame again in the TXOP period, the wireless communication station confirms whether or not the address of the source of transmitting the received frame matches the MAC address which is stored as the information identifying a TXOP-Holder wireless communication station. When the source address matches the MAC address, the wireless communication station determines that a wireless communication station serving as a source of transmitting the received frame is identical to a TXOP-Holder wireless communication station, thus sending back a reply frame which is needed irrespective of the presence or absence of the NAV setting therein. This makes it possible for a TXOP-Holder wireless communication station to transmit or receive data with a plurality of wireless communication stations in the same TXOP period.

Hereinafter, operations of transmitting and receiving frames conducted between wireless communication stations will be described with reference to FIGS. 52 to 54. FIG. 52 is a schematic illustration of a wireless LAN cell A consisting of one wireless base station AP1 and three wireless communication terminals STA11 to STA13. Both the wireless base station AP1 and the wireless communication terminal STA13 based on the IEEE802.11ac standard are designed to support three types of transmission/reception bandwidths of 20 MHz, 40 MHz, and 80 MHz. The wireless communication terminal STA11 based on the IEEE802.11a standard is designed to support the transmission/reception bandwidth of 20 MHz while the wireless communication terminal STA12 based on the IEEE802.11n standard is designed to support the transmission/reception bandwidths of 20 MHz and 40 MHz.

FIG. 53 is a time chart showing the frame transmitting timings at which a TXOP-Holder wireless communication station transmits frames to other wireless communication stations in the TXOP period. In this drawing, the horizontal axis represents time. Symbols such as (STA11) described in each frame indicate wireless communication stations serving as destinations, for example, wherein (STA11) indicates the wireless communication terminal STA11 serving as a destination. Additionally, NAV(RTS) indicates the NAV setting after receiving RTS not destined to its own station. Among wireless communication stations corresponding to the wireless base station AP1 and the wireless communication terminals STA11 to STA13, the wireless base station AP1 collects data destined to the wireless communication terminals STA11 to STA13 so as to transmit frames to the wireless communication terminals STA11 to STA13. The wireless base station AP1 serving as TXOP Holder transmits data to the wireless communication terminal STA13, employing the largest band among terminals, on a channel of 80 MHz. Upon finishing data communication with the wireless communication terminal STA13, the wireless base station AP1 transmits data to the wireless communication terminal STA12 having the second largest band among terminals. Lastly, the wireless base station AP1 transmits data to the wireless communication terminal STA11 having the smallest band among terminals.

Hereinafter, the operations of the wireless base station AP1 and the wireless communication terminals STA11 to STA13 will be described with reference to FIG. 53. Upon generating data destined to the wireless communication terminals STA11 to STA13, the wireless base station AP1 carries out CSMA/CA so as to obtain a transmission opportunity (TXOP) by confirming and detecting no signals transmitted from other wireless communication stations. The wireless base station AP1 obtaining a transmission opportunity, serving as a TXOP-Holder wireless communication station (i.e. TXOP Holder), starts to transmit frames. The wireless base station AP1 transmits an RTS (Request TO Send) frame, serving as an initiate frame indicating the beginning of a frame sequence, to the wireless communication terminal STA13 utilizing the largest band among terminals sending data (time $t_{111}$).

The wireless communication terminal STA13 sends back a CTS (Clear To Send) frame to the wireless base station AP1 since the received RTS frame is destined to its own station not having the setting of a transmission suspension period (time $t_{112}$). Thus, the wireless communication terminal STA13 notifies the data-receivable state thereof to the wireless base station AP1.

The wireless communication terminals STA11 and STA12, i.e. other wireless communication stations receiving an RTS frame from the wireless base station AP1, set a NAV period (i.e. a transmission suspension period), indicated by continuous usage period information included in the RTS frame not destined to their own stations, so as to stop transmitting frames in the NAV period. Additionally the other wireless communication stations detect the beginning of the TXOP period (i.e. a usage transmission opportunity period) due to the RTS frame being received from the wireless base station AP1, while the wireless communication terminals STA11 to STA13 stores that the wireless base station AP1 serves as a TXOP-Holder wireless communication station (i.e. TXOP Holder).

Upon receiving a CTS frame from the wireless communication terminal STA13, the wireless base station AP1 transmits a frame destined to the wireless communication terminal STS13 (time $t_{113}$). The wireless communication terminal STA13, properly receiving a frame destined to its own station, sends back a BA (Block ACK) frame (or an ACK (Acknowledgement) frame) (time $t_{114}$), thus exiting transmission/reception of frames.

Next, the wireless base station AP1 transmits an RTS frame destined to the wireless communication terminal STA12 (time t115) in order to transmit data to the wireless communication terminal STA12 having the second largest band among terminals. Herein, the wireless communication terminal STA12, already setting NAV in its own station, receives a frame from TXOP Holder so as to send back a CTS frame destined to a wireless base station AP1 serving as TXOP Holder (time $t_{116}$).

The wireless communication terminals STA11 and STA13 receive an RTS frame destined to other wireless communication terminals so as to set a NAV period. When the NAV period is set in advance, they update the NAV value. Upon properly receiving a CTS frame from the wireless communication terminal STA12, the wireless base station AP1 transmits a frame to the wireless communication terminal STA12 (time $t_{117}$). Upon properly receiving a frame from the wireless base station AP1, the wireless communication terminal STA12 sends back a BA frame (or an ACK frame) to the wireless base station AP1 (time $t_{118}$), thus exiting transmission/reception of frames.

Next, the wireless base station AP1 transmits an RTS frame destined to the wireless communication terminal STA11 (time $t_{119}$) in order to transmit data to the wireless communication terminal STA11 having the smallest band among terminals. The wireless communication terminal STA11 receives an RTS frame from the wireless base station AP1, serving as a TXOP-Holder wireless communication station, so as to send back a CTS frame to the TXOP-Holder wireless communication station (time $t_{120}$) regardless of whether or not the current period belongs to the NAV period.

The wireless communication terminals STA12 and STA13 receive an RTS frame not destined to their own stations so as to set a NAV period. When the NAV period is set in advance, they update the NAV value. Upon properly receiving a CTS frame from the wireless communication terminal STA11, the wireless base station AP1 transmits a frame to the wireless communication terminal STA11 (time $t_{121}$). Upon properly receiving a frame from the wireless base station AP1, the wireless communication terminal STP11 sends back a BA frame (or an ACK frame) to the wireless base station AP1 (time $t_{122}$), thus exiting transmission/reception of frames.

The above description exemplifies a frame sequence employing a MAC protection method using RTS/CTS exchange before data transmission, but it is possible to transmit frames just after obtaining an access right without RTS/CTS exchange. Additionally, the above description shows an example of transmitting data to a plurality of terminals in the same TXOP period. As described above, it is possible to transmit frames to a plurality of terminals within a range of periods not exceeding the upper limit of TXOP defined based on the IEEE802.11 standards. In this case, it is impossible to perform communication using channel bandwidths larger than channel bandwidths once used in the TXOP period. That is, it is impossible to broaden channel bandwidths used in the TXOP period, but it is possible to reduce channel bandwidths as necessary. In the case of FIG. 53, it is necessary to transmit frames in an order of destinations having larger channel bandwidths among the wireless communication terminal STA11 having Channel 1 (CH1), the wireless communication terminal STA12 having CH1 and CH2, and the wireless communication terminal STA13 having CH1 to CH4.

Next, channel bandwidths used for data transmission among the wireless base station AP1 and the wireless communication terminals STA11 to STA13 will be described with reference to FIG. 54. FIG. 54 shows channel bandwidths used for data transmission among the wireless base station AP1 and the wireless communication terminals STA11 to STA13. The wireless base station AP1 communicates with the wireless communication terminal STA11, solely using 20 MHz bands, on Channel 1 (CH1).

Non-Patent Literature Document 3 defines unit channels, called primary channels, which should be necessarily used to perform communication in a cell configured of a certain access point and terminal stations. Other channels, which are not primary channels but used for communication, are called secondary channels. Alternatively, Non-Patent Literature Document 2 names other channels as secondary xMHz channels (where x indicates any one of 20, 40, 80). In the present specification, arbitrarily unit channels, which are not primary channels within the entire bandwidth of each cell, will be referred to as secondary channels. FIG. 55 shows examples of primary channels and secondary channels on the condition that each unit channel has a 20 MHz band within each cell having the entire bandwidth of 80 MHz. FIG. 55 shows three secondary channels.

The wireless base station AP1 may communicate with the wireless communication terminal STA12, adaptable up to 40 MHz bands, on a primary channel of 20 MHz and another 20 MHz channel (i.e. a secondary channel) adjacent to the primary channel (i.e. CH1 and CH2). Additionally, the wireless base station AP1 may communicate with the wireless communication terminal STA13, adaptable up to 80 MHz bands, on a primary channel and three secondary channels.

CITATION LIST

Non-Patent Literature Document

Non-Patent Literature Document 1: "802.11 High-Speed Wireless LAN Text" under the supervision of Masahiro Morikura, Shuji Kubota, third revised edition, Kabushiki-Kaisha Impress R&D, Apr. 11, 2008

Non-Patent Literature Document 2: IEEE802.11ac Draft Standard, D3.0, June 2012

Non-Patent Literature Document 3: IEEE, "IEEE Std 802.11-2012"

Non-Patent Literature Document 4: Eldad Perahia and Robert Stacey, "Next Generation Wireless LANs", Cambridge University Press, 2010

SUMMARY OF INVENTION

Technical Problem

In the case of FIG. 54 in which the wireless base station AP11 differs from the wireless communication terminals STA11 to STA13 in terms of available transmission/reception bandwidths, it is possible to use only a part of the entire frequency band adaptable to the wireless base station AP1. For example, channels CH2 to CH4 are idle when the wireless base station AP1 communicates with the wireless communication terminal STA11 while channels CH3 to CH4 are idle when the wireless base station AP1 communicates with the wireless communication terminal STA12.

In this case, it is impossible to fully utilize the ability of the wireless base station AP1 and to effectively use frequency resources, resulting in problems such as a reduction of a throughput in the entire system and degradation of service quality.

The present invention is made in consideration of the foregoing circumstances, and therefore it is an object of the invention to provide a wireless communication system and a wireless communication method which can improve throughputs of wireless communications via effective use of frequency resources.

Solution to Problem

The present invention is directed to a wireless communication system including a plurality of wireless communication stations which may operate as wireless communication terminals or wireless base stations. Each of the wireless communication stations includes
an access right acquisition means which acquires an access right upon generating transmitting data, a determination means which determines whether or not different data destined to a plurality of wireless communication stations can be transmitted on different channels using orthogonal frequency division multiple access upon obtaining the access right, and
a data transmission means which transmits data to the receivable wireless communication stations using the orthogonal frequency division multiple access when the determination means determines that different data destined to a plurality of wireless communication stations can be transmitted on different channels.

The present invention is directed to the wireless communication system in which the data transmission means transmits data destined to an OFDMA-unadapted wireless communication station on a primary channel while transmitting data destined to an OFDMA-adapted wireless communication station on a secondary channel.

The present invention is directed to the wireless communication system in which OFDMA-adapted wireless communication stations are subjected to grouping, and therefore the data transmission means transmits data by use of a group identification of each group subjected to grouping as a data-transmission destination.

The present invention is directed to the wireless communication system in which OFDMA-adapted wireless communication stations are subjected to grouping, and therefore the data transmission means transmits data destined to a group of the OFDMA-adapted wireless communication stations on sub-channels allocated thereto in a secondary channel.

The present invention is directed to the wireless communication system in which the data transmission means transmits data with different data lengths representing times necessary to transmit frames to OFDMA-adapted wireless communication stations such that the data length used for data transmission on a secondary channel is adjusted to the data length used for data transmission on a primary channel.

The present invention is directed to the wireless communication system in which the data transmission means transmits data with different data lengths representing times necessary to transmit frames destined to OFDMA-adapted wireless communication stations such that the data lengths of other channels are adjusted to the longest data length of a channel.

The present invention is directed to a wireless communication system including a plurality of wireless communication stations which may operate as wireless communication terminals or wireless base stations. Each of the wireless communication stations includes
a data receiving means which receives different data destined to a plurality of wireless communication stations being transmitted on different channels using orthogonal frequency division multiple access, and
a response confirmation transmitting means which transmits a response confirmation upon properly receiving data with the data receiving means.

The present invention is directed to the wireless communication system in which the response confirmation is solely transmitted on a secondary channel when a response is made by a single OFDMA-adapted wireless communication station.

The present invention is directed to the wireless communication system in which a response confirmation is transmitted in a time-division manner on a primary channel when a response is made by a plurality of wireless communication stations including OFDMA-unadapted wireless communication stations.

The present invention is directed to the wireless communication system in which when a response is made by a plurality of wireless communication stations including OFDMA-unadapted wireless communication stations, a response confirmation is transmitted from the OFDMA-unadapted wireless communication stations on a primary channel, and then a response confirmation is transmitted from the OFDMA-adapted wireless communication stations on a secondary channel.

The present invention is directed to the wireless communication system in which a response is made by a plurality of wireless communication stations including OFDMA-unadapted wireless communication stations such that a response confirmation is transmitted on a primary channel and a secondary channel with a guard band interposed therein.

The present invention is directed to the wireless communication system in which a response is made by a plurality of wireless communication stations including OFDMA-unadapted wireless communication stations such that a response confirmation is transmitted via a channel using uplink OFDMA.

The present invention is directed to the wireless communication system in which a response is made by a plurality of wireless communication stations including OFDMA-unadapted wireless communication stations such that a response confirmation is transmitted on the mutually overlapped channels using uplink OFDMA and uplink multiuser MIMO.

The present invention is directed to a wireless communication system including a plurality of wireless communication stations which may operate as wireless communication terminals or wireless base stations. Each of the wireless communication stations includes an access right acquisition means which acquires an access right upon generating transmitting data, a determination means which determines whether or not different data destined to a plurality of wireless communication stations can be transmitted via different channels upon obtaining the access right, and a MAC protection implementing means which exchanges a transmission request and transmission permission upon the transmission request between the receivable wireless communication stations using the orthogonal frequency division multiple access when the determination means determines that different data destined to a plurality of wireless communication stations can be transmitted on different channels.

The present invention is directed to the wireless communication system in which the MAC protection implementing means prioritizes the wireless communication station, which is able to transmit a transmission request on plenty of channels, to transmit a transmission request and then sends back transmission permission upon the transmission request.

The present invention is directed to the wireless communication system in which a response is made by a single OFDMA-adapted wireless communication station such that the MAC protection implementing means duplicates and transmits a transmission request on all channels and then sends back transmission permission upon the transmission request on unbusy channels.

The present invention is directed to the wireless communication system in which a response is made by a plurality of OFDMA-adapted wireless communication stations such that the MAC protection implementing means transmits a transmission request to other wireless communication stations, other than the wireless communication stations which transmit a transmission request but which do not receive transmission permission via part of channels, on all channels used for preceding transmission of the transmission request so as to reconfirm whether or not frames are transmitted on channels not used to send back transmission permission.

The present invention is directed to the wireless communication system in which a response is made by a plurality of wireless communication stations including OFDMA-unadapted wireless communication stations such that the MAC protection implementing means transmits a transmission request to the OFDMA-adapted wireless communication stations on all channels, sends back transmission permission upon the transmission request, and then transmits the transmission request to the OFDMA-unadapted wireless communication stations on all channels, thus sending back the transmission permission upon the transmission request.

The present invention is directed to the wireless communication system in which a response is made by a plurality of wireless communication stations including OFDMA-unadapted wireless communication stations such that the MAC protection implementing means transmits a transmission request to the OFDMA-unadapted wireless communication stations on all channels, sends back transmission permission upon the transmission request, and then transmits the transmission request to the OFDMA-adapted wireless communication stations on all channels, thus sending back the transmission permission upon the transmission request.

The present invention is directed to the wireless communication system in which a response is made by a plurality of wireless communication stations including OFDMA-unadapted wireless communication stations such that the MAC protection implementing means transmits a transmission request to the OFDMA-unadapted wireless communication stations on a primary channel while transmitting a transmission request to the OFDMA-adapted wireless communication stations on a secondary channel, thus sending back transmission permission upon the transmission request in a time-division manner on the primary channel and the secondary channel.

The present invention is directed to the wireless communication system in which a response is made by a plurality of OFDMA-adapted wireless communication stations such that the MAC protection implementing means transmits a transmission request on all channels and then retransmits the transmission request on channels precluding channels not used to send back transmission permission upon the transmission request, thus sending back the transmission permission upon the transmission request.

The present invention is directed to the wireless communication system in which a response is made by a plurality of wireless communication stations including OFDMA-unadapted wireless communication stations such that the MAC protection implementing means transmits a transmission request to a plurality of OFDMA-adapted wireless communication stations on all channels and then transmits a transmission request to the OFDMA-unadapted wireless communication stations on channels precluding channels not used to send back transmission permission upon the transmission request, thus sending back the transmission permission upon the transmission request.

The present invention is directed to the wireless communication system in which a response is made by a plurality of OFDMA-adapted wireless communication stations such that the MAC protection implementing means transmits a transmission request simultaneously to a plurality of wireless communication stations on different channels, and therefore a plurality of wireless communication stations receiving the transmission request simultaneously sends back transmission permission using uplink OFDMA.

The present invention is directed to the wireless communication system in which a response is made by a plurality of OFDMA-adapted wireless communication stations such that the MAC protection implementing means transmits a transmission request simultaneously to a plurality of wireless communication stations on different channels, and therefore a plurality of wireless communication stations receiving the transmission request simultaneously sends back transmission permission on idle channels using uplink OFDMA.

The present invention is directed to the wireless communication system in which the transmission permission includes list information, representing the wireless communication stations subjected to simultaneous transmission, and the number of spatial streams used for data transmission from the wireless communication stations.

The present invention is directed to the wireless communication system in which the transmission permission is transmitted using a predetermined pattern representing an inverse matrix for each of subcarriers included in the transmission permission.

The present invention is directed to the wireless communication system in which a response is made by a plurality of wireless communication stations including OFDMA-unadapted wireless communication stations such that the MAC protection implementing means transmits a transmission request to the OFDMA-unadapted wireless communication stations on a primary channel while transmitting a transmission request to OFDMA-adapted wireless communication stations on secondary channels, and therefore each of the wireless communication stations receiving the transmission request sends back transmission permission on the channel used to receive the transmission request.

The present invention is directed to the wireless communication system in which a response is made by a plurality of wireless communication stations including OFDMA-unadapted wireless communication stations such that the MAC protection implementing means transmits a transmission request to the OFDMA-unadapted wireless communication stations on a primary channel while transmitting transmission requests to the OFDMA-adapted wireless communication stations on different secondary channels, and therefore the OFDMA-unadapted wireless communication stations send back transmission permission on the primary channel while the OFDMA-adapted wireless communication stations simultaneously send back transmission permission using uplink OFDMA.

The present invention is directed to the wireless communication system in which a response is made by the OFDMA-adapted wireless communication stations such that the MAC protection implementing means transmits a transmission request on all channels and then sends back transmission permission on idle noncontiguous secondary channels.

The present invention is directed to the wireless communication system in which a response is made by the OFDMA-adapted wireless communication stations such that the MAC protection implementing means transmits a transmission request on a secondary channel temporarily serving as a primary channel when the primary channel is busy and then sends back transmission permission on the secondary channel.

The present invention is directed to the wireless communication system in which the OFDMA-adapted wireless communication stations are subjected to grouping in advance. The MAC protection implementing means transmits a transmission request to a group of the wireless communication stations subjected to grouping on all channels, and then a group of the wireless communication stations receiving the transmission request sends back transmission permission in a time-division manner on the channel.

The present invention is directed to the wireless communication system in which a response is made by a plurality of OFDMA-adapted wireless communication stations such that the MAC protection implementing means transmits a transmission request using a fixed bandwidth and then sends back transmission permission for the transmission request.

The present invention is directed to the wireless communication system in which a response is made by a plurality of OFDMA-adapted wireless communication stations such that the MAC protection implementing means transmits a transmission request using a variable bandwidth and then sends back transmission permission for the transmission request.

The present invention is directed to the wireless communication system in which a response is made by a plurality of OFDMA-adapted wireless communication stations such that the MAC protection implementing means transmits a transmission request including scheduled channel numbers, and then the wireless communication stations receiving the transmission request send back transmission permission including available channel numbers among the scheduled channel numbers.

The present invention is directed to the wireless communication system in which the OFDMA-adapted wireless communication stations are subjected to grouping in advance. The MAC protection implementing means transmits a transmission request, including scheduled channel numbers, to a group of the wireless communication stations subjected to grouping, and then the wireless communication stations receiving the transmission request send back transmission permission including available channel numbers among the scheduled channel numbers.

The present invention is directed to the wireless communication system in which the OFDMA-adapted wireless communication stations are subjected to grouping in advance. The MAC protection implementing means transmits a transmission request, including scheduled channel numbers, to a group of the wireless communication stations subjected to grouping, and then the wireless communication stations receiving the transmission request send back transmission permission including available channel numbers among the scheduled channel numbers using uplink multiuser MIMO.

The present invention is directed to the wireless communication system in which the OFDMA-adapted wireless communication stations are subjected to grouping in advance. The MAC protection implementing means transmits a transmission request, including scheduled channel numbers, to a group of the wireless communication stations subjected to grouping, and then the wireless communication stations receiving the transmission request send back transmission permission, including available channel numbers among the scheduled channel numbers, using uplink OFMDA.

The present invention is directed to a wireless communication method executable with a wireless communication system including a plurality of wireless communication stations which may operate as wireless communication terminals or wireless base stations. Each of the wireless communication stations implements an access right acquisition step of acquiring an access right upon generating transmitting data, a determination step of determining whether or not different data destined to a plurality of wireless communication stations can be transmitted on different channels using OFDMA upon obtaining the access right, and a data transmitting step of transmitting data to the receivable wireless communication stations using OFDMA when the determination step determines that different data destined to the plurality of wireless communication stations can be transmitted on different channels.

The present invention is directed to a wireless communication method executable with a wireless communication system including a plurality of wireless communication stations which may operate as wireless communication terminals or wireless base stations. Each of the wireless communication station implements a data receiving step of receiving different data which are destined to a plurality of wireless communication stations and transmitted on different channels using OFDMA, and a response confirmation transmitting step of transmitting a response confirmation upon properly receiving data with the data receiving means.

The present invention is directed to a wireless communication method executable with a wireless communication system including a plurality of wireless communication stations which may operate as wireless communication terminals or wireless base stations. Each of the wireless communication stations implements an access right acquiring step of acquiring an access right upon generating transmitting data, a determination step of determining whether or not different data destined to a plurality of wireless communication stations can be transmitted on different channels using OFDMA, and an MAC protection implementing step of exchanging a transmission request and transmission permission upon the transmission request between the receivable wireless communication stations using the OFDMA when the determination step determines that different data destined to the plurality of wireless communication stations can be transmitted on different channels.

Advantageous Effects of Invention

The present invention is designed to transmit data to a plurality of wireless communication stations using orthogonal frequency division multiple access (OFDMA), thus demonstrating effects of improving the usage frequency of secondary channels and the system throughput. Additionally, it is possible to concurrently transmit data to OFDMA-adapted terminals on unused secondary channels while transmitting data to legacy terminals (adapted to previous standards) on a primary channel, thus demonstrating an effect of improving frequency usage efficiency.

BRIEF DESCRIPTION OF DRAWINGS

FIG. 5 is a time chart showing a frame sequence in which the number of wireless communication terminals responding to communication is one while a wireless communication terminal sending back CTS is an 11ax wireless communication terminal (adapted to OFDMA).

FIG. 9 is a time chart showing a frame sequence in which the number of wireless communication terminals responding to an RTS frame transmitted using OFDMA is two or more; each wireless communication terminal sends back a CTS frame at the time which is determined in advance by a channel receiving RTS destined thereto.

FIG. 16 is a schematic diagram showing a format of a transmission frame applied to four wireless communication terminals (STA) each transmitting a CTS frame via spatial multiplexing.

FIG. 23 is a time chart showing a frame sequence in which the number of wireless communication terminals responding to communication is two or more; an RTS frame is transmitted to wireless communication terminals via the same fixed bandwidth; all the wireless communication terminals sending back CTS are 11ax wireless communication terminals.

FIG. 40 is a time chart showing a frame sequence in which the number of terminals responding to communication is two or more; UL MU-MIMO and UL OFDMA are used.

FIG. 41 shows a frame sequence of freely-combined MAC protection.

FIG. 45 shows a combination of frame sequences regarding MAC protection using ERTS.

DESCRIPTION OF EMBODIMENTS

Figure 1:
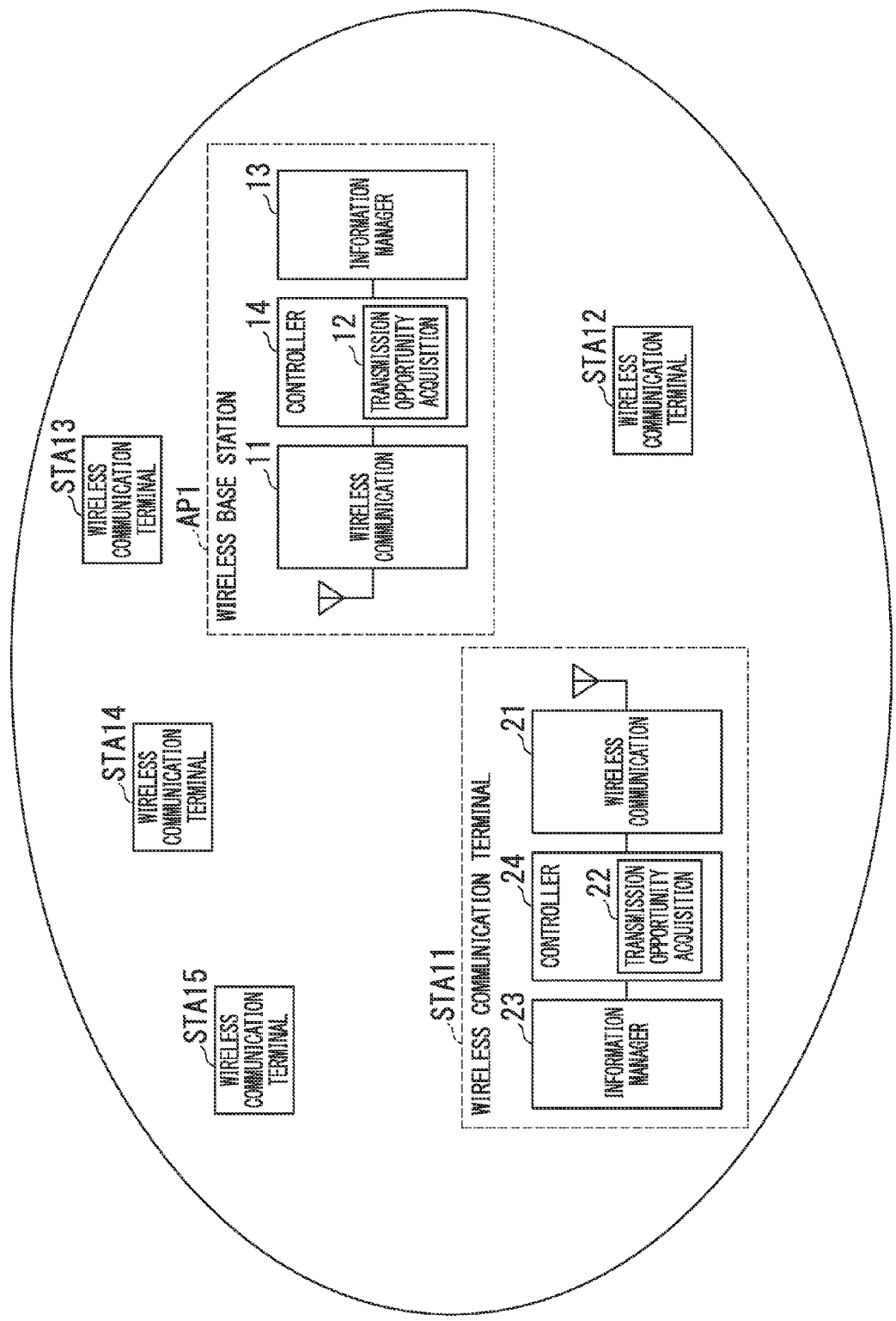
FIG. 1 includes a block diagram showing the configuration of a wireless base station and the configuration of a wireless communication terminal according to one embodiment of the present invention as well as an illustration of a network configuration.

Hereinafter, a wireless communication system according to one embodiment of the present invention will be described with reference to the drawings. FIG. 1 includes a block diagram showing the configuration of a wireless base station and the configuration of a wireless communication terminal according to the present embodiment, and a network configuration diagram. The wireless communication system of the present embodiment is characterized in that a TXOP-Holder wireless communication station transmits data to a plurality of wireless communication stations on a plurality of channels using orthogonal frequency division multiple access (OFDMA). In the wireless communication system shown in FIG. 1, a cell A includes wireless communication stations, i.e. a wireless base station AP1 and five wireless communication terminals STA11 to STA15. Herein, the wireless base station AP1 and the wireless communication terminals STA14, STA15 are wireless communication stations adapted to OFDMA, supporting the maximum transmission/reception bandwidth of 80 MHz. On the other hand, the wireless communication terminal STA13 is based on the IEEE802.11ac standard supporting three types of transmission/reception bandwidths of 20 MHz, 40 MHz, and 80 MHz. Additionally, the wireless communication terminal STA11 is based on the IEEE802.11a standard supporting the transmission/reception bandwidth of 20 MHz, while the wireless communication terminal STA12 is based on the IEEE802.11n standard supporting the transmission/reception bandwidths of 20 MHz and 40 MHz.

In the following description of the present specification, wireless communication terminals having the function of the present embodiment in addition to the function of a wireless communication station based on IEEE802.11ac will be generally referred to as IEEE802.11ac wireless communication terminals (hereinafter, simply referred to as 11ax wireless communication terminals). Additionally, wireless communication stations based on the existing standards (IEEE802.11a, IEEE802.11n, IEEE802.11ac) without having the function stipulated in the present specification will be generally referred to as legacy terminals. Similar to 11ax wireless communication terminals, wireless communication terminals based on the IEEE802.11a standard will be referred to as 11a wireless communication terminals; wireless communication terminals based on the IEEE802.11n standard will be referred to as 11n wireless communication terminals; wireless communication terminals based on the IEEE801.11ac standard will be referred to as 11ac wireless communication terminals.

The present embodiment causes wireless communication stations, receiving or transmitting data in the IEEE802.11 wireless LAN system, to operate using orthogonal frequency division multiple access (OFDMA), thus effectively using idle channels. Using the OFDMA technology for the IEEE802.11 wireless LAN system, for example, it is possible to transmit data to other wireless communication stations (e.g. the OFDMA-available wireless communication terminal STA14) on Channels 2-4 while the wireless base station AP1 transmits data to the wireless communication terminal STA11 on Channel 1 in the wireless communication system shown in FIG. 1. Similarly, it is possible to transmit data to other wireless communication stations (e.g. the wireless communication terminal STA14) on Channels 3, 4 while the wireless base station AP1 transmits data to the wireless communication terminal STA12 on Channels 1, 2.

In this connection, it is possible to concurrently transmit frames to a plurality of wireless communication stations via other bands while interposing guard bands (GB) between channels in order to prevent interference between adjacent channels without implementing OFDMA in the entire available frequency range. When a guard band of 20 MHz is interposed between channels, for example, the wireless base station AP1 transmits frames to the wireless communication terminal STA11 on Channel 1 while transmitting frames to other wireless communication stations (e.g. the wireless communication terminal STA14) on Channels 3, 4 with Channel 2 serving as a guard band. Similarly, the wireless base station AP1 transmits frames to the wireless communication terminal STA12 on Channels 1, 2 while transmitting frames to other wireless communication stations (e.g. the wireless communication terminal STA14) on Channel 4 with Channel 3 serving as a guard band.

For the sake of simplification of descriptions, wireless communication stations to which a wireless communication station having an access right transmits data on a primary channel will be referred to as primary wireless communication stations (Primary STA). Additionally, wireless communication terminals (e.g. the wireless communication terminal STA14 in the above example) to which a wireless communication station having an access right transmits data via part of or the entirety of the frequency range, precluding a primary channel, according to OFDMA will be referred to as secondary wireless communication stations (Secondary STA). Both the IEEE802.11a standard and the IEEE802.11n standard may allow for a single primary wireless communication station, while the IEEE802.11ac standard (draft) using MU-MIMO may allow for a plurality of primary wireless communication stations. The existing wireless LAN systems based on the IEEE802.11a standard, the IEEE802.11n standard, and the IEEE802.11ac standard (draft) do not allow for any secondary wireless communication stations. In contrast, the wireless LAN system of the present embodiment may allow for a plurality of secondary wireless communication stations in addition to a primary wireless communication station.

A TXOP-Holder wireless communication station is able to transmit data to a primary wireless communication station on a plurality of channels. For example, a primary wireless communication station serving as a terminal adapted to the IEEE802.11a standard is able to transmit data on a single 20 MHz channel (or a primary channel), while other primary wireless communication stations serving as terminals adapted to the IEEE802.11n standard and the IEEE802.11ac standard are able to transmit or receive data on maximally two and eight 20 MHz channels. Thus, a group of channels including a primary channel used for communication with primary wireless communication stations will be referred to as a group of primary channels.

Similarly, a TXOP-Holder wireless communication station is able to transmit data to secondary wireless communication stations on one or plural channels within a frequency range not interfering with a primary wireless communication station. As described above, a group of channels, precluding a primary channel, used for communication with secondary wireless communication stations will be referred to as a group of secondary channels.

When a TXOP-Holder wireless communication station (e.g. the wireless base station AP1 in the above example) concurrently transmits signals to a primary wireless communication station and secondary wireless communication stations according to OFDMA, it is possible to implement MAC protection such as RTS/CTS on secondary channels as necessary. A communication period of each secondary wireless communication station should be restricted to the upper limit corresponding to a communication period of a primary wireless communication station (i.e. the TXOP period which is set and obtained based on the IEEE802.11 standards).

The wireless base station AP1 shown in FIG. 1 includes a wireless communication part 11, a transmission opportunity acquisition part 12, an information manager 13, and a controller 14. The wireless communication terminal STA11 shown in FIG. 1 having the same configuration as the wireless base station AP1 includes a wireless communication part 21, a transmission opportunity acquisition part 22, an information manager 23, and a controller 24. The wireless communication terminals STA12 to STA15 differ from the wireless communication terminal STA11 in terms of available bandwidths, presence or absence of supporting OFDMA transmission, but they have the similar configuration of the wireless communication terminal STA11; hence, detailed illustrations are omitted in FIG. 1.

The wireless communication part 11 transmits or receives frames with other wireless communication stations (i.e. the wireless communication terminals STS11 to STA15) via the predetermined frequency bands. When the wireless base station AP1 generates data to be transmitted to other wireless communication stations, the controller 14 requests the transmission opportunity acquisition part 12 to acquire a transmission opportunity (TXOP). The information manager 13 stores information. The controller 14 controls the wireless communication part 11 to transmit or receive frames based on the transmission opportunity acquiring state from the transmission opportunity acquisition part 12 and the information stored in the information manager 13.

The wireless communication part 21 transmits or receives frames with other wireless communication stations (i.e. the wireless base station AP1) via the predetermined frequency band. When the wireless communication terminal STA11 generates data to be transmitted to other wireless communication stations, the controller 24 requests the transmission opportunity acquisition part 22 to acquire a transmission opportunity (TXOP). The information manager 23 stores information. The controller 24 controls the wireless communication part 21 to transmit or receive frames based on the transmission opportunity acquiring state from the transmission opportunity acquisition part 22 and the information stored in the information manager 23.

Figure 2:
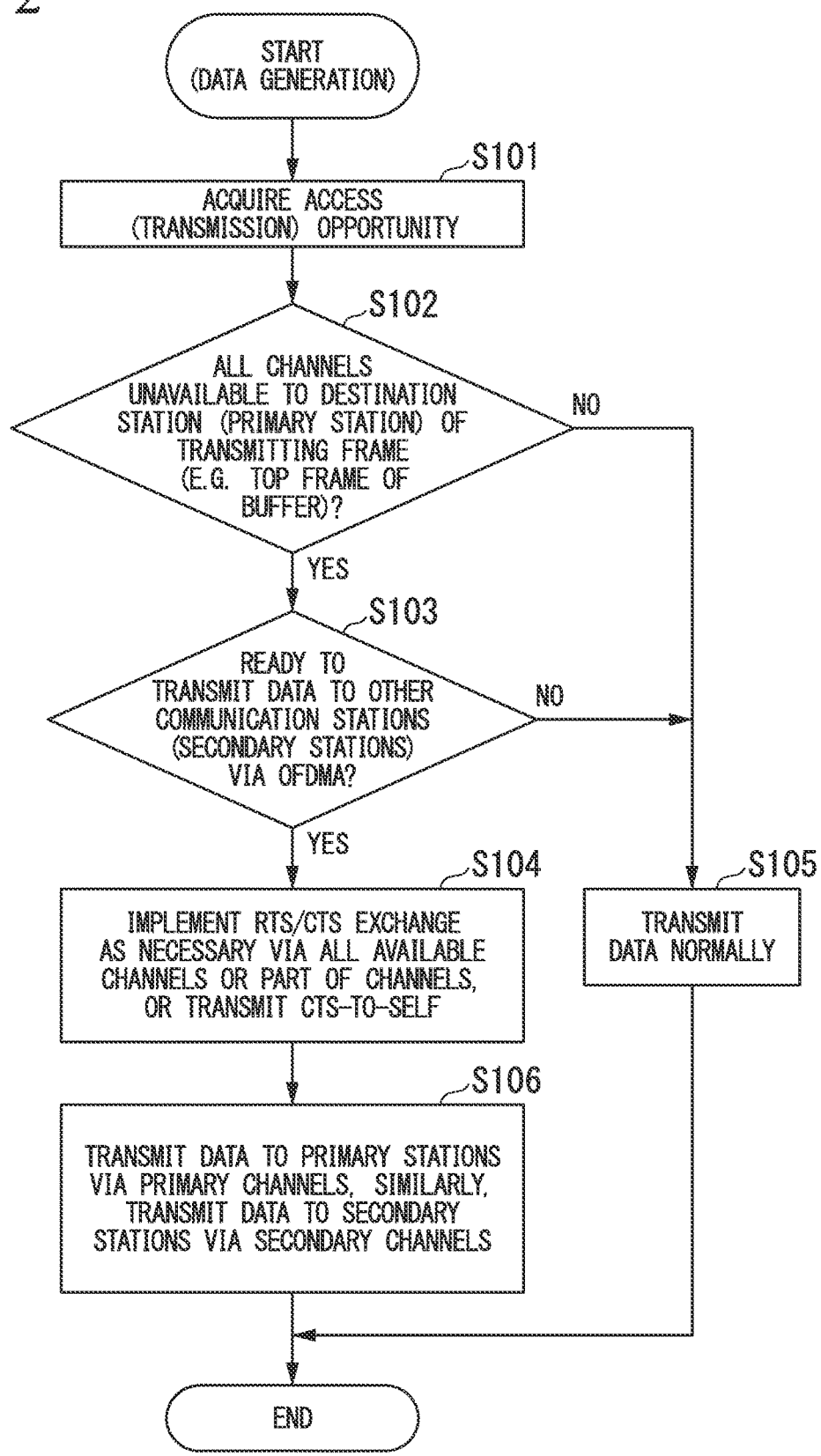
FIG. 2 is a flowchart showing a transmission process of a wireless base station AP1 shown in FIG. 1.

Next, the transmission process of the wireless base station AP1 shown in FIG. 1 will be described with reference to FIG. 2. FIG. 2 is a flowchart showing the transmission process of the wireless base station AP1 shown in FIG. 1. When the wireless base station AP1 generates data to be transmitted to other wireless communication stations (i.e. the wireless communication terminals STA11 to STA15), the controller 14 requests the transmission opportunity acquisition part 12 to acquire a transmission opportunity, and therefore the transmission opportunity acquisition part 12 acquires a transmission opportunity upon confirming that the wireless communication part 11 is rest in an idle state since no signals transmitted from other wireless communication stations are detected during the predetermined sensing period and the random backoff period (step S101).

Next, the controller 14 determines whether or not a wireless communication station (i.e. a primary wireless communication station) serving as a destination of a transmitting frame can transmit or receive signals via the same bandwidth as its own station with reference to the information stored in the information manager 13 (step S102).

Next, when step S102 determines that a primary wireless communication station can serve as a wireless communication station having an ability of receiving signals via the same bandwidth as its own station (step S102: NO), the controller 14 requests the wireless communication part 11 to transmit frames, and therefore the wireless communication part 11 transmits frames as usual according to a request (step S105) and then exits transmission.

When a decision result of step S102 shows that a primary wireless communication station cannot serve as a wireless communication station having an ability of receiving signals via the same bandwidth as its own station (step S102: YES), the controller 14 determines whether or not data can be transmitted to secondary wireless communication stations using OFDMA (step S103). When a decision result of step S103 reveals it impossible to implement OFDMA (step S103: NO), the controller 14 requests the wireless communication part 11 to transmit frames, and therefore the wireless communication part 11 transmits or receive frames as usual according to a request (step S105) and then exits transmission.

When some data remain to be transmitted to a secondary wireless communication station having an ability of implementing OFDMA (step S103: YES), the controller 14 may necessarily exchange RTS and CTS frames at a Non-HT Duplicate mode or transmit CTS-to-Self frames with a secondary wireless communication station having an ability of transmitting or receiving data using larger bands on all the available channels of the secondary wireless communication station or on part of channels corresponding to MCS used for transmission or power transmission, instead of a primary wireless communication station transmitting or receiving data on primary channels, thus implementing MAC protection (step S104).

Subsequently, the controller 14 requests the wireless communication part 11 to transmit frames, and therefore the wireless communication part 11 transmits data to a primary wireless communication station on primary channels while transmitting data to secondary wireless communication stations on secondary channels, thus exiting the TXOP period (step S106).

Figure 3:
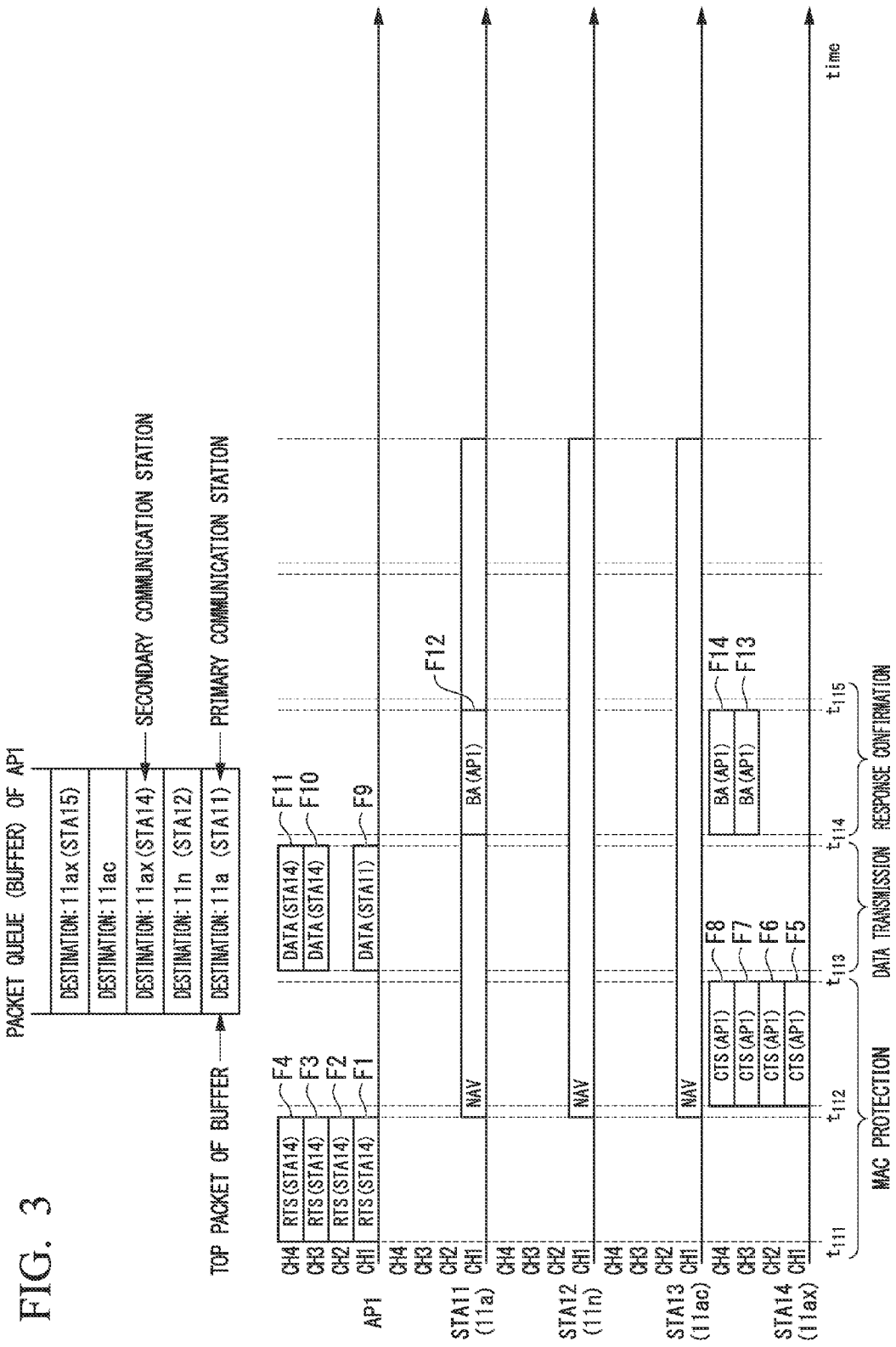
FIG. 3 is a time chart showing a frame sequence in which a TXOP-Holder wireless communication station (i.e. the wireless base station AP1) transmits a plurality of frames to other wireless communication stations (i.e. wireless communication terminals).

Next, the timing at which a TXOP-Holder wireless communication station (i.e. the wireless base station AP1) transmits frames will be described. FIG. 3 is a time chart showing a frame sequence in which a TXOP-Holder wireless communication station (i.e. the wireless base station AP1) transmits a plurality of frames to other wireless communication stations (or wireless communication terminals). In FIG. 3, the horizontal axis represents time while the vertical axis applied to each wireless communication station represents channels used for data transmission, wherein a series of Channel 1 (CH1), Channel 2 (CH2), Channel 3 (CH3), and Channel 4 (CH4) vertically aligned from the bottom is applied to each wireless communication station. The illustrations showing frame sequences solely show their related wireless communication terminals (where FIG. 3 shows the wireless communication terminals STA11 to STA14). Herein, symbols such as "(STA14)" included in each frame show destinations corresponding to wireless communication stations, wherein "(STA14)" shows a destination corresponding to the wireless communication terminal STA14.

Upon generating data destined to the wireless communication terminals STA11 to STA14, the wireless base station AP1 implements CSMA/CA (carrier sense) so as to acquire a transmission opportunity upon confirming that no signals transmitted from other wireless communication stations (i.e. the wireless communication terminals STA11 to STA15) are detected during the predetermined sensing period and the random backoff period. The wireless base station AP1 gets a transmission opportunity and thereby serves as a TXOP-Holder wireless communication station, thus transmitting frames.

The wireless base station AP1 transmits initiate frames, i.e. RTS frames F1 to F4, to the wireless communication terminals STA14 having an ability of performing communication using plenty of channels (time t111) instead of the wireless communication terminal STA11, solely using Channel 1 (i.e. a primary channel), which serves as a destination of a top frame listed in a packet queue (or a buffer) in the wireless base station AP1. Herein, the wireless base station Ap1 transmits an RTS frame at a Duplicate mode stipulated by the IEEE802.11n standard or the IEEE802.11ac standard, i.e. on all the 20 MHz channels (e.g. four 20 MHz channels) each of which can be applied to signals having channel bandwidths of 20 MHz.

Thus, the wireless communication terminals STA11 to STA14 receives an RTS frame transmitted from the wireless base station AP1. Since the wireless communication terminals STA11 to STA13 receives an RTS frame not destined to their own stations, they set a NAV period indicated by the continuous usage period information (Duration) included in the received RTS frame, thus preventing transmitting frames during the NAV period. Additionally, the wireless communication terminals STA11 to STA13 stores in the information manager 23 the information representing a wireless communication station obtaining TXOP corresponding to a source of transmitting the received RTS frame (i.e. the wireless base station AP1).

Upon receiving an RTS frame from the wireless base station AP1, the wireless communication terminal STA14 detects that the received RTS frame is destined to its own station, thus sending back CTS frames F5 to F8 to the wireless base station AP1 on channels not having NAV setting or on channels in which no signals are detected during the predetermined period (time $t_{112}$).

Upon receiving a CTS frame from the wireless communication terminal STA14, the wireless base station AP1 transmits frames F9 to F11 to the wireless communication terminals STA11 and STA14 using OFDMA (time $t_{113}$). Herein, the wireless base station AP1 transmits data to a primary wireless communication station via the entire frequency band available in the primary wireless communication station. Using other frequency bands, the wireless base station AP1 transmits data to the wireless communication terminal STA14 on another channel with interposing a guard band between channels as necessary. In FIG. 3, the wireless base station AP1 transmits data to the wireless communication terminal STA11 on Channel 1 while transmitting data to the wireless communication terminal STA14 on Channels 3, 4 without using Channel 2 serving as a guard band.

The wireless communication terminal STA11 properly receives frames destined thereto from the wireless base station AP1 and then sends back a BA frame F12 (or an ACK frame) (time $t_{114}$), thus exiting transmission/reception of frames. At this time, the wireless communication terminal STA11 sends back BA on the same channel which was used to receive signals from the wireless base station AP1.

On the other hand, the wireless communication terminal STA14 properly receives frames destined thereto from the wireless base station AP1 and then sends back BA frames F13 and F14 (or ACK frames) to the wireless base station AP1 (time $t_{114}$), thus exiting transmission/reception of frames. The wireless communication terminal STA14 sends back BA on the same secondary channels which were used to receive signals from the wireless base station AP1.

The conventional RTS/CTS exchange aims to block accessing from other terminals. The above RTS/CTS exchange aims to confirm frequency bands used for each wireless communication terminal using OFDMA while block accessing from other terminals.

Next, a variation of the frame sequence shown in FIG. 3 will be described below. The variation will be described differently with respect to a frame sequence used to implement MAC protection, a frame sequence used to transmit data, and a frame sequence used to confirm responses.

<Frame Sequence Used to Implement MAC Protection>

Figure 4:
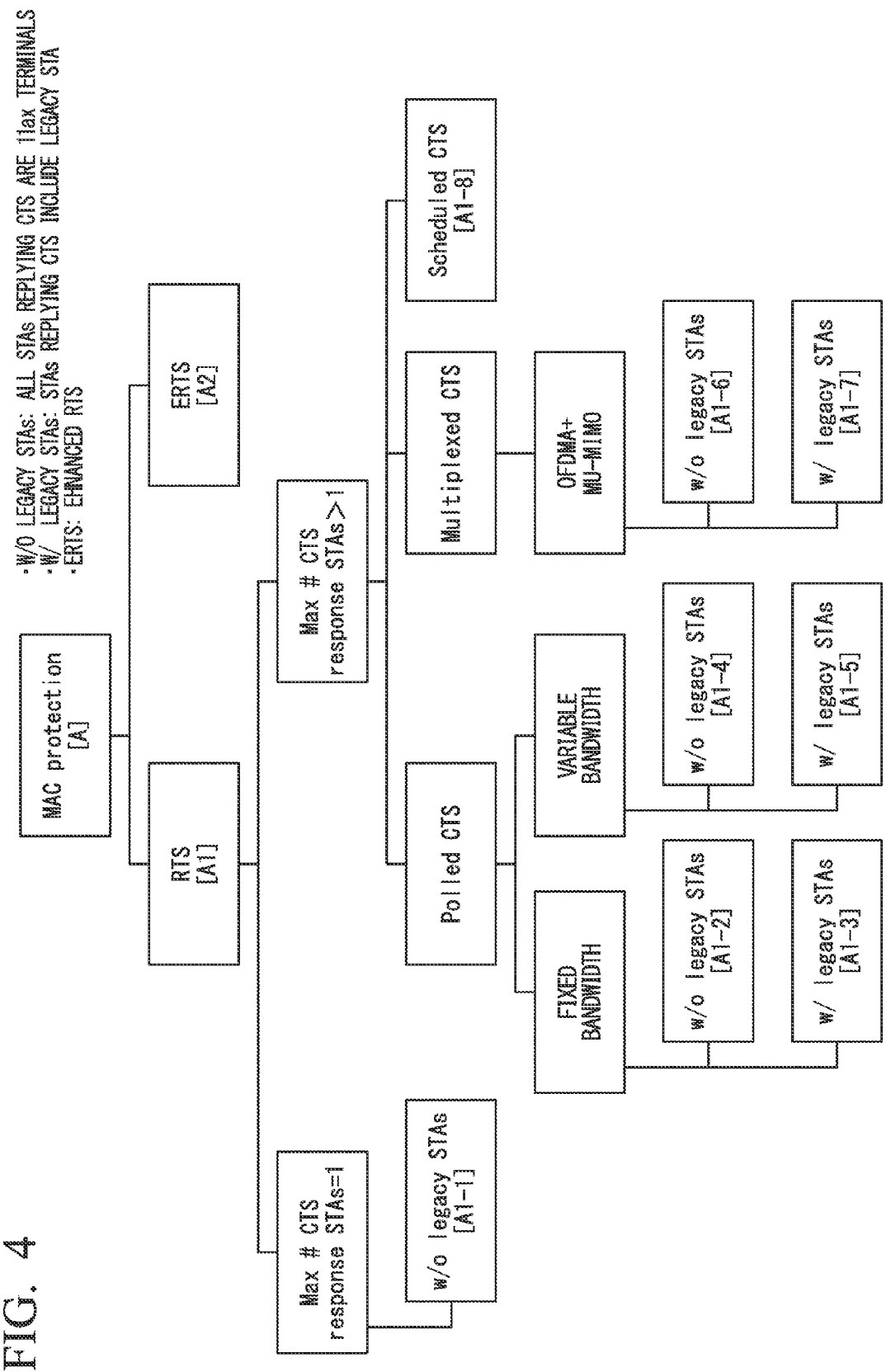
FIG. 4 is schematic diagram showing classifications of MAC protection.

Next, a variation of the frame sequence used to implement MAC protection shown in FIG. 3 will be described below. First, classifications of MAC protection will be described with reference to FIG. 4. FIG. 4 is a schematic illustration showing classifications of MAC protection. As shown in FIG. 4, MAC protection (identified as A) can be classified into the usage of normal RTS (identified as A1) and the usage of extended RTS (hereinafter referred to as ERTS: Extended RTS) (identified as A2). The usage of normal RTS (A1) can be subdivided into A1-1, A1-2, A1-3, A1-4, A1-5, A1-6, A1-7, and A1-8. The following descriptions are made based on these classifications. The usage of ERTS (A2) will be described later.

<A1-1>

Figure 5:
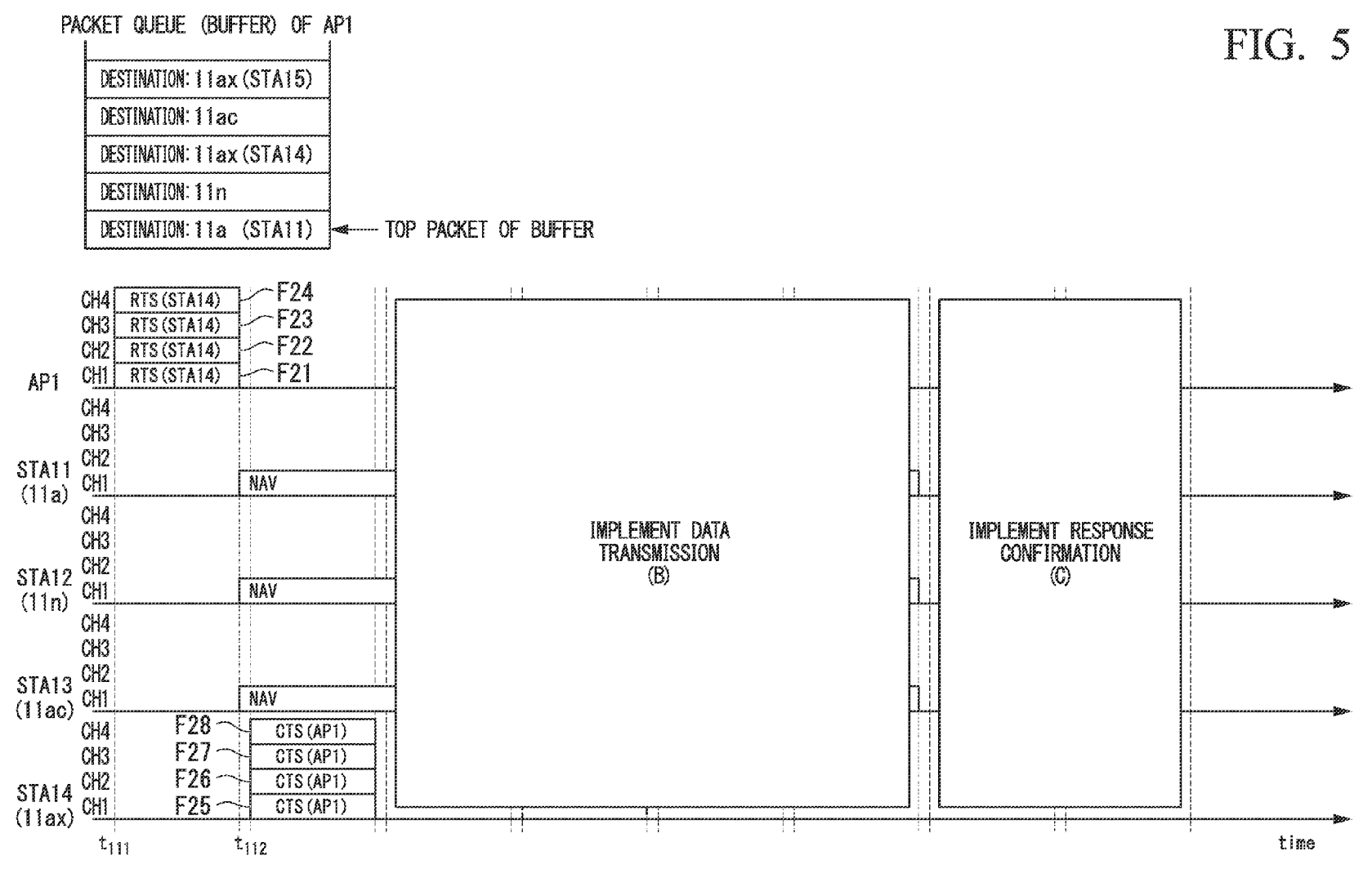

A frame sequence dedicated to the case (i.e. A1-1 shown in FIG. 4) where the number of wireless communication terminals responding to communication is one while a 11ax wireless communication terminal is devoted to a wireless communication terminal sending back CTS will be described with reference to FIG. 5. FIG. 5 is a time chart showing a frame sequence in which the number of wireless communication terminals responding to communication is one while a 11ax wireless communication terminal is devoted to a wireless communication terminal sending back CTS. In the following paragraphs regarding a variation of the frame sequence, differences from the foregoing frame sequence shown in FIG. 3 will be solely described while omitting detailed descriptions regarding the same operation as the frame sequence shown in FIG. 3.

When the number of wireless communication terminals responding to communication is one while a 11ax wireless communication terminal is devoted to a wireless communication terminal sending back CTS, the wireless base station AP1 firstly transmit RTS frames F21 to F24 (i.e. a Non-HT Duplicate mode, a Dynamic BW mode) to the 11ax wireless communication terminal (i.e. the wireless communication terminal STA14), irrespective of a top packet of a buffer destined to a 11a wireless communication terminal, on all the channels each having 20 MHz, thus reserving larger bands (time $t_{111}$). Herein, the Non-HT Duplicate mode duplicates 20 MHz signals on the frequency axis so as to transmit them in parallel; that is, this mode is able to decode all signals by solely receiving arbitrary 20 MHz signals. The Dynamic BW mode is used to send back CTS on un-busy channels among channels notified by RTS. Accordingly, the wireless communication terminal STA14 sends back CTS frames F25 to F28 on all channels (time $t_{112}$). This frame sequence is identical to the frame sequence shown in FIG. 3.

<A1-2>

Figure 6:
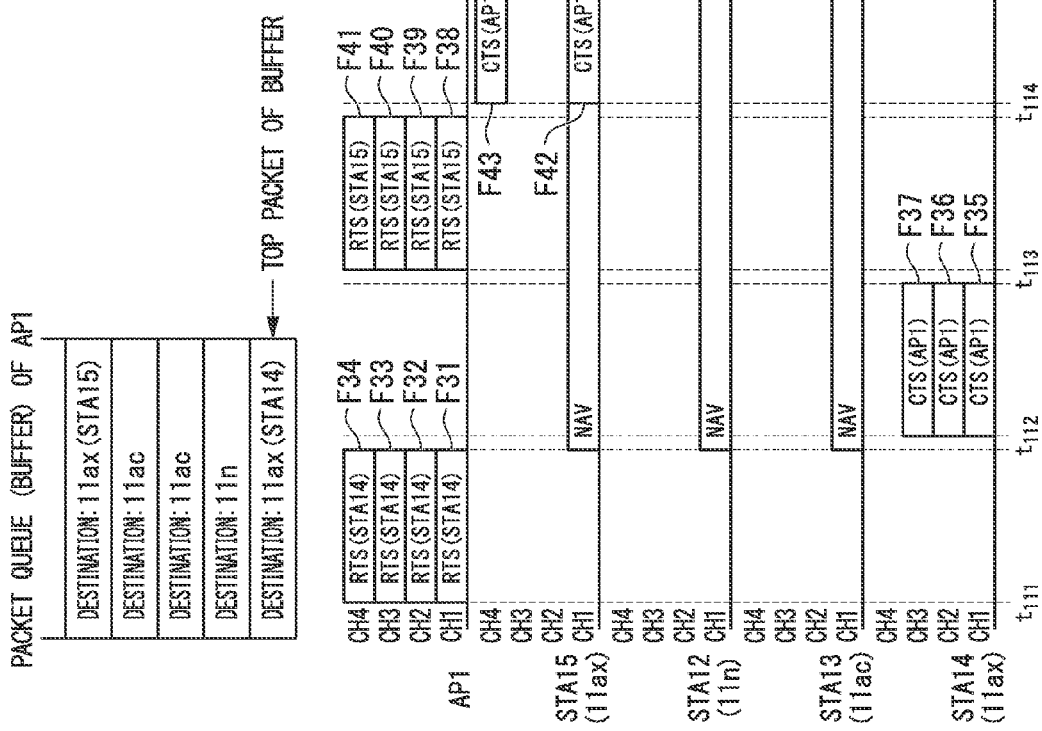
FIG. 6 is a time chart showing a frame sequence in which the number of wireless communication terminals responding to communication is two or more; an RTS frame is transmitted to wireless communication terminals via the same bandwidth; all the wireless communication terminals sending back CTS is OFDMA-adapted (11ax) terminals.

Next, a frame sequence dedicated to the case (A1-2 shown in FIG. 4) where the number of wireless communication terminals responding to communication is two or more; an RTS frame is transmitted to each wireless communication terminal via the same frequency band; all the wireless communication terminals sending back CTS are OFDMA-adapted (11ax) terminals will be described below. By using the same bandwidth, it is possible to normally transmit MAC protection signals via all the frequency bands, which are used to implement MAC protection (or RTS transmission), in the TXOP period. FIG. 6 is a time chart showing a frame sequence in which the number of wireless communication terminals responding to communication is two or more; an RTS frame is transmitted to each wireless communication terminal via the same frequency band; all the wireless communication terminals sending back CTS are OFDMA-adapted (11ax) terminals. This frame sequence is used to inquire OFDMA-adapted wireless communication terminals about channel usage states via RTS, to secure resources having larger bands, and to reallocate resource to other terminals. At this time, the wireless base station AP1 normally transmits frames on a set of channels used for first frame transmission (i.e. fixed bandwidths). FIG. 6 shows a frame sequence in which the number of terminals responding to communication is two or more, whereas FIG. 6 actually shows two wireless communication terminals alone. The similar frame sequence can be applied to the case where the number of terminals responding to communication is three or more. This analogy can be applied to other frame sequences in which the number of terminals is two or more, which will be described later.

First, the wireless base station AP1 transmits RTS frames F31 to F34 (i.e. the Non-HT Duplicate mode, the Dynamic BW mode) to the 11ax wireless communication terminal STA14 on all the channels each having 20 MHz, thus reserving larger bands (time $t_{111}$). Accordingly, the wireless communication terminal STA14 sends back CTS frames F35 to F37 (time $t_{112}$). The wireless base station AP1 retransmits RTS frames F38 to F41 to other wireless communication terminals (i.e. the wireless communication terminal STA15) (time $t_{113}$) although it receives CTS via part of bands (e.g. it detects interference occurring in the wireless communication terminal STA14 on CH4). Accordingly, the wireless communication terminal STA15 sends back CTS frames F42 and F43 (time $t_{114}$).

As described above, when the wireless base station AP1 does not receive CTS being sent back from a communication station serving as a destination of an RTS frame (i.e. the wireless communication terminal STA14) on part of channels (i.e. CH4), it transmits RTS to other wireless communication stations (i.e. the wireless communication terminal STA15) on all channels which were used for the preceding transmission of an RTS frame (i.e. a fixed bandwidth mode) so as to reconfirm the presence or absence of frame transmission on channels which are not used to send back CTS.

<A1-3(1)>

Figure 7:
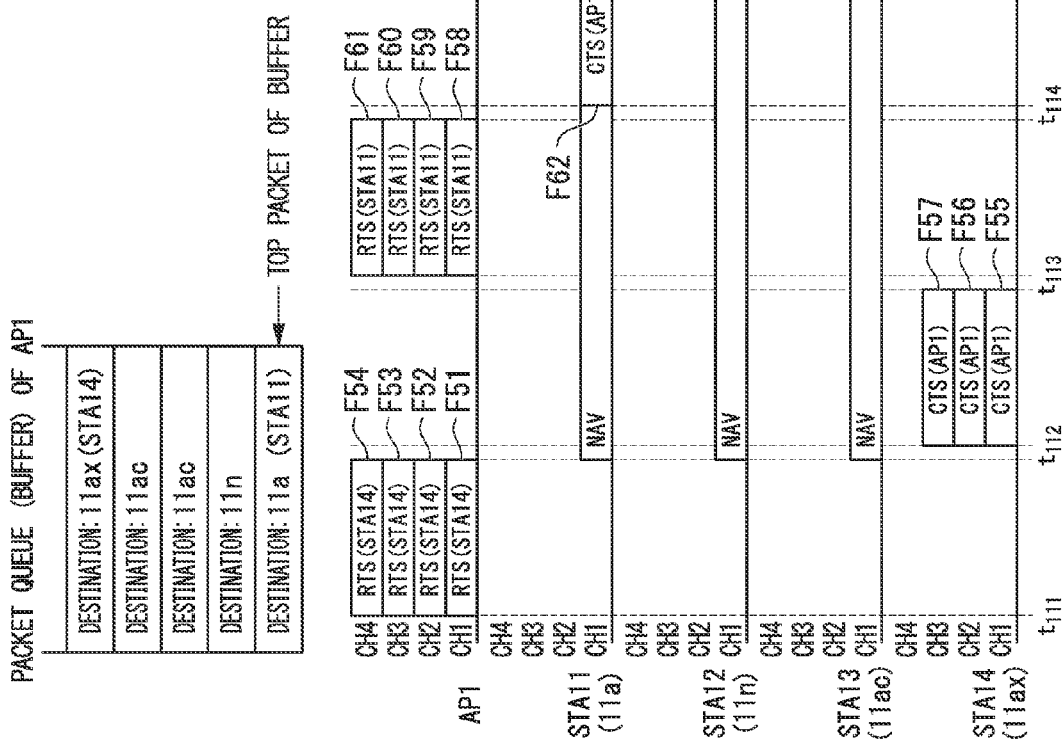
FIG. 7 is a time chart showing a frame sequence in which the number of wireless communication terminals responding to communication is two or more; an RTS frame is transmitted to wireless communication terminals via the same bandwidth; wireless communication terminals sending back CTS includes a legacy terminal not adapted to OFDMA.

Next, a frame sequence dedicated to the case (A1-3 shown in FIG. 4) where the number of wireless communication terminals responding to communication is two or more; an RTS frame is transmitted to each wireless communication terminal via the same bandwidth; wireless communication terminals sending back CTS includes a legacy terminal not adapted to OFDMA will be described with reference to FIG. 7. FIG. 7 is a time chart showing a frame sequence in which the number of wireless communication terminals responding to communication is two or more; an RTS frame is transmitted to each wireless communication terminal via the same bandwidth; wireless communication terminals sending back CTS includes a legacy terminal not adapted to OFDMA.

Firstly, the wireless base station AP1 transmits RTS frames F51 to F54 (i.e. the Non-HT Duplicate mode, the Dynamic BW mode) to the 11ax wireless communication terminal STA14, irrespective of a top packet of a packet queue destined to a 11a wireless communication terminal, on all the channels each having 20 MHz, thus reserving larger bands (time $t_{111}$). Accordingly, the wireless communication terminal STA14 sends back CTS frames F55 to F57 (time $t_{112}$).

Next, the wireless base station AP1 transmits RTS frames F58 to F61 used to confirm whether or not data can be transmitted to the 11a wireless communication terminal STA11 (time $t_{113}$). Any terminals adapted to 11e, 11s, and 11n are designed to store TXOP Holder in NAV settings; hence, they should automatically generate responses irrespective of NAV settings in response to a call from TXOP Holder. Upon receiving RTS, the wireless communication terminal STA11 sends back a CTS frame F62 (time $t_{114}$).

As described above, the wireless base station AP1 transmits RTS frames to secondary wireless communication stations on all channels so as to receive CTS being sent back thereto, and then it implements RTS/CTS exchange again with respect to a primary wireless communication station. Although the primary wireless communication station can solely use part of channels (i.e. CH1 only available in the above example), the wireless base station AP1 serving as a TXOP-Holder wireless communication station transmits RTS to the primary wireless communication station on all channels so as to prevent interruption from occurring in secondary channels due to third wireless communication stations.

<A1-3(2)>

Figure 8:
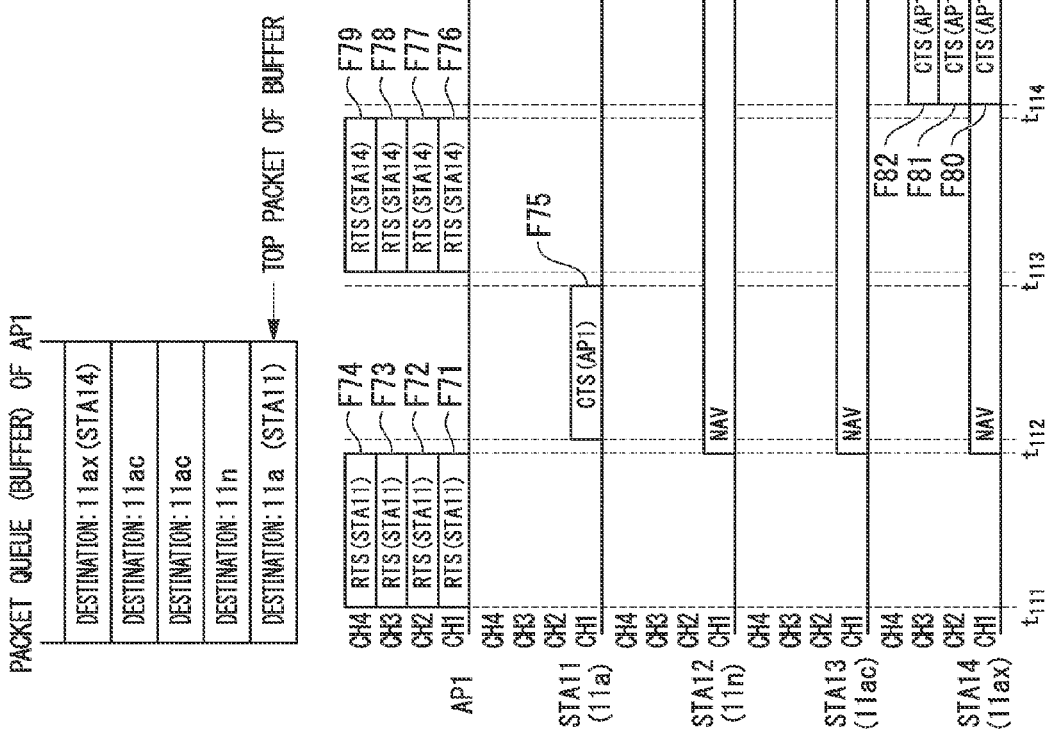
FIG. 8 is a time chart showing a variation of the frame sequence shown in FIG. 7.

Next, a variation of the frame sequence shown in FIG. 7 will be described with reference to FIG. 8. FIG. 8 is a time chart showing a variation of the frame sequence shown in FIG. 7. The frame sequence shown in FIG. 8 allows the wireless base station AP1 to firstly transmit RTS to legacy terminals on all channels.

The wireless base station AP1 transmits RTS frames F71 to F74 (i.e. the Non-HT Duplicate mode) to the 11a wireless communication terminal STA11 on all channels each having 20 MHz, thus reserving larger bands (time $t_{111}$). Accordingly, the wireless communication terminal STA11 sends back a CTS frame F75 (time $t_{112}$). Next, the wireless base station AP1 transmits RTS frames F76 to F79 (i.e. the Non-HT Duplicate, Dynamic mode) to the 11ax wireless communication terminal STA14 so as to check the existence of secondary channels receivable using OFDMA (time $t_{113}$). Accordingly, the wireless communication terminal STA14 sends back CTS frames F80 to F82 (time $t_{114}$).

Thus, when the wireless base station AP1 does not receive CTS being sent back from communication stations serving as destinations of RTS frames on part of channels, it transmits RTS to other wireless communication terminals on all channels which were used for preceding transmission of RTS frames (i.e. the fixed bandwidth mode) so as to reconfirm whether or not frames can be transmitted on channels which are not used to send back CTS.

<A1-8>

Next, a frame sequence dedicated to the case (A1-8 shown in FIG. 4) where the number of wireless communication terminals responding to RTS frames being transmitted using OFDMA is two or more while wireless communication terminals send back CTS frames at the predetermined times respectively will be described with reference to FIG. 9. FIG. 9 is a time chart showing a frame sequence in which the number of wireless communication terminals responding to RTS frames being transmitted using OFDMA is two or more while wireless communication terminals send back CTS frames at the predetermined times respectively. This frame sequence is directed to a scheduling type of CTS replies using conventional RTS, wherein 11ax wireless communication terminals may receive RTS on secondary channels so as to send back CTS a period of CTS+2SIFS later.

The wireless base station AP1 uses a primary channel to transmit an RTS frame F91 to a legacy terminal while using secondary channels to transmit RTS frames F92 to F94 to 11ax wireless communication terminals, wherein it transmits RTS frames using OFDMA (time $t_{111}$). Accordingly, the wireless communication terminal STA11 sends back a CTS frame F95 while the 11ax wireless communication terminal STA14 determines whether or not any RTS frames destined to the 11ax wireless communication terminals are being sent on secondary channels on the basis of RTS frames being sent on the primary channel, thus sending back CTS frames F96 to F98.

Figure 10:
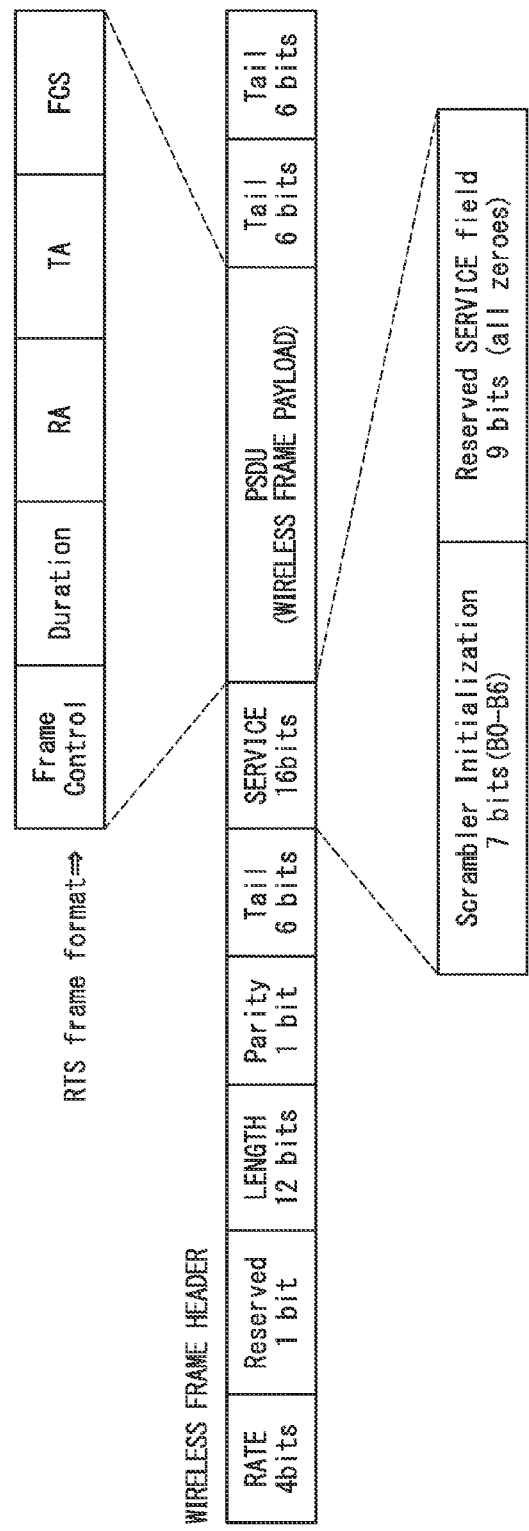
FIG. 10 is a schematic diagram showing an RTS frame format.

An RTS frame format will be described with reference to FIG. 10. FIG. 10 is a schematic diagram showing an RTS frame format. The RTS frame uses Scrambler Initialization of a wireless frame header and TA of a payload so as to notify a channel bandwidth copying an RTS frame and a Static/Dynamic BW mode.

All bits of Scrambler Initialization are set to zeros with respect to 11a/n wireless communication stations, while all bits of Scrambler Initialization are set to zeros with respect to 11ac wireless communication stations on the condition that the top bit of TA is zero. When the top bit of TA is 1, it is necessary to notify RTS bandwidths and Static/Dynamic BW modes in accordance with Table 1.

TABLE 1

| Transmission/ Reception | Conditions of Transmission STA, Reception STA | 7bit Format of Scrambler Initialization | | |
|---|---|---|---|---|
| | | B0-B3 | B4 | B5, B6 |
| Transmission | Solely Support Static BW | Random Sequence (B0-B6 are not set to all zeroes) | | Bandwidths used to transmit RTS Frames (20/40/80/160 MHz) |
| | Support Dynamic BW | Random Sequence (B0-B6 are not set to all zeroes) | Display whether or not to request CTS frames via Dynamic BW | |

TABLE 1-continued

| Transmission/ Reception | Conditions of Transmission STA, Reception STA | 7bit Format of Scrambler Initialization | | |
|---|---|---|---|---|
| | | B0-B3 | B4 | B5, B6 |
| Reception | Support Dynamic BW | (No Reference) | Display whether or not received RTS frames request CTS Frame via Dynamic BW | Transmission Bandwidths displayed via RTS frames |

The present embodiment uses B1-B3 of Scrambler Initialization to implement a method to notify whether or not RTS frames different from an RTS frame of a primary channel are transmitted on secondary channels according to OFDMA by use of an RTS frame of a primary channel. All bits are set to zeros with respect to 11ax wireless communication terminals on the condition that the top bit of TA (Individual/Group bit) is zero. When the top bit of TA is 1, it is necessary to notify RTS bandwidths, Static/Dynamic BW modes, and decisions as to whether or not RTS frames of secondary channels differ from an RTS frame of a primary channel in accordance with the following formats. In the case of 80 MHz, for example, it is necessary to implement extension shown in Table 2. Legacy terminals not supporting OFDMA communication using RTS frames are designed to establish NAV settings by solely decoding an RTS frame of a primary channel without referring to the information of B0-B3; hence, it is possible to secure backward compatibility.

In the receiver side, an 11ax wireless communication terminal receives an RTS frame in which the top address of TA is 1 on a primary channel so as to determine whether or not a different RTS frame different from an RTS frame of a primary channel is transmitted on a secondary channel with reference to B1-B3 of Scrambler Initialization. When a different RTS frame is sent on a secondary channel, the 11ax wireless communication terminal decodes the information of a secondary channel as well, wherein it may send back a CTS frame on the entirety of or part of a secondary channel when the RTS frame is destined thereto.

As described above, the wireless base station transmits an RTS frame to destination stations based on the existing standards (IEEE802.11a, 11n, 11ac) so as to request them to send back CTS frames while requesting OFDMA-adapted destination stations to send back CTS frames on secondary channels, and therefore it is possible to confirm whether or not frames can be transmitted to all destination stations by

TABLE 2

| Transmission/ Reception | Conditions of Transmission STA, Reception STA | | 7 bit of Scrambler Initialization | | | |
|---|---|---|---|---|---|---|
| | | | B0 | B1-B3 | B4 | B5, B6 |
| Transmission | Solely Support Static BW | | Random Sequence (B0-B6 are not set to all zeroes) | | Display whether or not to request CTS frames via Dynamic BW | Bandwidths used to transmit RTS frames |
| | Support Dynamic BW | Not Support OFDMA Transmission of RTS Frame | Random Sequence (which is set within range not setting B0-B6 to all zeroes) | | | |
| | | Support OFDMA Transmission of RTS Frame | Random Sequence (which is set within range not setting B0-B6 to all zeroes) | Notify whether or not RTS frames different from primary channels are sent via secondary channels precluding primary channels | | |
| Reception | Support Dynamic BW | Not Support OFDMA Transmission of RTS Frame | (No Reference) | | Display whether or not received RTS frames request CTS frames via Dynamic BW | Transmission Bandwidths displayed via RTS frames |
| | | Support OFDMA Transmission of RTS Frame | No Reference | Determine whether or not RTS frames different from primary channels are sent via secondary channels precluding primary channels | | |

Next, an example of a format for B1-B3 will be described. Values are set to sub-channels, each having 20 MHz, in an order from lower bands to higher bands within the entire frequency range of RTS frames in such a way that 1 is input to each sub-channel when the same RTS of a primary channel is transmitted using OFDMA while 0 is input to each sub-channel in other cases (where the same RTS frame is transmitted). In this connection, it is possible to employ 1-bit information indicating whether or not one or more RTS frames are sent on all the secondary channels other than a primary channel.

use of a single RTS frame, and it is possible to reduce overheads in wireless channels.

Figure 11:
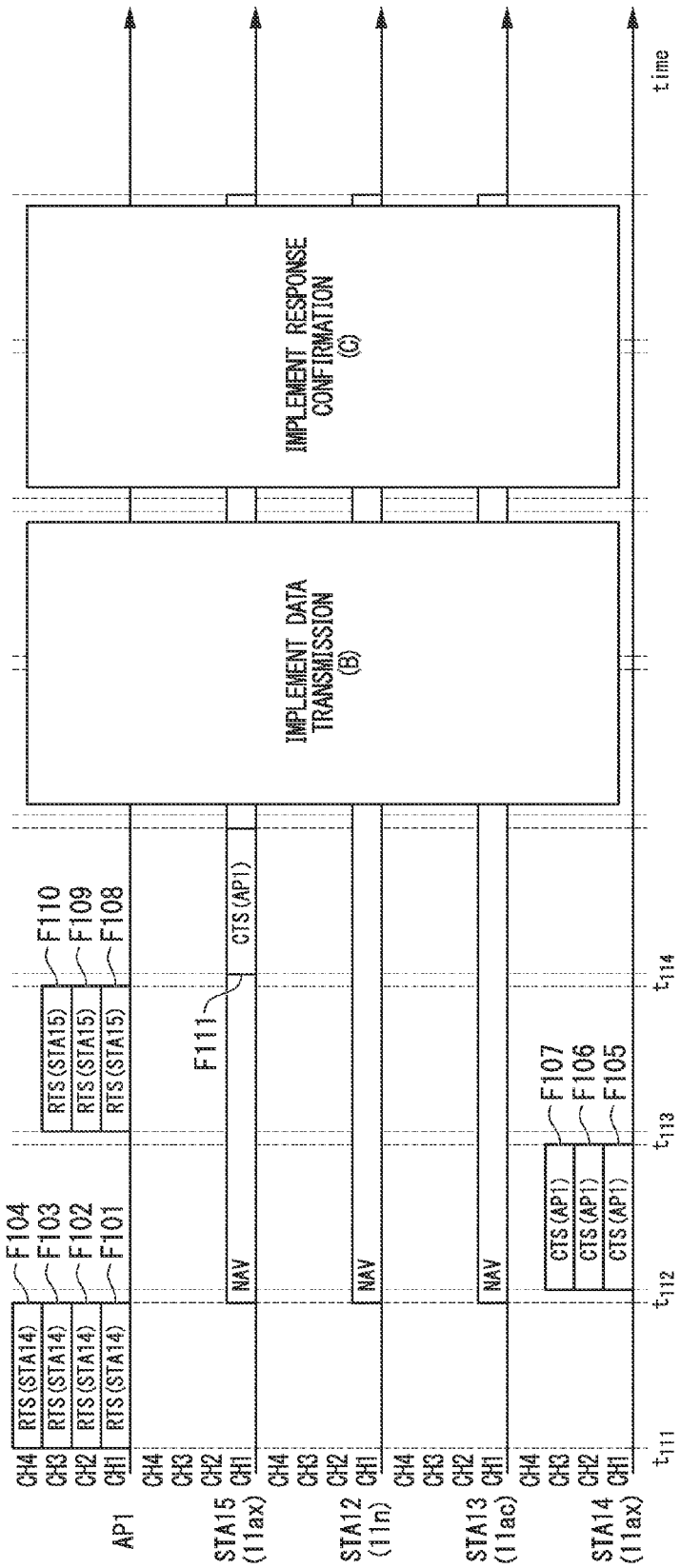
FIG. 11 is a time chart showing a frame sequence in which the number of wireless communication terminals responding to communication is two or more; an RTS frame is transmitted to wireless communication terminals; al the wireless communication terminals sending back CTS are 11ax wireless communication terminals; a bandwidth used to transmit a second RTS frame onwards is set to be equal to or smaller than a bandwidth confirmed due to reception of a preceding CTS frame.

Next, a frame sequence dedicated to the case (A1-4 shown in FIG. 4) where the number of wireless communication terminals responding to communication is two or more; an RTS frame is transmitted to wireless communication terminals; all the wireless communication terminals sending back CTS are 11ax wireless communication terminals; the bandwidth used to transmit a second RTS frame onwards is set to be equal to or smaller than the bandwidth confirmed due to preceding reception of a CTS frame will be described with reference to FIG. 11. FIG. 11 is a time chart showing a frame sequence in which the number of wireless communication terminals responding to communication is two or more; an RTS frame is transmitted to wireless communication terminals; all the wireless communication terminals sending back CTS are 11ax wireless communication terminals; the bandwidth used to transmit a second RTS frame onwards is set to be equal to or smaller than the bandwidth confirmed due to preceding reception of a CTS frame. This frame sequence is designed to secure resources via larger bands and to reallocate resources to other wireless communication terminals, wherein the wireless base station AP1 determines busy channels, which are not used to send back CTS, so as to prevent transmitting RTS frames on busy channels, thus realizing variable bandwidths.

The wireless base station AP1 transmits RTS frames F101 to F104 (i.e. the Non-HT Duplicate mode, the Dynamic BW mode) to the 11ax wireless communication terminal STA14 on all channels each having 20 MHz, thus reserving larger bands (time $t_{111}$). Accordingly, the wireless communication terminal STA14 sends back CTS frames F105 to F107 (time $t_{112}$). The wireless base station AP1 determines busy channels, which are not used to send back CTS, so as to transmit RTS frames F108 to F110 without using busy channels for RTS transmission (time $t_{113}$). Accordingly, the wireless communication terminal STA15 sends back a CTS frame F112 (time $t_{114}$).

As described above, it is possible to implement a variable bandwidth mode which may reduce (or limit) the channel bandwidth of the wireless base station AP1 compared to the channel bandwidth of A1-2. When the wireless communication terminal STA14 sends back CTS on Channels 1-3 in response to RTS from the wireless base station AP1, the wireless base station AP1 may transmit the next RTS frame on Channels 1-3. That is, the wireless base station AP1 transmits an RTS frame to another wireless communication terminal STA15 on channels, which are used to send back CTS, without using other channels which are not used to send back CTS.

<A1-5>

Figure 12:
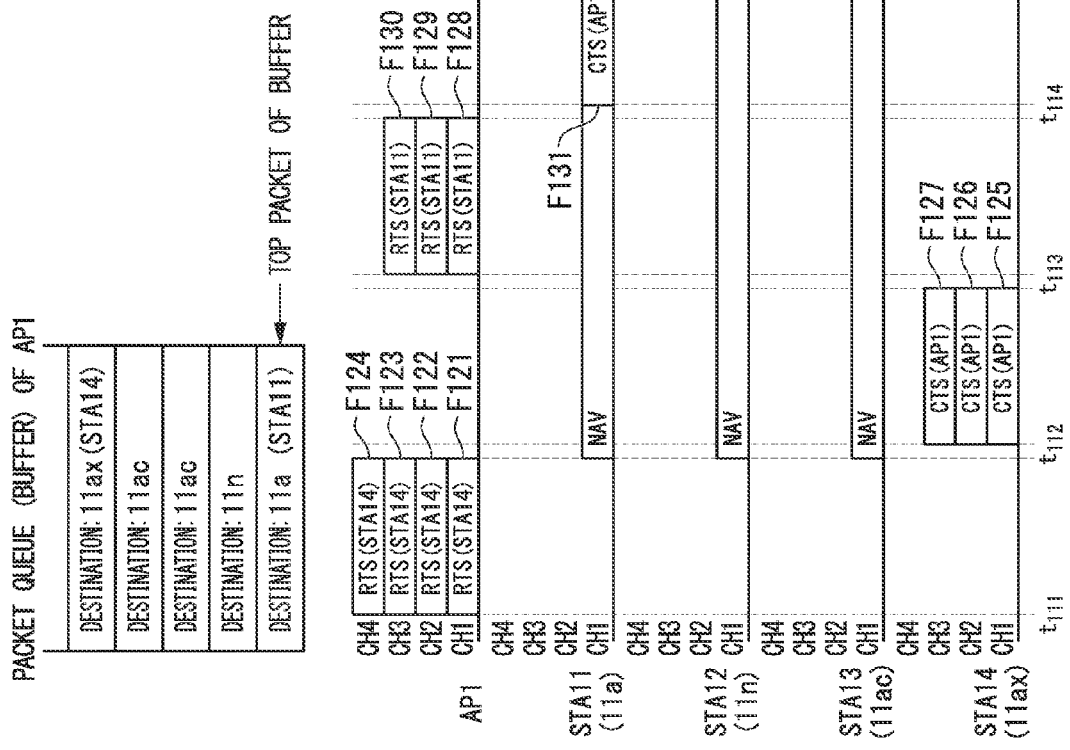
FIG. 12 is a time chart showing a frame sequence in which the number of wireless communication terminals responding to communication is two or more; an RTS frame is transmitted to wireless communication terminals; wireless communication terminals sending back CTS includes a legacy terminal; a bandwidth used to transmit a second RTS frame onwards is set to be equal to or smaller than a bandwidth confirmed due to reception of a preceding CTS frame.

Next, a frame sequence dedicated to the case (A1-5 shown in FIG. 4) where the number of wireless communication terminals responding to communication is two or more; an RTS frame is transmitted to wireless communication terminals; wireless communication terminals sending back CTS include legacy terminals; the bandwidth used to transmit a second RTS frame onwards is set to be equal to or smaller than the bandwidth confirmed due to preceding reception of a CTS frame will be described with reference to FIG. 12. FIG. 12 is a time chart showing a frame sequence in which the number of wireless communication terminals responding to communication is two or more; an RTS frame is transmitted to wireless communication terminals; wireless communication terminals sending back CTS include legacy terminals; the bandwidth used to transmit a second RTS frame onwards is set to be equal to or smaller than the bandwidth confirmed due to preceding reception of a CTS frame. This frame sequence is roughly identical to that of A1-4 except that it allows for the existence of non-OFDMA-adapted wireless communication stations (i.e. legacy terminals).

The wireless base station AP1 transmits RTS frames F121 to F124 (i.e. the Non-HT Duplicate mode, the Dynamic BW mode) to the flax wireless communication terminal STA14, irrespective of the top packet of a packet queue destined to 11a wireless communication terminals, on all channels each having 20 MHz, thus reserving larger bands (time $t_{111}$). Accordingly, the wireless communication terminal STA14 sends back CTS frames F125 to F127 (time $t_{112}$).

Next, the wireless base station AP1 transmits RTS frames F128 to F130 used to confirm whether or not data can be transmitted to the 11a wireless communication terminal STA11 (time $t_{113}$). Accordingly, the wireless communication terminal STA11 sends back a CTS frame F131 (time $t_{114}$).

As described above, the wireless base station confirms whether or not to transmit frames to destination stations which can reply to frames by dynamically setting frequency bands in the former part of sequences, thus reallocating the secured resources to other terminals. Thus, it is possible to reallocate resources to both the OFDMA-adapted destination stations which can variably set bandwidths and the destination stations based on the existing standards (11a, 11n) having fixed bandwidths.

<A1-6(1)>

Figure 13:
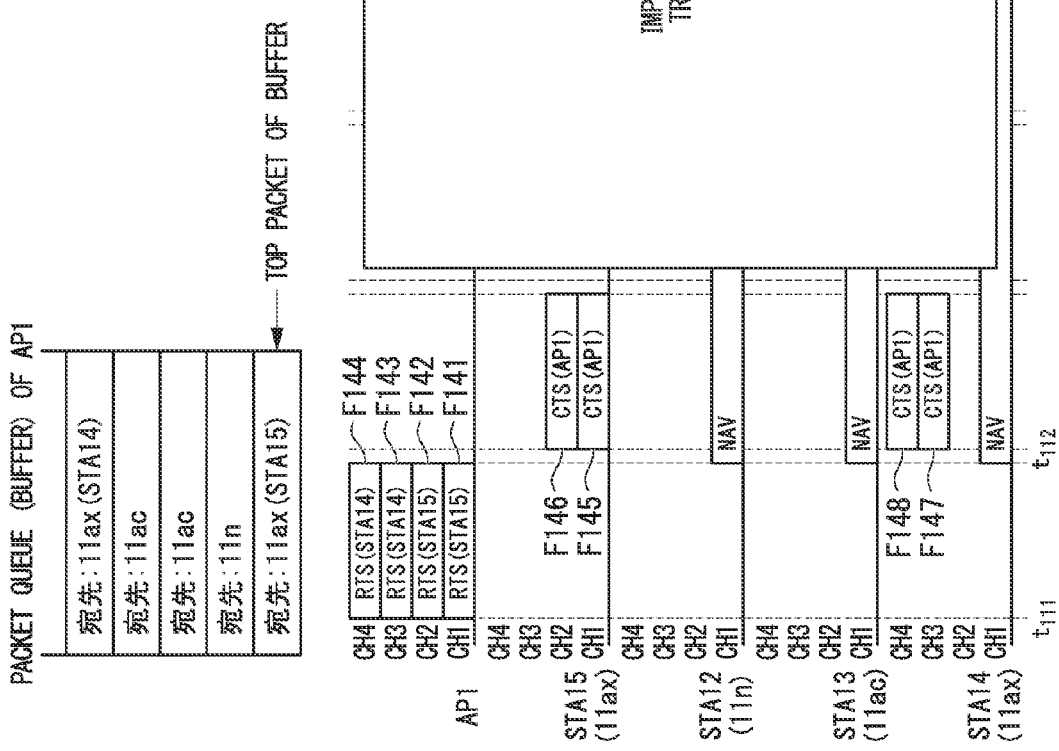
FIG. 13 is a time chart showing a frame sequence in which the number of wireless communication terminals responding to communication is two or more; all the wireless communication terminals sending back CTS is 11ax wireless communication terminals; a CTS frame is transmitted using OFDMA.

Next, a frame sequence dedicated to the case (A1-6 shown in FIG. 4) where the number of wireless communication terminals responding to communication is two or more; all the wireless communication terminals sending back CTS are 11ax wireless communication terminals; CTS frames are transmitted using OFDMA will be described with reference to FIG. 13. FIG. 13 is a time chart showing a frame sequence in which the number of wireless communication terminals responding to communication is two or more; all the wireless communication terminals sending back CTS are 11ax wireless communication terminals; CTS frames are transmitted using OFDMA. This frame sequence adopts CTS multiplexing using UL-OFDMA, which implements RTS/CTS exchange on channels fixed to wireless communication terminals. Herein, UL-OFDMA is a known technology disclosed in a document, K. Kim, et al, "Joint Subcarrier and Power Allocation in Uplink OFDMA Systems", IEEE Communications Letters, Vol. 9, No. 6, June 2005. CTS frames do not include fields used to identify source terminals, but the wireless base station AP1 identifies source wireless communication terminals with reference to channels used to receive CTS frames.

First, the wireless base station AP1 simultaneously transmits RTS frames F143 and F144 to the wireless communication terminal STA14 using OFDMA while transmitting RTS frames DF141 and F142 to the wireless communication terminal STA15 (time $t_{111}$). Accordingly, the wireless communication terminals STA14 and STA15 send back CTS frames F145 to F148 (time $t_{112}$).

Thus, it is possible to transmit RTS frames to different wireless communication terminals using downlink OFDMA. The wireless communication terminals STA14 and STA15 receiving RTS frames send back CTS frames using uplink OFDMA. It is possible to simultaneously transmit CTS frames since the wireless communication stations send back CTS frames on channels which are used to receive RTS frames.

<A1-6(2)>

Figure 14:
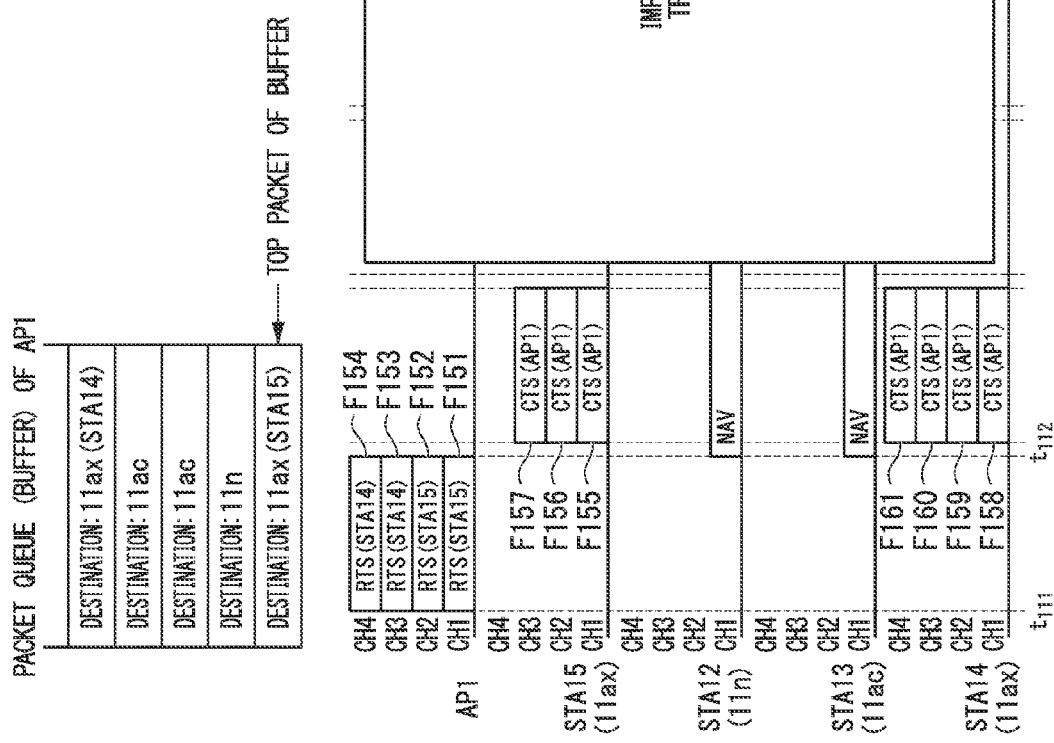
FIG. 14 is a time chart showing a frame sequence in which the number of wireless communication terminals responding to communication is two or more; all the wireless communication terminals sending back CTS is 11ax wireless communication terminals; a CTS frame is transmitted using MU-MIMO.

Next, a variation of the frame sequence shown in FIG. 13 will be described with reference to FIG. 14. FIG. 14 is a time chart showing a frame sequence in which the number of wireless communication terminals responding to communication is two or more; all the wireless communication terminals sending back CTS are 11ax wireless communication terminals; a CTS frame is transmitted using MU-MIMO. This frame sequence is designed to perform CTS multiplexing using UL-OFDMA and SDMA, wherein it is necessary to determine wireless communication terminals serving as transmission sources via signal processing using CSD of PHY because it is difficult for the wireless base station AP1 to determine which wireless communication terminal sends back CTS due to lack of a field used for identifying source terminals in a CTS frame.

The wireless base station AP1 simultaneously transmit RTS frames F153 and F154 to the wireless communication terminal STA14 while transmitting RTS frames F151 and F152 to the wireless communication terminal STA15 using OFDMA (time $t_{111}$). Accordingly, the 11ax wireless communication terminals STA14 and STA15 send back CTS frames F158-F161 and F155-F157 on idle channels (time $t_{112}$).

Figure 15:
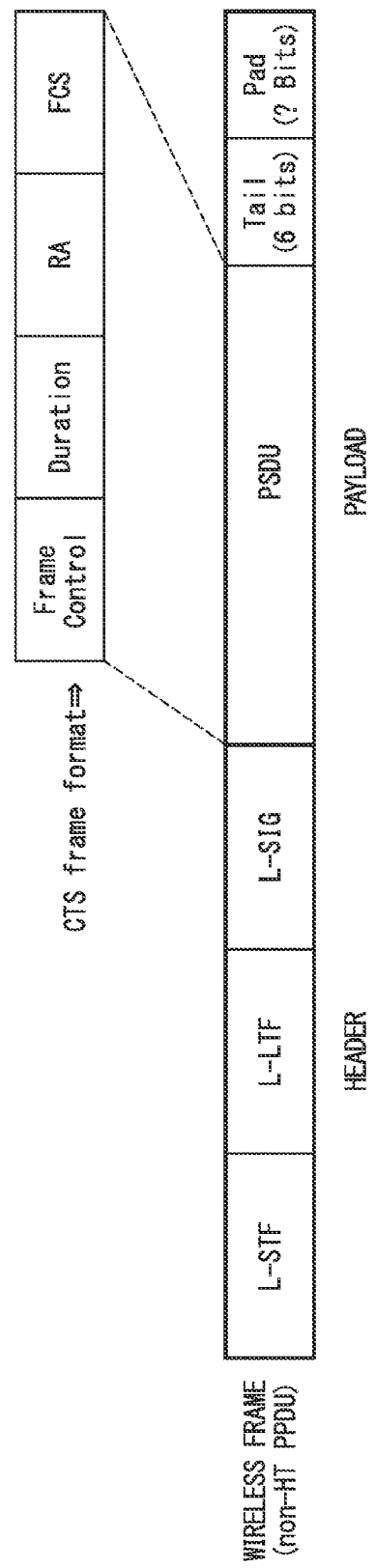
FIG. 15 is a schematic diagram showing a format of a CTS frame in 11a/n/ac.

Herein, CTS frames used for CTS reply will be described. FIG. 15 is a schematic diagram showing a CTS frame format according to 11a/n/ac. The CTS frame shown in FIG. 15 cannot be simply used for spatial multiplexing transmission. This is because L-LTF is solely used for channel estimation but it includes substantially the information of an OFDM symbol, which is not separable and which cannot exhibit orthogonality among spatial streams; hence, it is impossible to estimate MIMO channels, and therefore it is impossible to accurately decode the subsequent payload. Herein, it is necessary to change a header since a header of Non-HT PPDU cannot determine source terminals. Specifically, it is necessary to use a VHT frame format.

Figure 16:
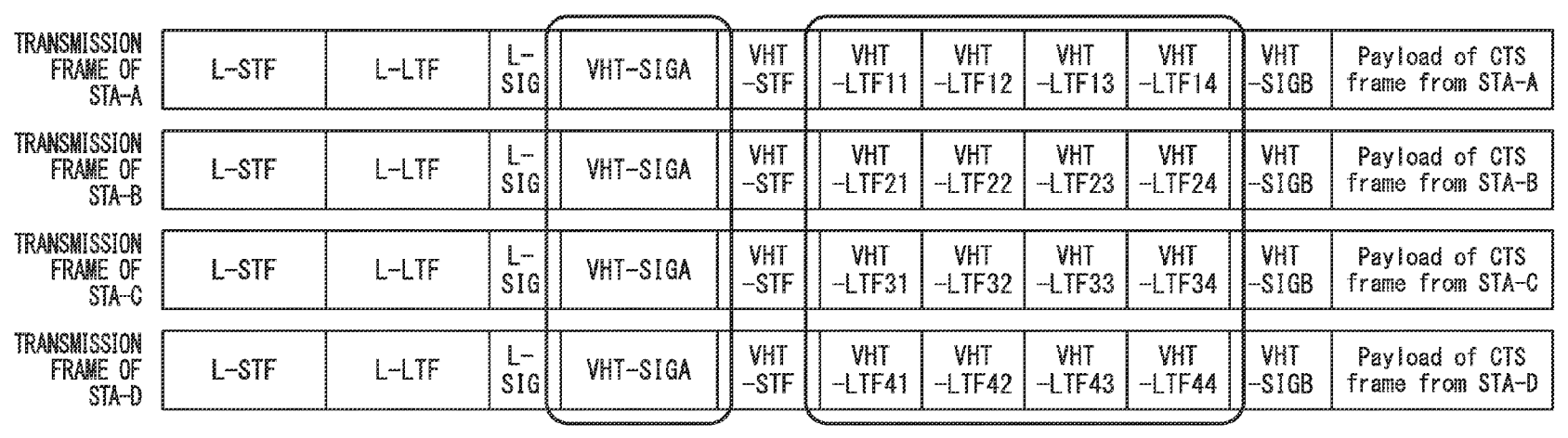

FIG. 16 is a schematic diagram showing a transmission frame format which is used to transmit CTS frames via spatial multiplexing with four wireless communication terminals (STA). Herein, VHT-SIG-A may include two pieces of information in order to achieve spatial multiplexing transmission. First information is list information of wireless communication terminals subjected to simultaneous transmission or its following information (e.g. group IDs). Second information indicates the number of spatial streams, transmitted from each wireless communication terminal, and their serial numbers. In the case of FIG. 16, one stream (i.e. a first spatial stream) is assigned to a wireless communication terminal (STA-A); one stream (i.e. a second spatial stream) is assigned to a wireless communication terminal (STA-B); one stream (i.e. a third spatial stream) is assigned to a wireless communication terminal (STA-C); one stream (i.e. a fourth spatial stream) is assigned to a wireless communication terminal (STA-D). It is possible to perform SISO decoding on receives signals each multiplexing a plurality of signals since the same information of VHT-SIG-A is assigned to all spatial streams. The wireless base station decodes UL-MU-MIMO signals with reference to the information.

The wireless communication terminals transmit frames according to the predetermined pattern in such a way that an inverse matrix will be achieved using a 4×4 matrix for each subcarrier consisting of sixteen elements of VHT-LTF11 to VHT-LTF44. An example of values assigned to sixteen elements shown in FIG. 16 is as follows.

VHT-LTF11=+1
VHT-LTF12=+1
VHT-LTF13=−1
VHT-LTF14=+1
VHT-LTF21=+1
VHT-LTF22=−1
VHT-LTF23=+1
VHT-LTF24=+1
VHT-LTF31=−1
VHT-LTF32=+1
VHT-LTF33=+1
VHT-LTF34=+1
VHT-LTF41=+1
VHT-LTF42=+1
VHT-LTF43=+1
VHT-LTF44=−1

The wireless base station estimates states of propagation paths using MU-MIMO by use of VHT-LTF. It is unnecessary to include source addresses in payloads since the wireless base station can read from VHT-SIG-A the correspondence relationship between spatial streams and wireless communication terminals, and therefore it is possible to determine wireless communication terminals transmitting CTS frames even though the same bit information is assigned to VHT-SIG-A. For example, it is possible to determine that a third CTS frame is transmitted from a wireless communication terminal (STA-C) when the third CTS frame is successfully decoded.

Thus, it is possible to send back CTS frames on channels, which are not subjected to NAV settings and which are not used to receive signals for the predetermined time, among available channels in addition to channels used to receive RTS frames.

<A1-7(1)>

Figure 17:
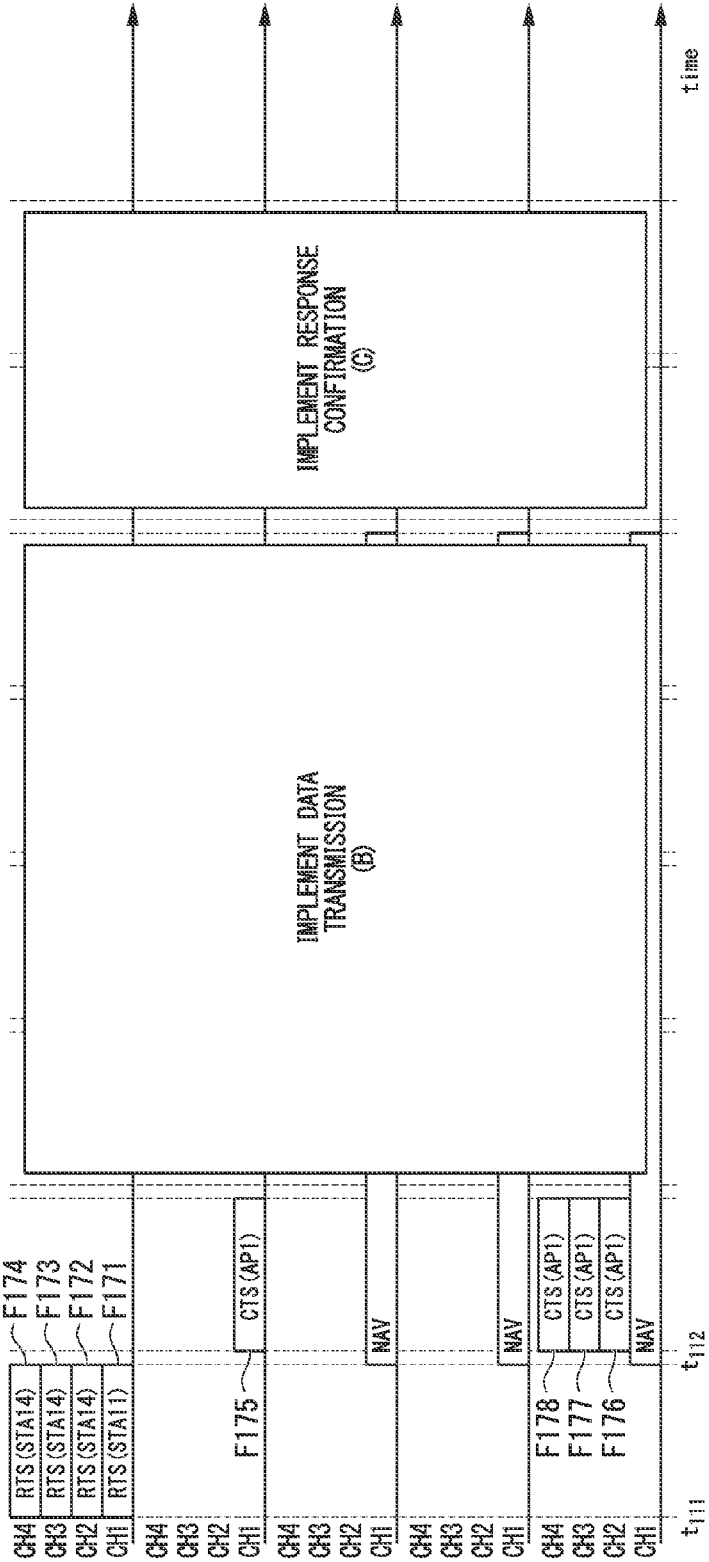
FIG. 17 is a time chart showing a frame sequence in which the number of wireless communication terminals is two or more; wireless communication terminals sending back CTS includes a legacy terminal; a CTS frame is transmitted using OFDMA.

Next, a frame sequence dedicated to the case (A1-7 shown in FIG. 4) where the number of wireless communication terminals responding to communication is two or more; wireless communication terminals sending back CTS include legacy terminals; a CTS frame is transmitted using OFDMA will be described with reference to FIG. 17. FIG. 17 is a time chart showing a frame sequence in which the number of wireless communication terminals responding to communication is two or more; wireless communication terminals sending back CTS include legacy terminals; a CTS frame is transmitted using OFDMA. This frame sequence adopts CTS multiplexing using UL-OFDMA, which implements RTS/CTS exchange using channels fixed to wireless communication terminals. Although CTS frames do not include any fields used to identify source terminals, the wireless base station AP1 can identify source terminals with reference to channels used to receive CTS frames.

The wireless base station AP1 simultaneously transmits RTS frames F172 to F174 to the wireless communication terminal STA14 using OFDMA (time $t_{111}$) while a primary channel is assigned to an RTS frame F171 destined to a legacy terminal (i.e. the wireless communication terminal STA11). Accordingly, the wireless communication terminals STA11 and STA14 send back CTS frames F175 to F178 (time $t_{112}$).

In the RTS transmission using OFDMA described above, it is possible to transmit an RTS frame to a legacy terminal, merely using a smaller channel, on a primary channel while transmitting RTS frames to other terminals on secondary channels.

<A1-7(2)>

Figure 18:
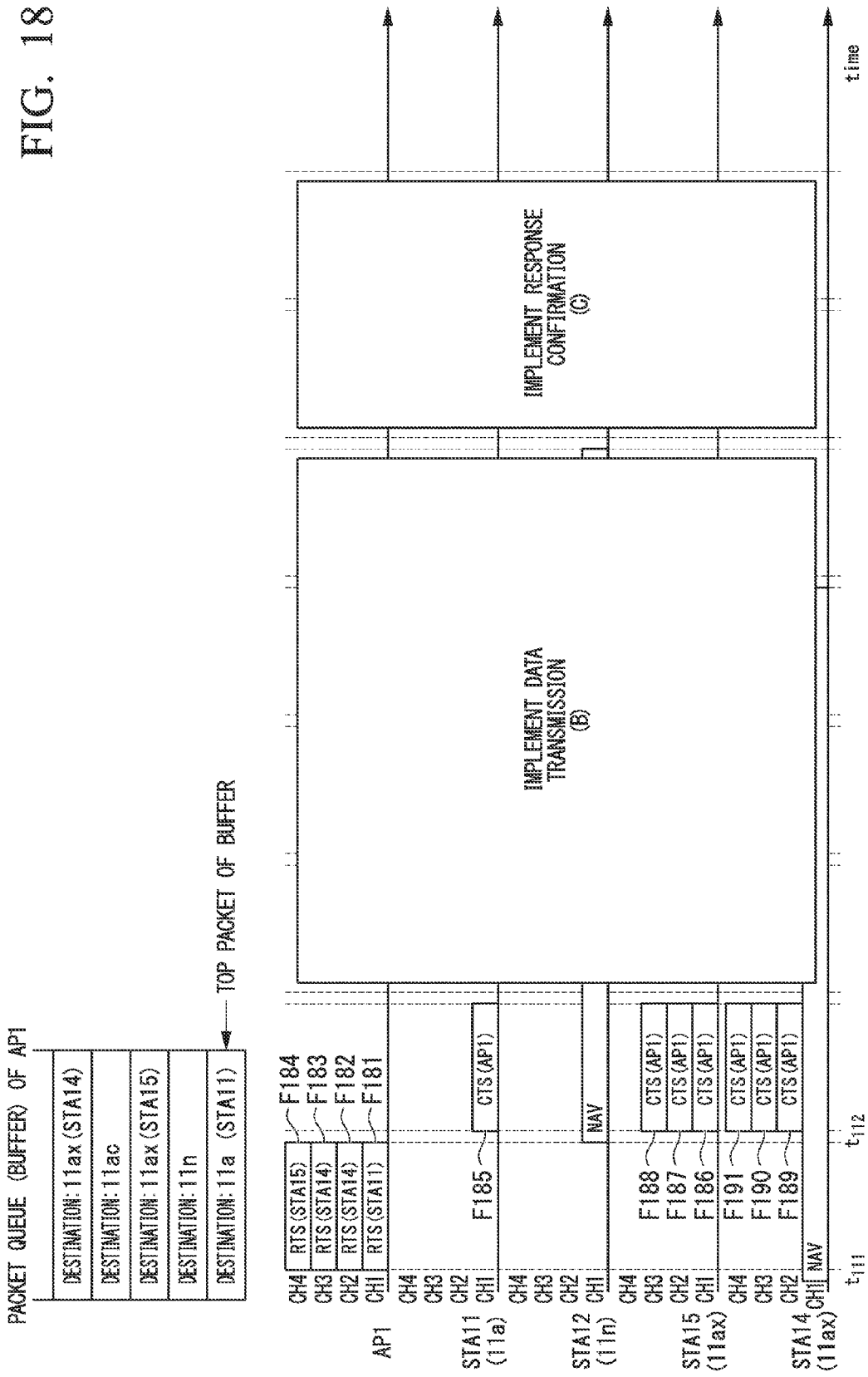
FIG. 18 is a time chart showing a variation of the frame sequence shown in FIG. 17.

Next, a variation of the frame sequence shown in FIG. 17 will be described with reference to FIG. 18. FIG. 18 is a time chart showing a variation of the frame sequence shown in FIG. 17. This frame sequence is designed to perform CTS multiplexing using UL-OFDMA and SDMA, wherein it is difficult for the wireless base station AP1 to determine which wireless communication terminal sends back CTS due to lack of fields used for identify source terminals in CTS frames; hence, it is necessary to determine source STA via signal processing using CSD of PHY.

The wireless base station AP1 simultaneously transmit RTS frames F182 to F184 to the wireless communication terminal STA14 using OFDMA (time $t_{111}$) while a primary channel is assigned to an RTS frame F181 destined to a legacy terminal (i.e. the wireless communication terminal STA11). Accordingly, the 11ax wireless communication terminals STA14 and STA15 send back CTS frames F186-F188 and F189-F191 on idle channels, while the wireless communication terminal STA11 sends back a CTS frame F185 on a primary channel (time $t_{112}$).

Due to the existence of a legacy terminal, it is possible to transmit an RTS frame to a different secondary wireless communication station on a secondary channel using OFDMA.

Figure 19:
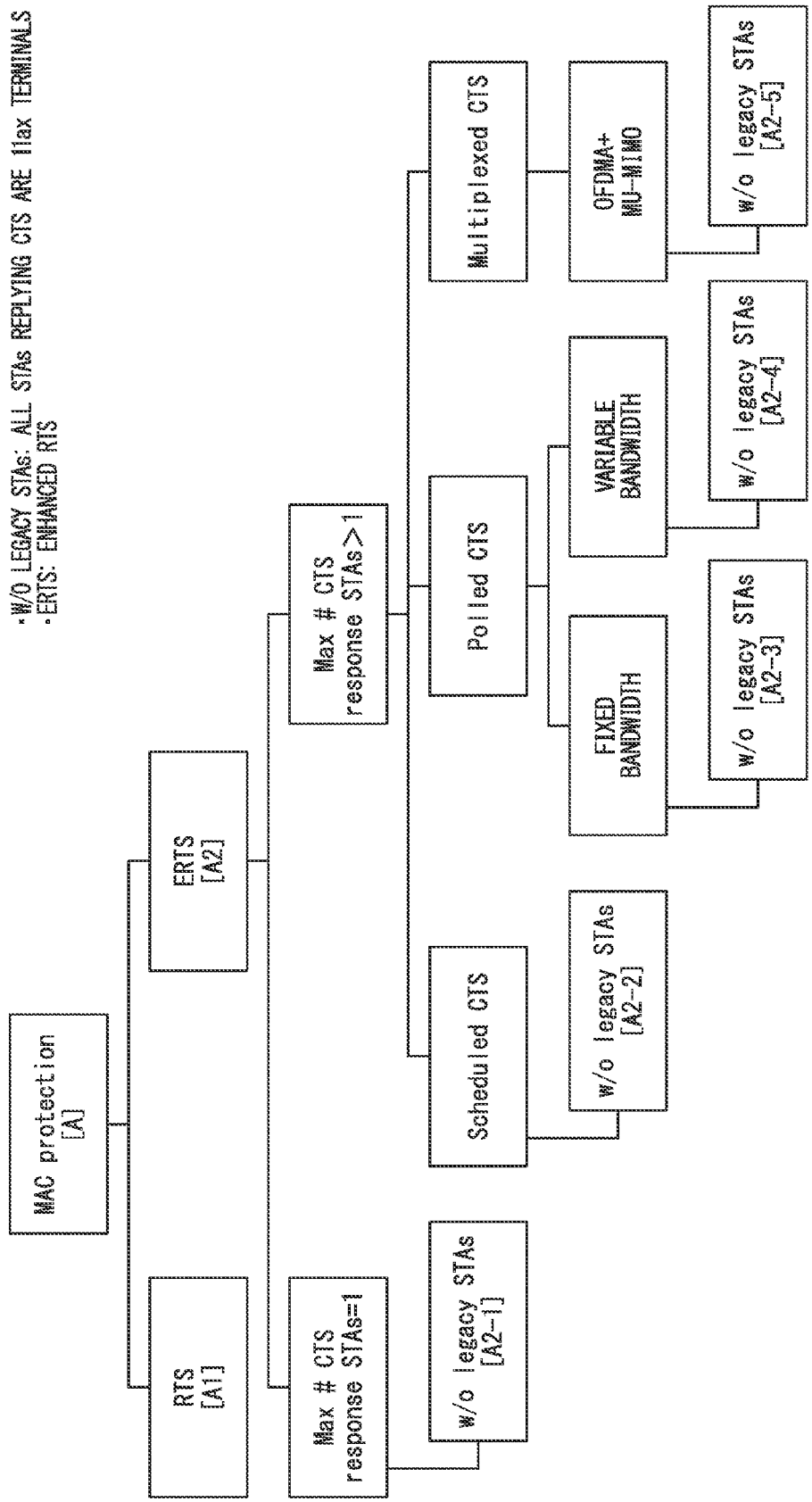
FIG. 19 is a schematic diagram showing sub-classifying (A2) using the extended RTS (ERTS) among classifications of MAC protection.

Next, MAC protection using extended RTS (ERTS) will be described. FIG. 19 shows sub-divided classifications of MAC protection using extended RTS (ERTS) (A2). The following descriptions will be made based on classifications shown in FIG. 19.

<A2-1(1)>

Figure 20:
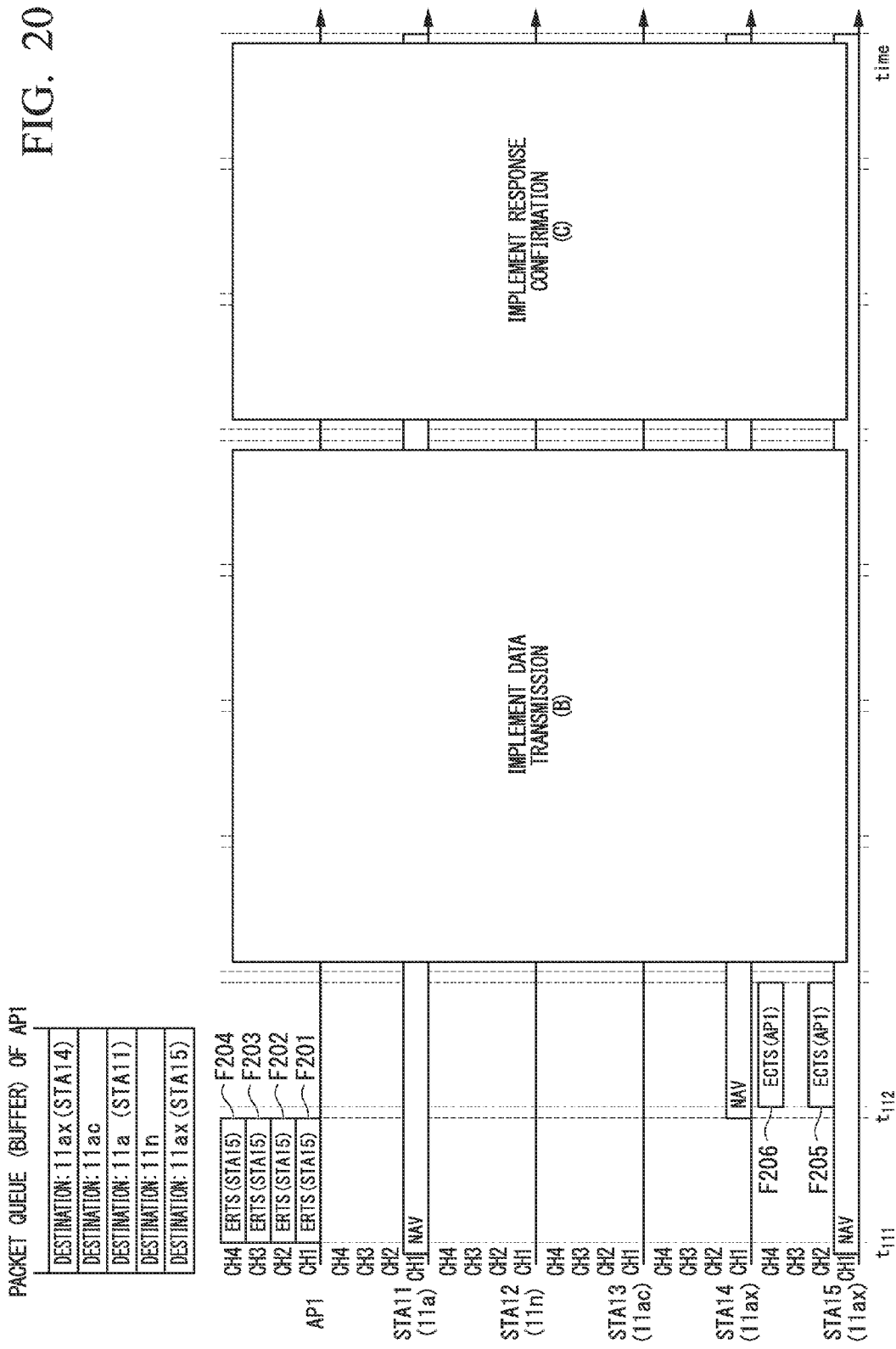
FIG. 20 is a time chart showing a frame sequence in which the number of terminals responding to communication is one; all the wireless communication terminals sending back CTS are 11ax wireless communication terminals.

Next, a frame sequence dedicated to the case (A2-1 shown in FIG. 19) where the number of terminals responding to communication is one; all the wireless communication terminals are 11ax wireless communication terminals will be described with reference to FIG. 20. FIG. 20 is a time chart showing a frame sequence in which the number of terminals responding to communication is one; all the wireless communication terminals are 11ax wireless communication terminals. This frame sequence is designed to send back ECTS frames (Extended CTS frames) extending CTS frames on secondary channels irrespective of a busy primary channel, thus transmitting ECTS on noncontiguous channels.

First, the wireless base station AP1 transmits ERTS frames F201 to F204 to the wireless communication terminal STA15 on all channels (time $t_{111}$). The ERTS frame includes list information showing channel numbers scheduled for data transmission. Accordingly, the wireless communication terminal STA15 sends back ECTS frames F205 and F206 on idle secondary channels (Channel 2, Channel 4) (time $t_{112}$). The ECTS frame includes list information showing available channel numbers among channel numbers notified via ERTS.

Thus, it is possible to perform ERTS/ECTS exchange by defining the extended RTS frame, i.e. ERTS. Herein, ERTS frames are normally destined to OFDMA-adapted wireless communication stations since legacy terminals cannot decode ERTS frames. A primary channel should be idle according to one condition for sending back CTS in response to conventional RTS. However, this condition is not needed to send back ECTS in response to ERTS. It is possible to send back ECTS on a plurality of noncontiguous channels since wireless communication terminals receiving ERTS send back ECTS on idle channels among channels used to receive ERTS.

<A2-1(2)>

Figure 21:
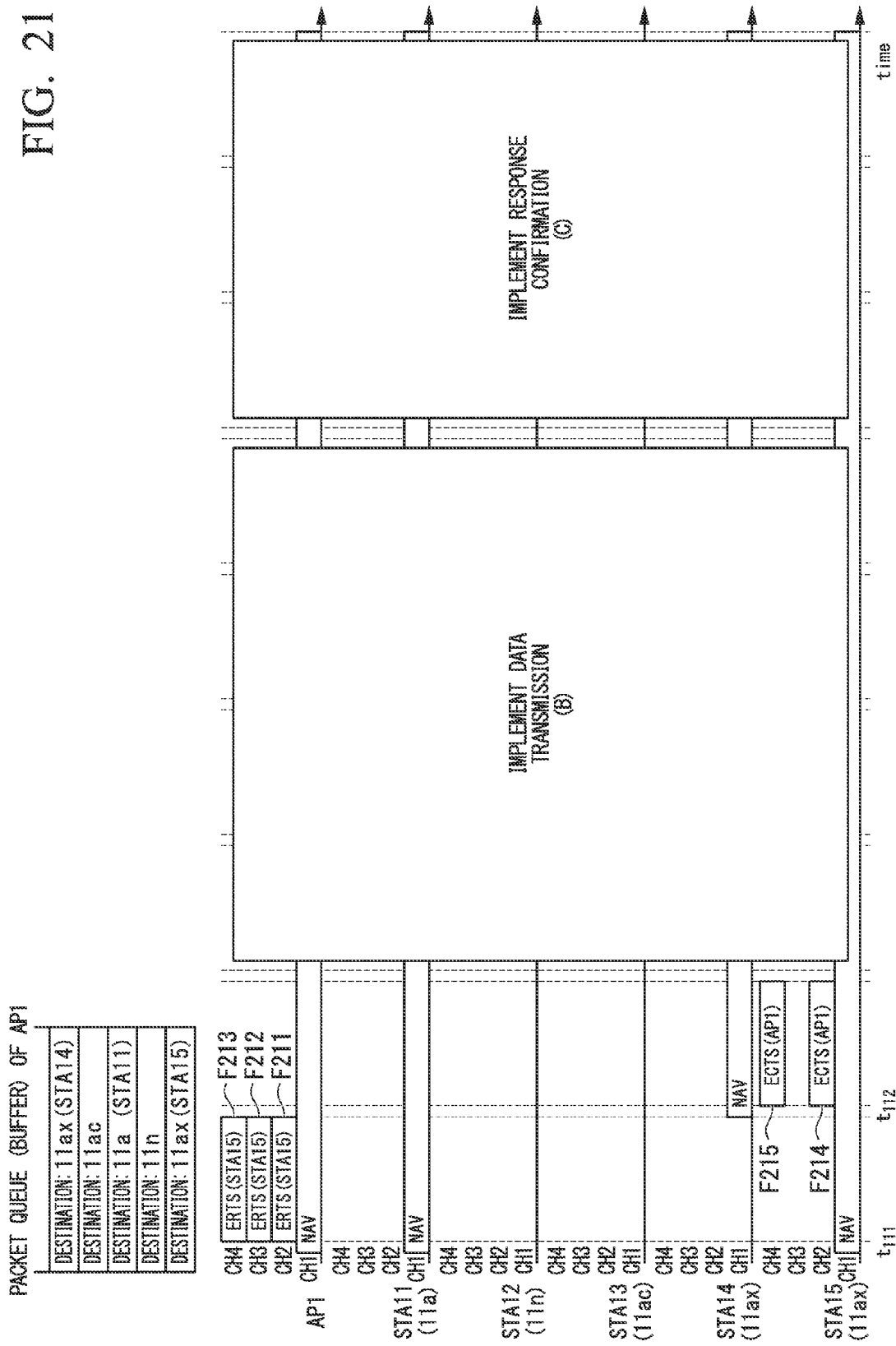
FIG. 21 is a time chart showing a variation of the frame sequence shown in FIG. 20.

Next, a variation of the frame sequence shown in FIG. 20 will be described with reference to FIG. 21. FIG. 21 is a time chart showing a variation of the frame sequence shown in FIG. 20. Herein, it is possible to perform communication on secondary channels by obtaining an access right on an idle secondary channel even when a primary channel is busy in the wireless base station AP1; hence, it is possible to transmit ECTS on noncontiguous channels while temporarily using one of idle secondary channels as a primary channel.

When a primary channel is busy, the wireless base station AP1 transmits ERTS frames F211 to F213 to the wireless communication terminal STA15 solely on secondary channels (Channels 2-4) (time $t_{111}$). The ERTS frame includes list information showing channel numbers scheduled for data transmission as well as channel numbers which can be temporarily used in the time which is set to a Duration field in connection with a primary channel. At this time, the NAV period is adjusted to a primary channel.

Accordingly, the wireless communication terminal STA15 sends back ECTS frames F214 and F215 on secondary channels (Channels 2, 4) (time $t_{112}$). The ECTS frame includes list information showing available channel numbers among channel numbers notified via ERTS. During the busy period of a primary channel, the wireless communication terminal STA15 temporarily uses a secondary channel as a primary channel.

Thus, it is possible to confirm whether or not communication can be executed solely using secondary channels when a primary channel is busy due to interference.

<A2-2>

Figure 22:
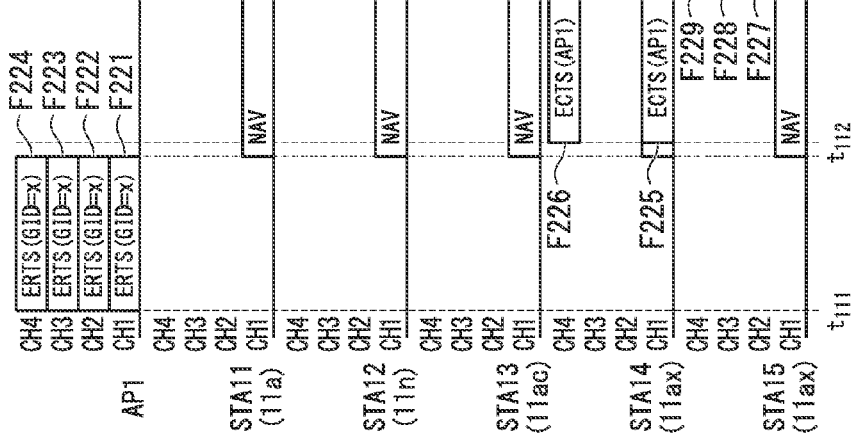
FIG. 22 is a time chart showing a frame sequence in which the number of wireless communication terminals responding to an RTS frame transmitted using OFDMA is two or more; all the wireless communication terminals each sending back a CTS frame at the predetermined time are 11ax wireless communication terminals.

Next, a frame sequence dedicated to the case (A2-2 shown in FIG. 19) where the number of wireless communication terminals responding to RTS frames transmitted using OFDMA is two or more; all the wireless communication terminals sending back CTS frames at the predetermined times are 11ax wireless communication terminals will be described with reference to FIG. 22. FIG. 22 is a time chart showing a frame sequence in which the number of wireless communication terminals responding to RTS frames transmitted using OFDMA is two or more; all the wireless communication terminals sending back CTS frames at the predetermined times are 11ax wireless communication terminals. This frame sequence is designed to transmit ERTS to a plurality of wireless communication terminals by use of GID (group IDs), wherein the order of transmitting ECTS is notified using GID information of ERTS.

The wireless base station AP1 transmits ERTS frames F221 to F224 by specifying group IDs (GID) (time $t_{111}$) in order to check states of idle channels in 11ax wireless communication terminals (i.e. the wireless communication terminals STA14 and STA15). The ERTS frame includes list information indicating channel numbers scheduled for data transmission, list information (GID) indicating a group of wireless communication terminals serving as candidates subjected to data transmission, and ECTS replying order information.

Accordingly, the wireless communication terminal STA14 sends back ECTS frames F225 and F226 (time $t_{112}$) while the wireless communication terminal STA15 sends back ECTS frames F227 to F229 (time $t_{113}$). The ECTS frame includes list information indicating available channel numbers among channel numbers being notified from ERTS as well as addresses of wireless communication terminals serving as transmission sources.

Thus, it is possible to simultaneously transmit ERTS frames to a plurality of wireless communication stations by use of the concept of group IDs (GID). The order of replying ECTS in response to ERTS is explicitly stated in each ERTS frame. This makes it possible to request a plurality of OFDMA-adapted terminals to send back ECTS with a single ERTS frame, thus reducing overheads in wireless communication areas.

<A2-3>

Figure 23:
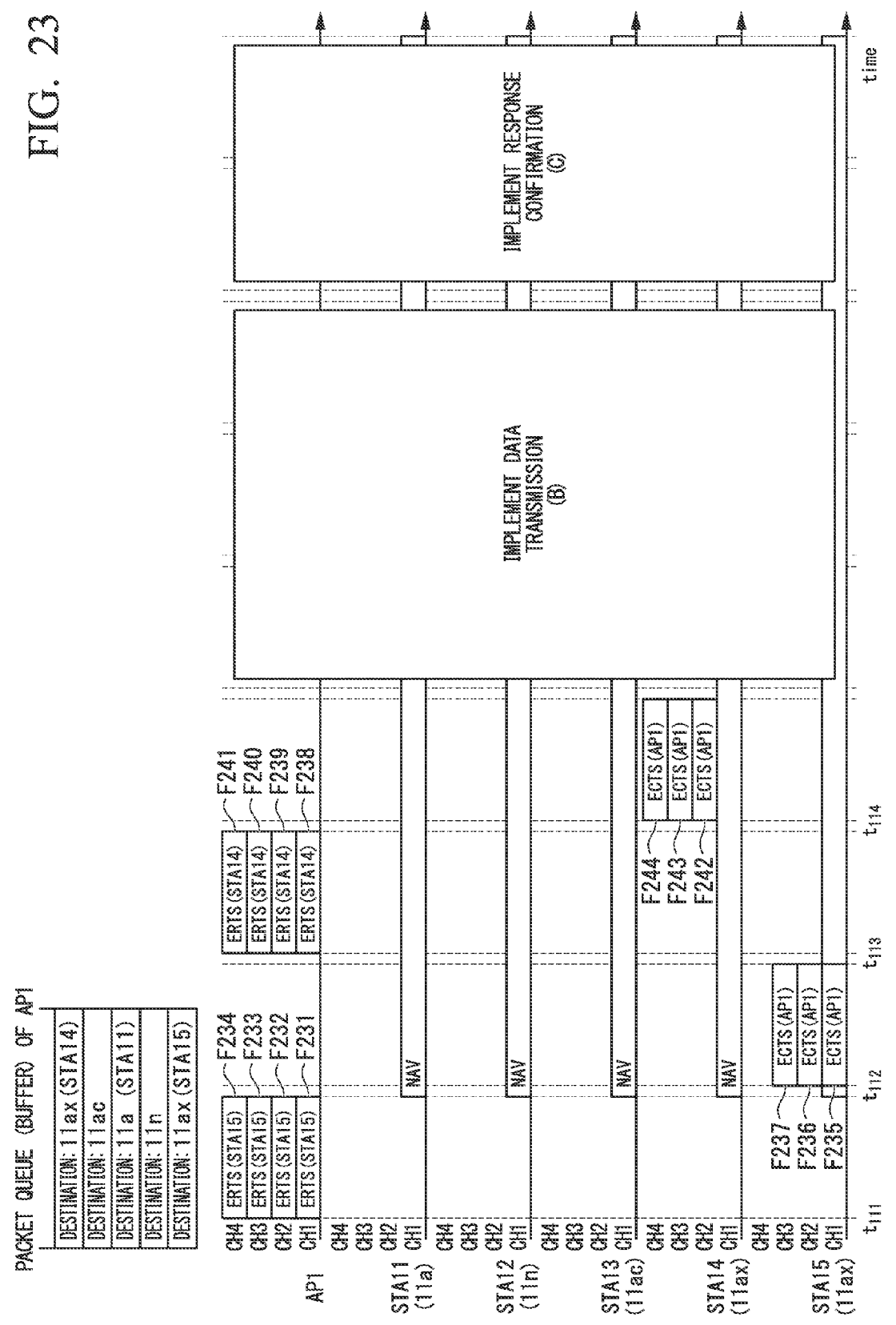

Next, a sequence frame dedicated to the case (A2-3 shown in FIG. 19) where the number of wireless communication terminals responding to communication is two or more; an RTS frame using the same fixed bandwidth is transmitted to wireless communication terminals; all the wireless communication terminals sending back CTS are 11ax wireless communication terminals will be described with reference to FIG. 23. FIG. 23 is a time chart showing a frame sequence in which the number of wireless communication terminals responding to communication is two or more; an RTS frame using the same fixed bandwidth is transmitted to wireless communication terminals; all the wireless communication terminals sending back CTS are 11ax wireless communication terminals. This frame sequence allows the wireless base station AP1 obtaining an access right to transmit ERTS using the fixed bandwidth to a plurality of wireless communication terminals.

First, the wireless base station AP1 transmits ERTS frames F231 to F234 to the wireless communication terminal STA15 (time $t_{111}$). The ERTS frame includes list information indicating channel numbers scheduled for data transmission. Accordingly, the wireless communication terminal STA15 sends back ECTS frames F235 to F237 (time $t_{112}$). This ECTS frame includes list information indicating available channel numbers among channel numbers notified from ERTS.

Next, the wireless base station AP1 transmits ERTS frames F238 to F241 to the wireless communication terminal STA14 (time $t_{113}$). Accordingly, the wireless communication terminal STA14 sends back ECTS frames F242 to F244 (time $t_{114}$).

As described above, it is possible to transmit an ERTS frame using the fixed bandwidth to a plurality of wireless communication stations, thus confirming whether or not OFDMA and spatial multiplexing can be carried out.

<A2-4>

Figure 24:
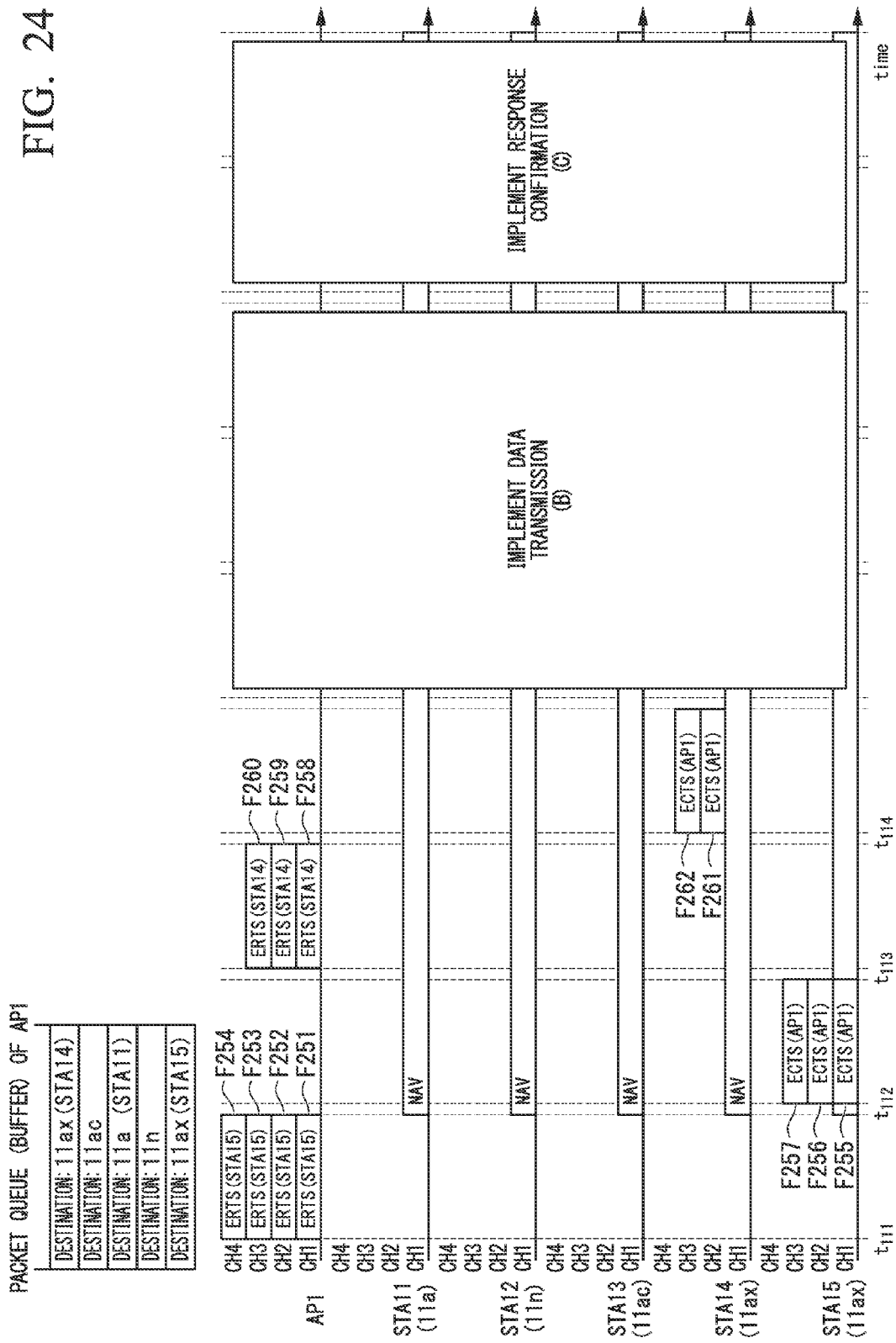
FIG. 24 is a time chart showing a frame sequence in which the number of wireless communication terminals responding to communication is two or more; an RTS frame is transmitted to wireless communication terminals via variable bandwidths; all the wireless communication terminals sending back CTS are 11ax wireless communication terminals.

Next, a frame sequence dedicated to the case (A2-4 shown in FIG. 19) where the number of wireless communication terminals responding to communication is two or more; an RTS frame using a variable bandwidth is transmitted to wireless communication terminals; all the wireless communication terminals sending back CTS are 11ax wireless communication terminals will be described with reference to FIG. 24. FIG. 24 is a time chart showing a frame sequence in which the number of wireless communication terminals responding to communication is two or more; an RTS frame using a variable bandwidth is transmitted to wireless communication terminals; all the wireless communication terminals sending back CTS is 11ax wireless communication terminals. This frame sequence allows the wireless base station AP1 obtaining an access right to transmit an ERTS using a variable bandwidth to a plurality of wireless communication terminals.

First, the wireless base station AP1 transmits ERTS frames F251 to F254 to the wireless communication terminal STA15 (time $t_{111}$). The ERTS frame includes list information indicating channel numbers scheduled for data transmission. Accordingly, the wireless communication terminal STA15 sends back ECTS frames F255 to F257 (time $t_{112}$). The ECTS frame includes list information indicating available channel numbers among channel numbers notified from ERTS.

Next, the wireless base station AP1 transmits ERTS frames F258 to F260 to the wireless communication terminal STA14 (time $t_{113}$). Accordingly, the wireless communication terminal STA14 sends back ECTS frames F261 and F262 (time $t_{114}$).

As described above, it is possible to implement exchanging of ERTS/ECTS frames among a plurality of wireless communication stations, thus confirming the information regarding available channels, each having a 20 MHz bandwidth, with respect to each wireless communication station. Herein, it is unnecessary to use channels not used to send back ECTS in the TXOP period.

<A2-5(1)>

Figure 25:
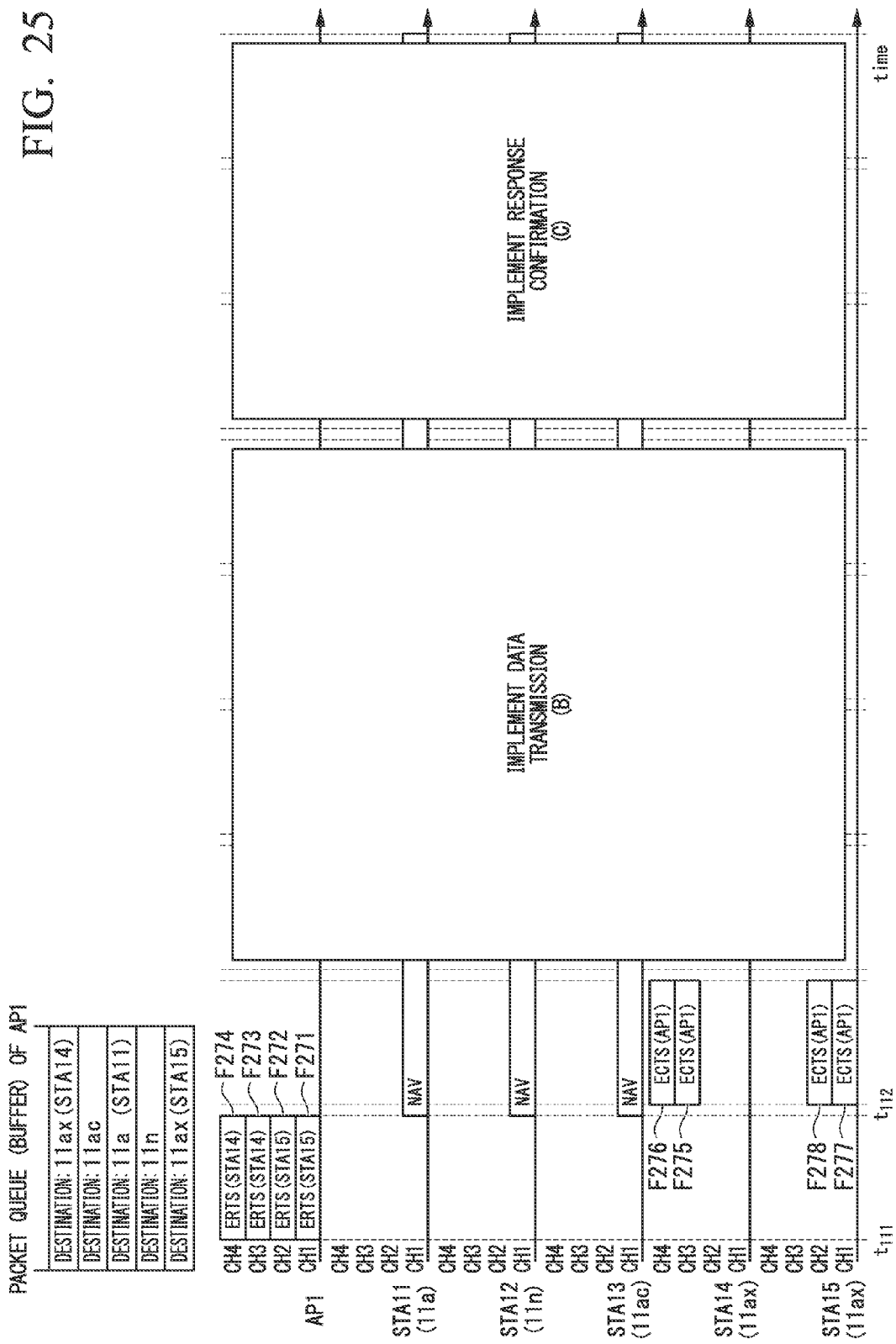
FIG. 25 is a time chart showing a frame sequence in which the number of wireless communication terminals responding to communication is two or more; all the wireless communication terminals sending back CTS are 11ax wireless communication terminals; an ECTS frame is transmitted using OFDMA.

Next, a frame sequence dedicated to the case (A2-5 shown in FIG. 19) where the number of wireless communication terminals is two or more; all the wireless communication terminals sending back CTS are 11ax wireless communication terminals; ECTS frames are transmitted using OFDMA will be described with reference to FIG. 25. FIG. 25 is a time chart showing a frame sequence in which the number of wireless communication terminals is two or more; all the wireless communication terminals sending back CTS are 11ax wireless communication terminals; ECTS frames are transmitted using OFDMA. This frame sequence achieves ECTS multiplexing so that wireless communication terminals can send back ECTS on channels fixed thereto.

First, the wireless base station AP1 transmits ERTS frames F271 to F274 to the wireless communication terminals STA14 and STA15 using OFDMA (time $t_{111}$). The ERTS frame includes list information indicating channel numbers scheduled for data transmission. Accordingly, the wireless communication terminals STA14 and STA15 send back ECTS frames F275-F276 and F277-F278 (time $t_{112}$). The ECTS frame includes list information indicating available channel numbers among channel numbers notified from ERTS.

As described above, it is possible to transmit ERTS frames to different wireless communication stations on different channels, each having a 20 MHz bandwidth, according to OFDMA, and therefore wireless communication terminals can determine channels used for sending back ECTS in connection with ERTS.

<A2-5(2)>

Figure 26:
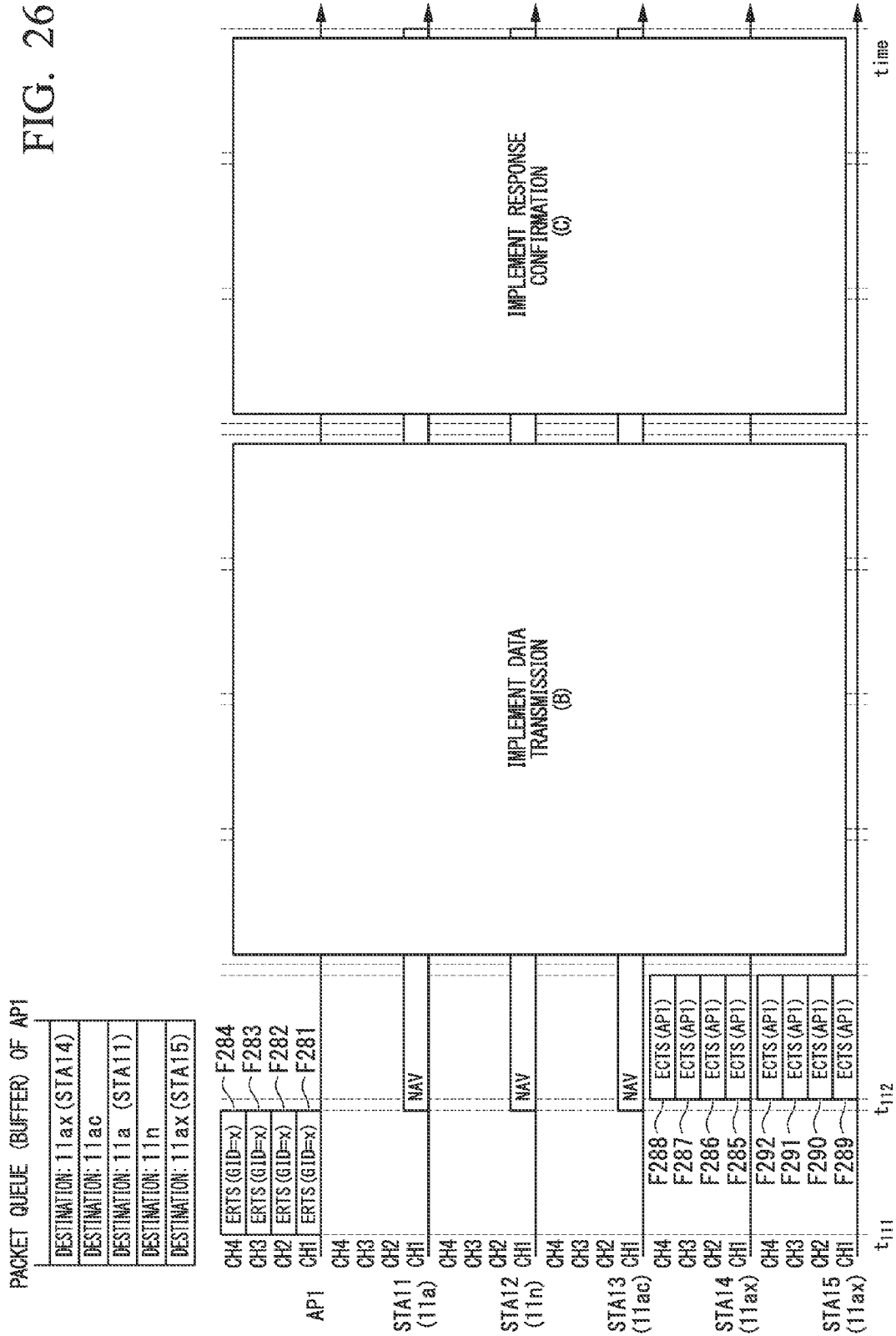
FIG. 26 is a time chart showing a variation of the frame sequence shown in FIG. 25.

Next, a variation of the frame sequence shown in FIG. 25 will be described with reference to FIG. 26. FIG. 26 is a time chart showing a variation of the frame sequence shown in FIG. 25. This frame sequence achieves ECTS multiplexing so as to transmit ERTS at a Duplicate mode.

First, the wireless base station AP1 transmits ERTS frames F281 to F284 by specifying a group ID (GID) (time $t_{111}$). The ERTS frame includes list information indicating channel numbers scheduled for data transmission and list information indicating wireless communication terminals serving as candidates subjected to data transmission. Accordingly, the wireless communication terminals STA14 and STA15 send back ECTS frames F285-F288 and F289-F292 (time $t_{112}$). The ECTS frame includes list information indicating available channel numbers among channel numbers notified from ERTS and addresses of wireless communication terminals serving as transmission sources.

As described above, it is possible to concurrently transmit ERTS to a plurality of wireless communication stations at a Duplicate mode by use of the concept of group IDs, thus collecting information indicating available channels based on a response from each wireless communication station.

<A2-5(3)>

Figure 27:
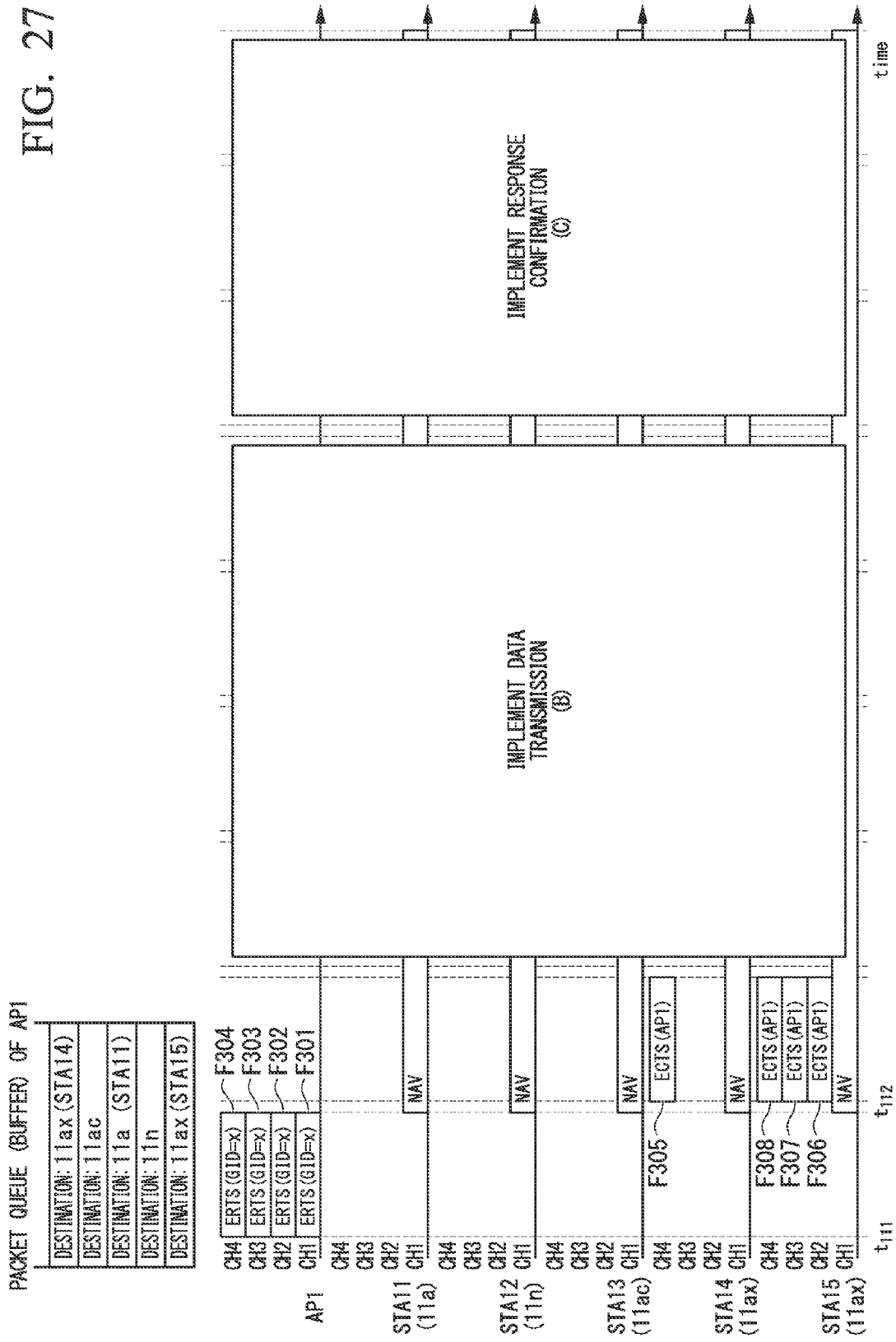
FIG. 27 is a time chart showing another variation of the frame sequence shown in FIG. 25.

Next, anther variation of the frame sequence shown in FIG. 25 will be described with reference to FIG. 27. FIG. 27 is a time chart showing another variation of the frame sequence shown in FIG. 25. This frame sequence achieves ECTS multiplexing so as to transmit ERTS at a Duplicate mode. Each wireless communication terminal receiving ERTS may send back ECTS irrespective of lack of an idle primary channel. The ECTS is sent back using UL MU-MIMO.

First, the wireless base station AP1 transmits ERTS frames F301 to F304 by specifying a group ID (GID) (time $t_{111}$). The ERTS frame includes list information indicating channel numbers scheduled for data transmission and list information indicating wireless communication terminals serving as candidates subjected to data transmission. Accordingly, the wireless communication terminals STA14 and STA15 send back ECTS frames F305 and F306-F308 using UL MU-MIMO (time $t_{112}$). The ECTS frame includes list information indicating available channel numbers among channel numbers notified from ERTS and addresses of wireless communication terminals serving as transmission sources.

As described above, a reply (ECTS) to ERTS is transmitted using uplink MU-MIMO. Thus, it is possible to transmit ECTS irrespective of lack of an idle primary channel.

<A2-5(4)>

Figure 28:
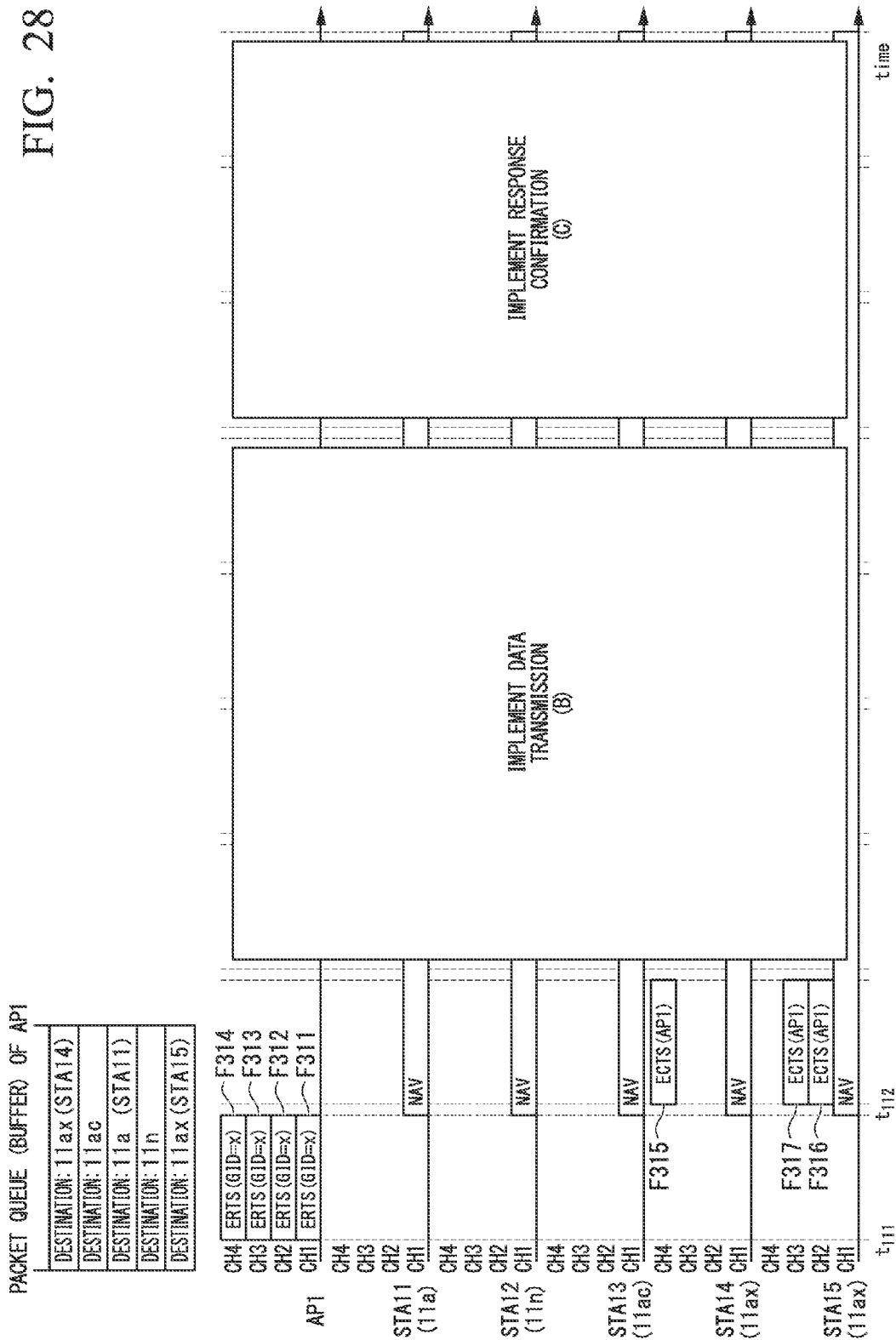
FIG. 28 is a time chart showing a variation of the frame sequence shown in FIG. 27.

Next, a variation of the frame sequence shown in FIG. 27 will be described with reference to FIG. 28. FIG. 28 is a time chart showing a variation of the frame sequence shown in FIG. 27. This frame sequence achieves ECTS multiplexing so as to transmit ERTS at a Duplicate mode. Each wireless communication terminal receiving ERTS sends back ECTS irrespective of lack of an idle primary channel. The ECTS is sent back using UL OFDMA.

First, the wireless base station AP1 transmits ERTS frames F311 to F314 by specifying a group ID (GID) (time $t_{111}$). The ERTS frame includes list information indicating channel numbers scheduled for data transmission and list information indicating wireless communication terminals serving as candidates subjected to data transmission. Accordingly, the wireless communication terminals STA14 and STA15 send back ECTS frames F315 and F316-F317 using UL OFDMA (time $t_{112}$). The ECTS frame includes list information indicating available channel numbers among channel numbers notified from ERTS.

As described above, a reply (ECTS) to ERTS is transmitted using uplink OFDMA. Thus, it is possible to transmit ECTS irrespective of lack of an idle primary channel.

The aforementioned frame sequence is designed using ECTS serving as a reply frame to ERTS, whereas it is possible to use conventional CTS as necessary, instead of ECTS, when the information included in ECTS can be transmitted using CTS. In the case of A2-1-1, for example, it is necessary for each wireless communication terminal to send back an ECTS frame to the wireless base station such that the wireless base station can determine which channel is used to send back CTS from each wireless communication terminal; however, this operation can be achieved by transmitting conventional CTS.

<Frame Sequence Implementing Data Transmission>

Figure 29:
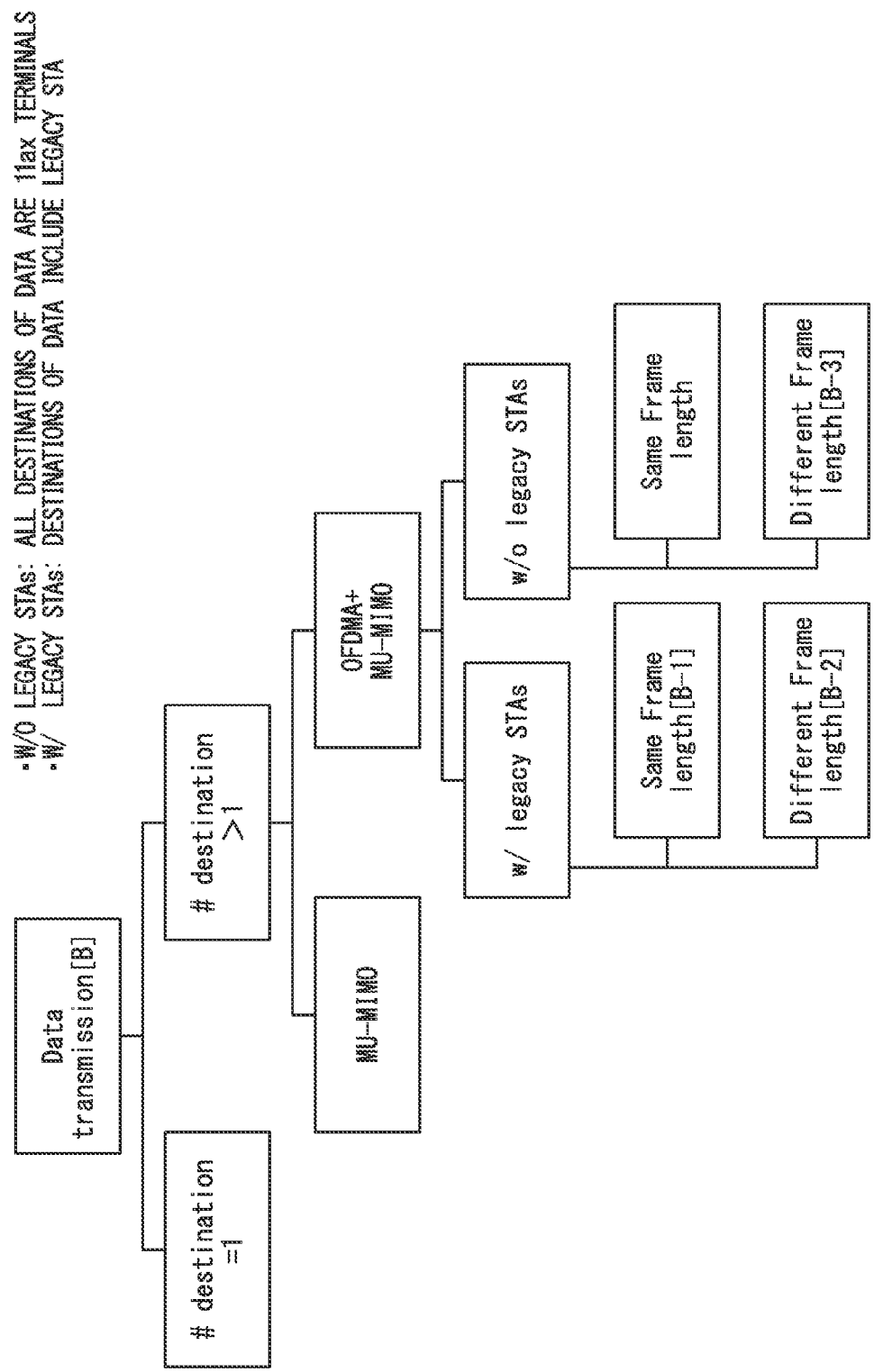
FIG. 29 is a schematic diagram showing data transmission classifications.

Next, a variation of the frame sequence shown in FIG. 3, which is used to implement data transmission, will be described below. Classifications of data transmission will be described with reference to FIG. 29. FIG. 29 is a schematic diagram showing classifications of data transmission. As shown in FIG. 29, it is possible to subdivide data transmission (identified as B) into B-1, B-2, B-3 by use of OFDMA+MU-MIMO. Detailed descriptions will be omitted with respect to other classifications corresponding to data transmission using conventional arts. The following descriptions will be made based on these classifications.

<B-1(1)>

Figure 30:
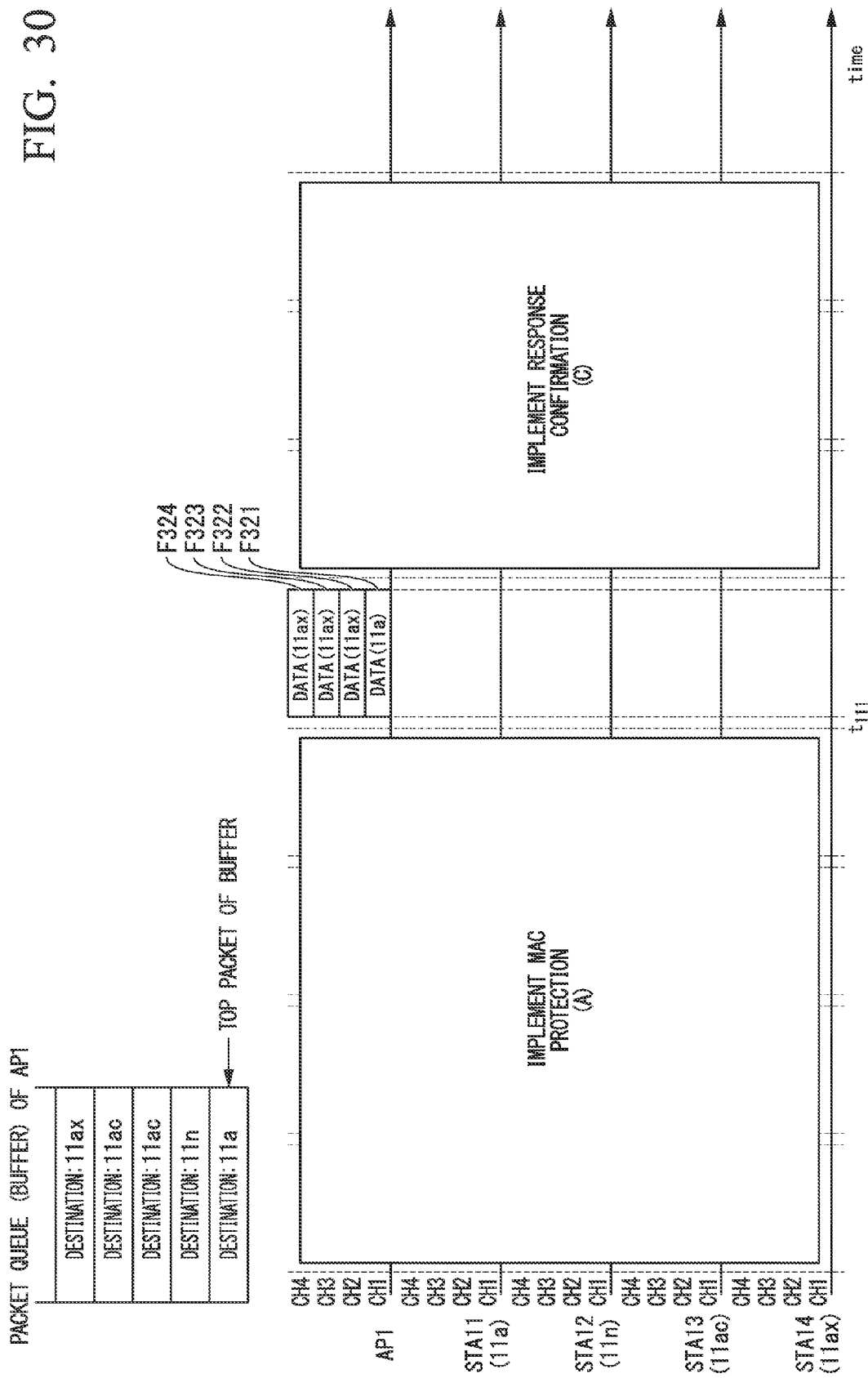
FIG. 30 is a time chart showing a frame sequence using OFDMA+MU-MIMO and the same data length in which destinations of data include a legacy terminal.

A frame sequence dedicated to the case (B-1 shown in FIG. 29) which employs OFDMA+MU-MIMO with the same data length and in which destinations of data include legacy terminals will be described with reference to FIG. 30. FIG. 30 is a time chart showing a frame sequence which employs OFDMA+MU-MIMO with the same data length and in which destinations of receiving data include legacy terminals. Herein, the data length indicates a time (unit: time unit) which is necessary to send each frame (unit: bits or bytes) to wireless media.

When a packet queue includes data destined to 11a/n/ac and 11ax wireless communication terminals, the wireless base station AP1 allocates a primary channel to a legacy terminal (i.e. wireless communication terminal STA11) so as to transmit a frame F321 while allocating secondary channels to 11ax wireless communication terminals so as to transmit frames F322 to F324 (time $t_{111}$). At this time, the wireless base station AP1 sets the timing of completing confirmation of all responses to Duration. Additionally, the PPDU time length used to perform OFDMA transmission is set to LENGTH. That is, the numeric value transferred from TXVECTOR is adjusted to the frame length of MU-PPDU according OFDMA.

As described above, data destined to a legacy terminal is transmitted on a primary channel while data destined to OFDMA-adapted wireless communication terminals are transmitted on secondary channels; hence, it is possible to effectively use secondary channels which are conventionally wasted.

<B-1(2)>

Figure 31:
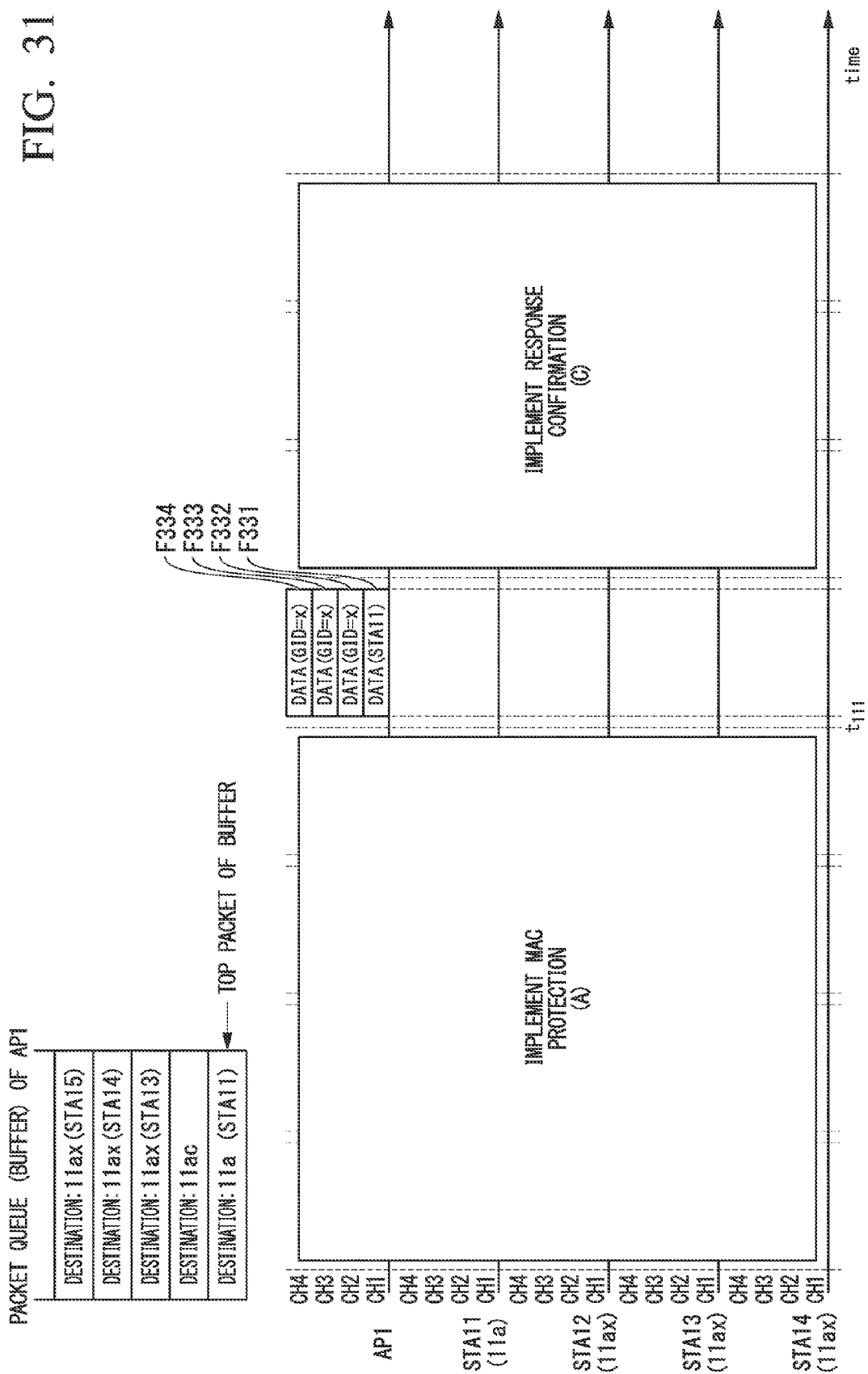
FIG. 31 is a time chart showing a variation of the frame sequence shown in FIG. 30.

Next, a variation of the frame sequence shown in FIG. 30 will be described with reference to FIG. 31. FIG. 31 is a time chart showing a variation of the frame sequence shown in FIG. 30. This frame sequence is designed to allocate a primary channel to a legacy terminal so as to determine to which wireless communication terminal how many streams should be transmitted with respect to each of sub-channels of secondary channels.

When a packet queue includes data destined to 11a/n/ac and 11ax wireless communication terminals, the wireless base station AP1 allocates a primary channel to a legacy terminal (i.e. the wireless communication terminal STA11) so as to transmit a frame F331, while the wireless base station AP1 specifies a group ID of 11ax wireless communication terminals (e.g. a group ID representing the wireless communication terminals STA13, STA14, and STA15) and allocates secondary channels to 11ax wireless communication terminals so as to transmit frames F332 to F334 (time $t_{111}$). At this time, it is necessary to change the number of transmission streams for each wireless communication terminal by combining DL OFDMA and DL MU-MIMO. That is, no data will be transmitted to a certain wireless communication terminal, whose stream count is zero, on its channel.

As described above, it is possible to simultaneously transmit data, which are separated in terms of frequencies and spaces, to a plurality of wireless communication stations on a plurality of channels by way of MU-MIMO and OFDMA using the concept of group IDs; hence, it is possible to obtain high frequency usage efficiencies.

<B-2>

Figure 32:
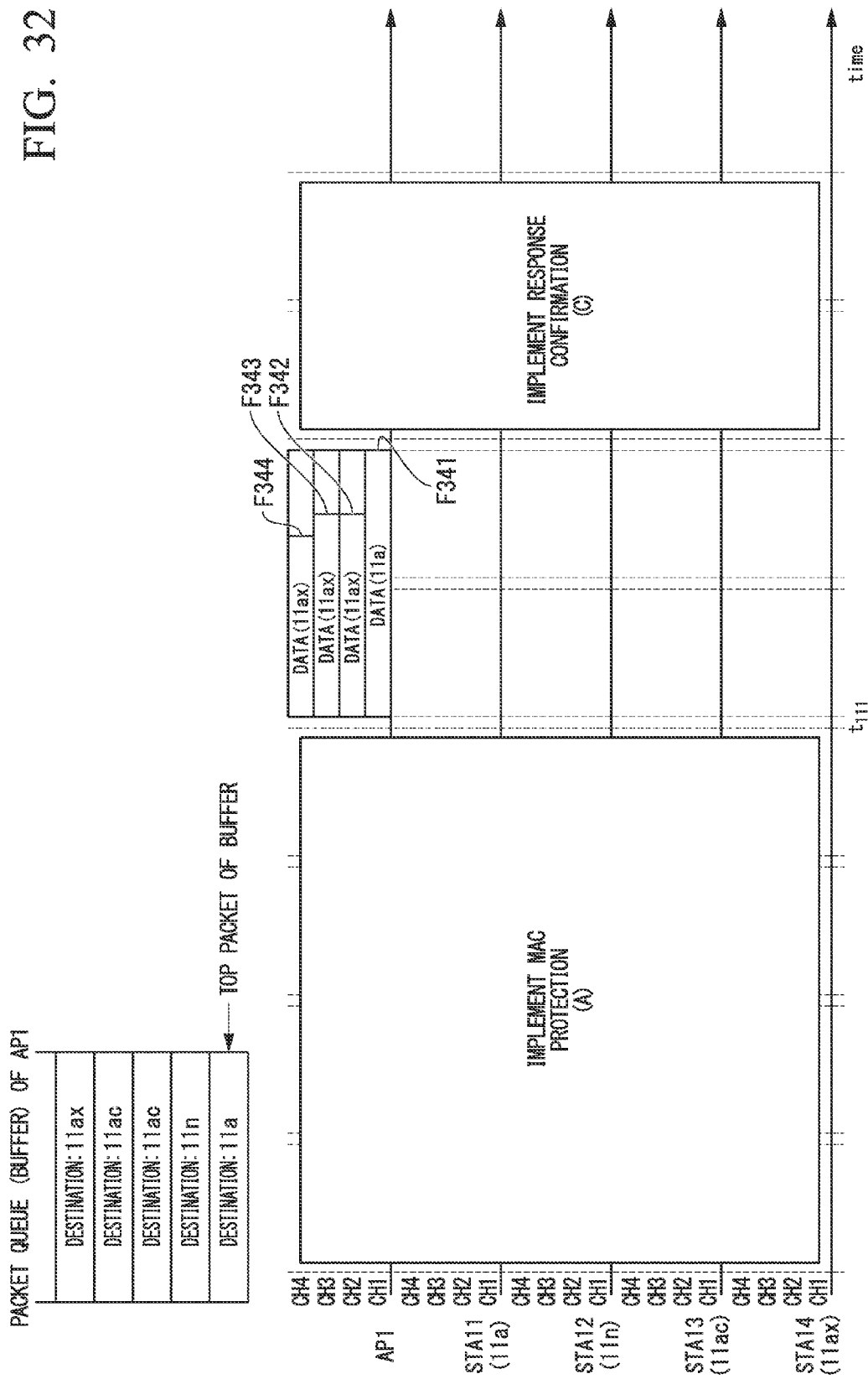
FIG. 32 is a time chart showing a variation of the frame sequence shown in FIG. 30.

Next, a frame sequence dedicated to the case (B-2 shown in FIG. 29) which employs OFDMA+MU-MIMO with different data lengths and in which destinations of data include legacy terminals will be described with reference to FIG. 32. FIG. 32 is a time chart showing a frame sequence which employs OFDMA+MU-MIMO with different data lengths and in which all the destinations of data are 11ax wireless communication terminals.

When different data lengths are applied to data to be transmitted to wireless communication terminals, the wireless base station AP1 transmits frames F342 to F344, whose data lengths are adjusted to the data length of a frame F341 transmitted to a legacy terminal (i.e. a 11a wireless communication terminal), to 11ax wireless communication terminals (time $t_{111}$). As a method of adjusting data lengths, it is possible to employ various methods such as (1) addition of padding bits, (2) adjustment of transmission rates (MCS), stream counts, STBC, (3) frame aggregation, and (4) duplicate transmission of MPDU.

As described above, the wireless base station AP1 transmits data with data lengths (i.e. lengths on the time axis) adjusted to the upper limit of a data length used for a primary wireless communication station, and therefore it is possible to maintain constant transmission power for use in data transmission processes. Absence of the above operation may cause a non-signal period on each channel reaching a destination station with a short frame length, and therefore another wireless communication station may obtain a channel access right due to channel accessing based on CSMA/CA. The present invention is able to implement a series of processes from data transmission to confirmation of responses from terminals including legacy terminals by way of a series of sequences initiated by acquiring TXOP, wherein it is possible to speedily retransmit data, which needs to be retransmitted based on the result of response confirmation, upon obtaining another TXOP, thus improving quality of transmitting data.

<B-3>

Figure 33:
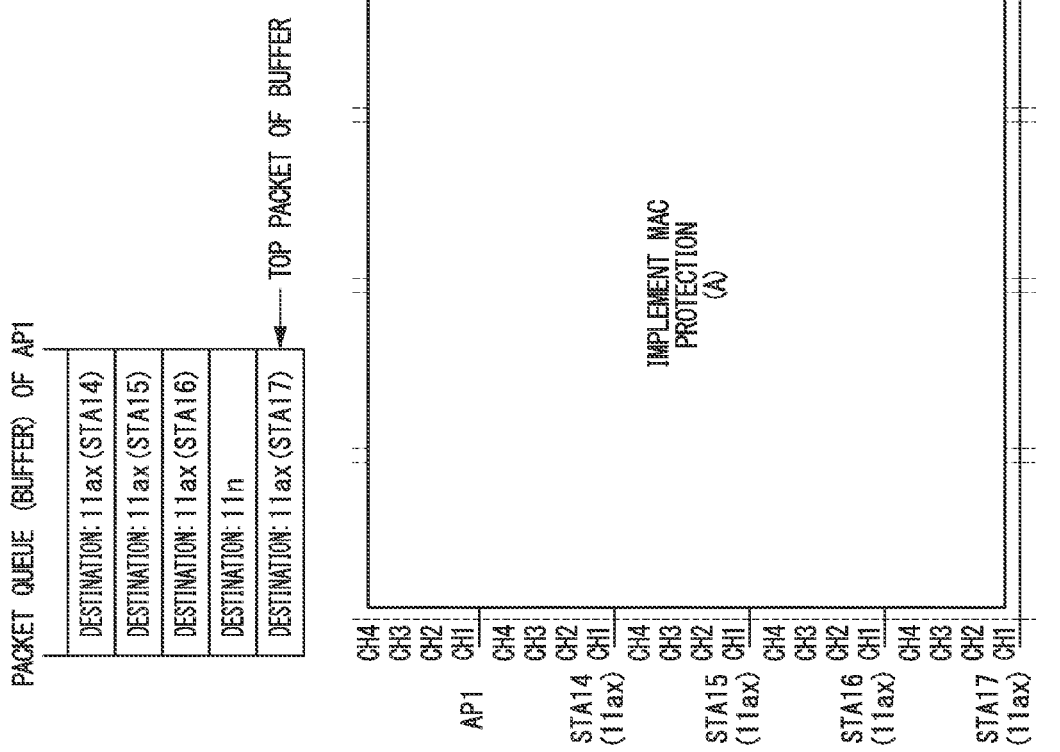
FIG. 33 is a time chart showing a frame sequence using OFDMA+MU-MIMO and different data lengths in which all the destinations of data are 11ax wireless communication terminals.

Next, a frame sequence dedicated to the case (B-3 shown in FIG. 29) which employs OFDMA+MU-MIMO with different data lengths and in which destinations of data do not include any legacy terminals will be described with reference to FIG. 33. FIG. 33 is a time chart showing a frame sequence which employs OFDMA+MU-MIMO with different data lengths and in which all the destinations of data are 11ax wireless communication terminals.

When different data lengths are applied to frames F351 to F354 to be transmitted to each wireless communication terminal, the wireless base station AP1 transmits data with other data lengths adjusted to the longest data length of a frame F353 (time $t_{111}$). As a method of adjusting data lengths, it is possible to employ various methods such as (1) addition of padding bits, (2) adjustment of transmission rates (MCS), stream counts, STBC, and (3) frame aggregation, and (4) duplicate transmission of MPDU.

As described above, the wireless base station transmits data with other data lengths adjusted to the longest data length of a frame (i.e. the length on the time axis), and therefore it is possible to maintain constant transmission power in data signal processing. Absence of the above operation may cause a non-transmission period on a channel reaching a destination station with a short frame length, wherein another wireless communication station may obtain a channel access right due to channel accessing based on CSMA/CA. The present invention can achieve a series of processes from data transmission to confirmation of responses by way of a series of sequences initiated by acquiring TXOP, wherein it is possible to speedily retransmit data, which needs to be retransmitted based on the result of response confirmation, upon obtaining another TXOP, thus improving quality of transmitting data.

<Frame Sequence Implementing Response Confirmation>

Figure 34:
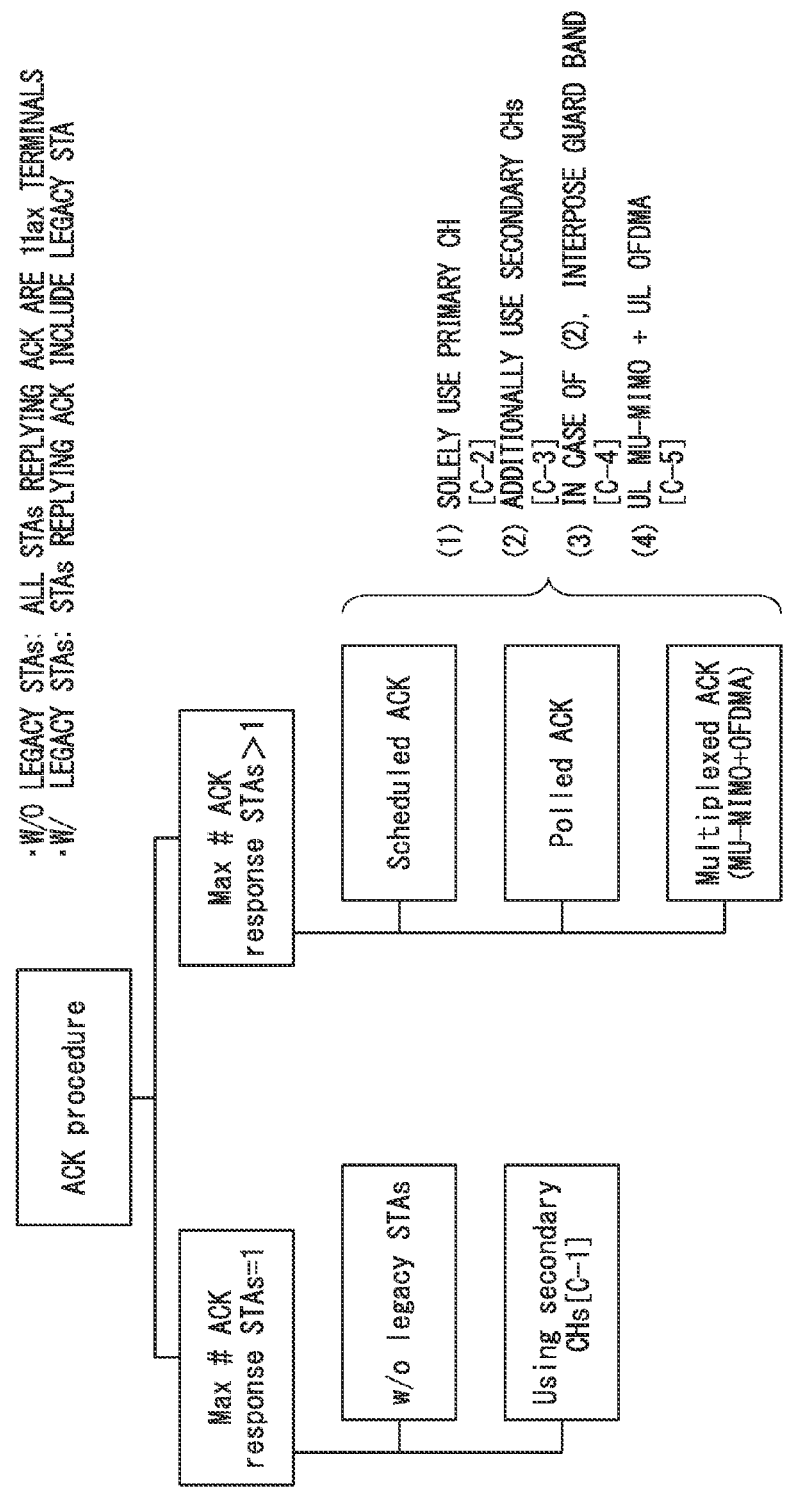
FIG. 34 is a schematic diagram showing response confirmation classifications.

Next, a variation of the frame sequence shown in FIG. 3 used to implement response confirmation will be described. First, classifications of response confirmation will be described with reference to FIG. 34. FIG. 34 is a schematic diagram showing classifications of response confirmation. As shown in FIG. 34, response confirmation (identified as C) can be subdivided into C-1, C-2, C-3, C-4, and C-5. The following descriptions will be made based on these classifications.

<C-1>

Figure 35:
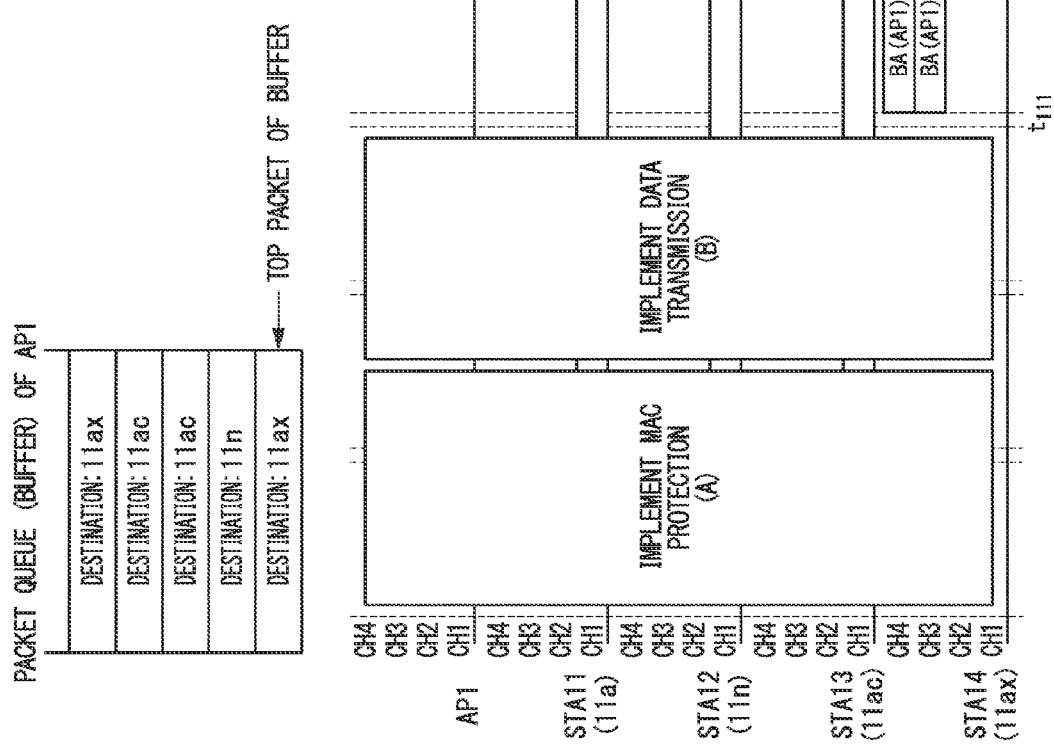
FIG. 35 is a time chart showing a frame sequence in which the number of terminals responding to communication is one; all the wireless communication terminals sending back ACK are 11ax terminals; secondary channels are used.

A frame sequence dedicated to the case (C-1 shown in FIG. 34) where the number of terminals responding to communication is one; wireless communication terminals sending back responses are 11ax wireless communication terminals using secondary channels will be described with reference to FIG. 35. FIG. 35 is a time chart showing a frame sequence in which the number of terminals responding to communication is one; wireless communication terminals sending back responses are 11ax wireless communication terminals using secondary channels. This frame sequence is designed to reply BA (Block ACK) in such a way that 11ax wireless communication terminals can collectively send back responses to a plurality of frames on channels used to receive data.

Upon receiving data from the wireless base station AP1 on secondary channels, the 11ax wireless communication terminal STA14 sends back BA frames F361 and F362 to the wireless base station AP1 on secondary channels (Channels 3, 4) (time $t_{111}$).

As described above, secondary wireless communication stations send back BA (Block ACK) on secondary channels used to receive DATA. This makes it possible to reply responses independently of a sequence applied to a primary channel; hence, it is possible to advance the time of completing replying responses in comparison with an operation of replying responses on a primary channel. Additionally, it is possible to improve frequency usage efficiencies on all channels by preventing interference with a primary channel.

<C-2>

Figure 36:
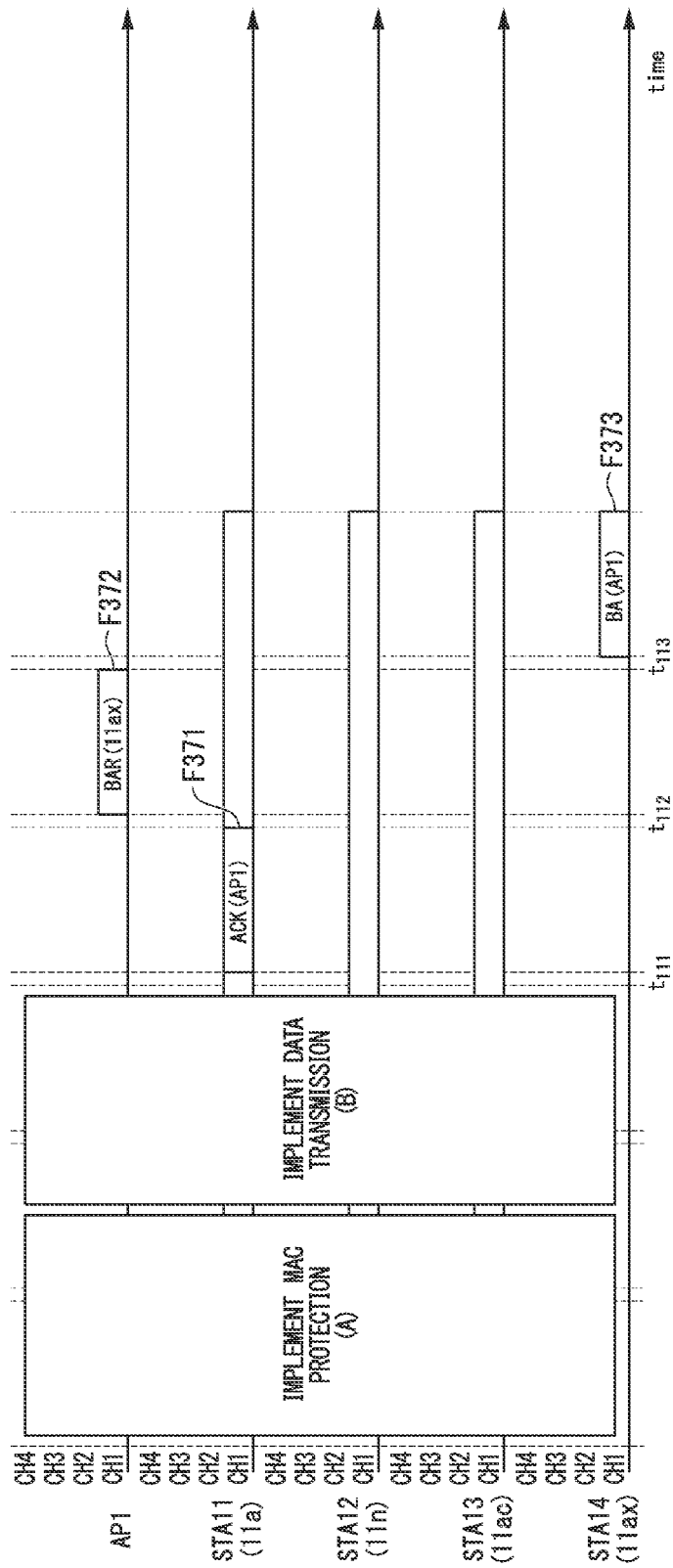
FIG. 36 is a time chart showing a frame sequence in which the number of terminals responding to communication is two or more; a primary channel is used for response confirmation.

Next, a frame sequence dedicated to the case (C-2 shown in FIG. 34) where the number of terminals responding to communication is two or more while a primary channel is used as a channel to confirm response will be described with reference to FIG. 36. FIG. 36 is a time chart showing a frame sequence in which the number of terminals responding to communication is two or more while a primary channel is used as a channel to confirm response. This frame sequence is designed such that the wireless base station AP1 simultaneously transmit data to the wireless communication terminal STA11, serving as a 11ax wireless communication terminal, on a primary channel while transmitting data to the wireless communication terminal STA14, serving as a 11ax wireless communication terminal, on a secondary channel, and then it rapidly releases secondary channels so as to confirm responses on secondary channels. At this time, the wireless base station confirms a response from a legacy terminal and then confirms a response from a 11ax wireless communication terminal via polling.

After the wireless base station AP1 transmits data to 11a and 11ax wireless communication terminals, the wireless communication terminal STA11 sends back an ACK frame F371 (time $t_{111}$). Accordingly, the wireless base station AP1 transmits a BAR (Block ACK Request) frame F372 to a 11ax wireless communication terminal (time $t_{112}$). Thus, the wireless communication terminal STA14, serving as a 11ax wireless communication terminal, sends back a BA frame F373 (time $t_{113}$).

As described above, it is possible to release secondary channels after data transmission by implementing response confirmation on a primary channel. Since the wireless base station AP1 confirms all the responses to data transmitted therefrom on a primary channel, it is possible to extremely reduce a possibility of occurring interruption due to other wireless communication stations during the middle of sequences. When retransmission is needed, it is possible to initiate a process of rapidly obtaining another TXOP, thus reducing delays in transmitting frames.

<C-3>

Figure 37:
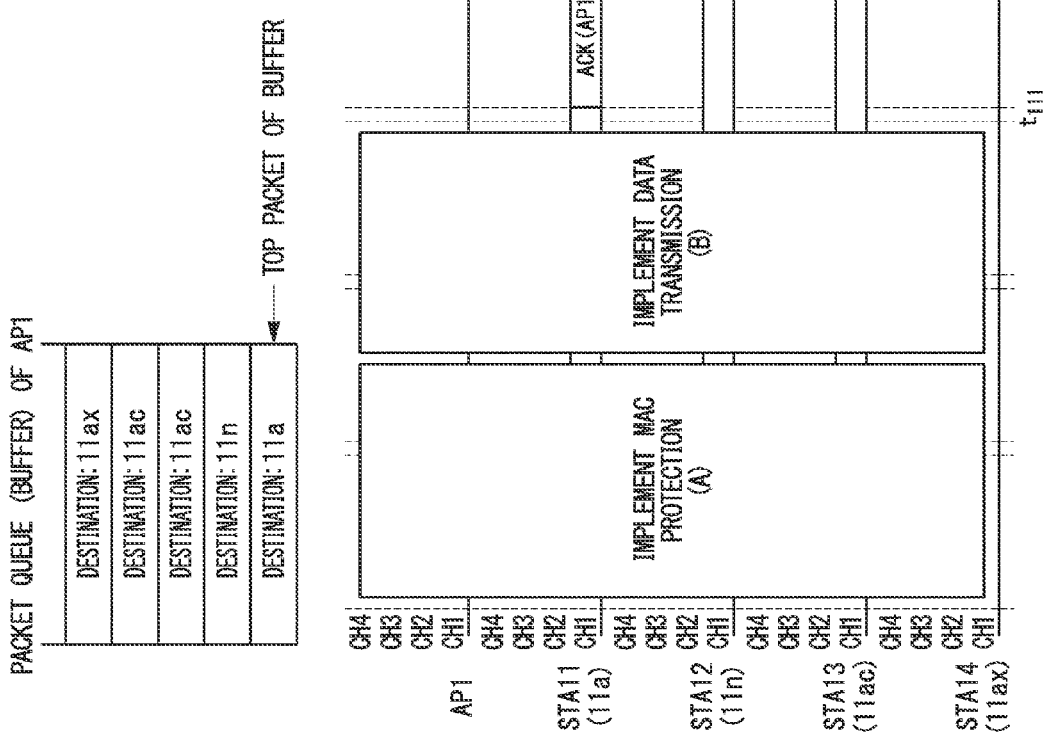
FIG. 37 is a time chart showing a frame sequence in which the number of terminals responding to communication is two or more; secondary channels are additionally used for response confirmation.

Next, a frame sequence dedicated to the case (C-3 shown in FIG. 34) where the number of terminals responding to communication is two or more while secondary channels are additionally used for response confirmation will be described with reference to FIG. 37. FIG. 37 is a time chart showing a frame sequence in which the number of terminals responding to communication is two or more while secondary channels are additionally used for response confirmation. This frame sequence is designed to confirm responses on a primary channel in addition to secondary channels used to transmit data.

When the wireless base station AP1 transmits data to the 11a and 11ax wireless communication terminals, the wireless communication terminal STA11 sends back an ACK frame F381 (time $t_{111}$). Accordingly, the wireless base station AP1 transmits BAR (Block ACK Request) frames F382 to F385 to the 11ax wireless communication terminal on all channels (time $t_{112}$). Accordingly, the wireless communication terminal STA14, serving as an 11ax wireless communication terminal, sends back BA frames F386 to F389 (time $t_{113}$).

As described above, it is possible to transmit BAR to a secondary wireless communication station on a primary channel after confirming responses using BAR.

<C-4>

Figure 38:
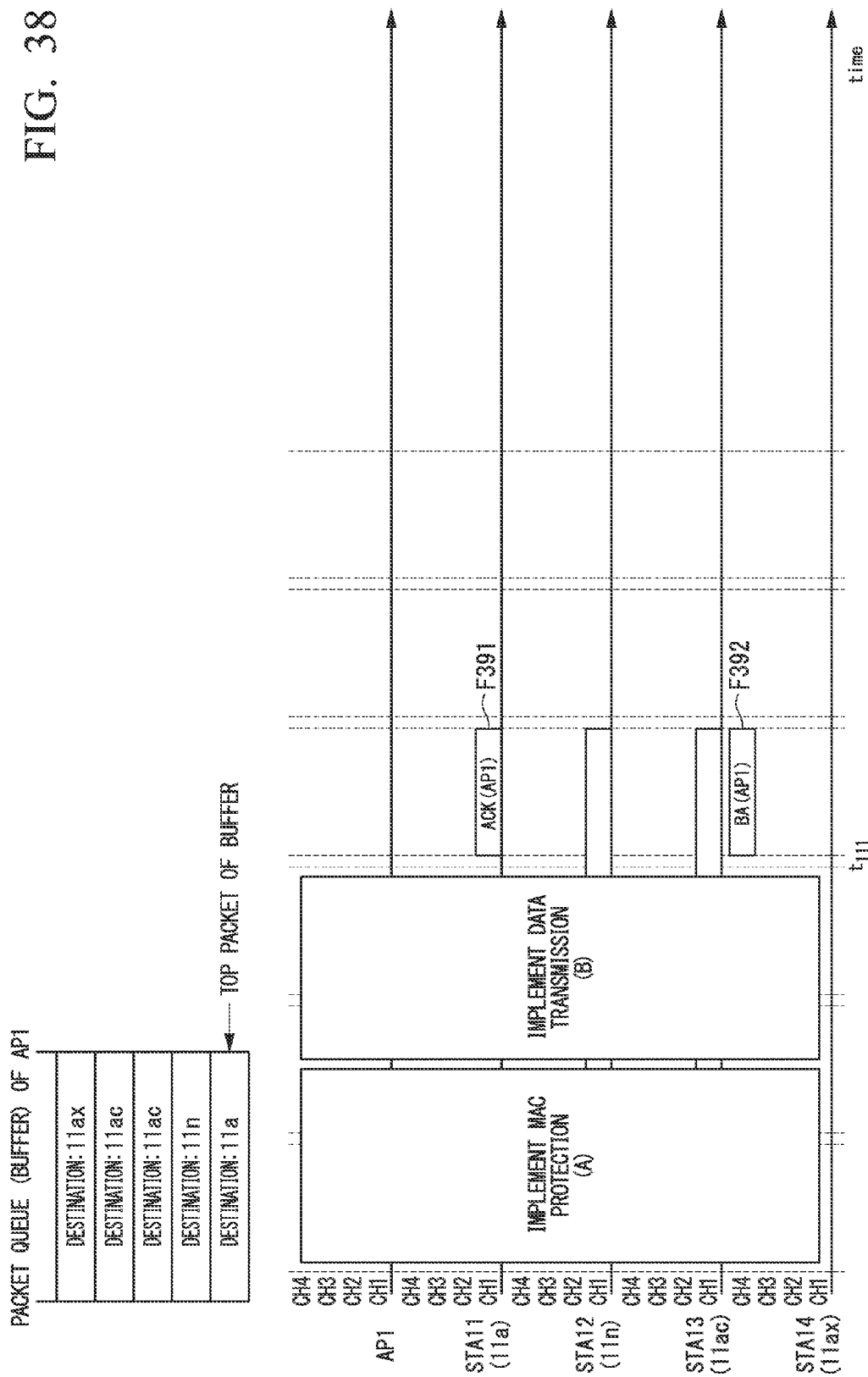
FIG. 38 is a time chart showing a frame sequence in which the number of terminals responding to communication is two or more; secondary channels are additionally used for response confirmation with guard bands.

Next, a frame sequence dedicated to the case (C-4 shown in FIG. 34) where the number of terminals responding to communication is two or more while secondary channels are additionally used to confirm responses with guard bands will be described with reference to FIG. 38. FIG. 38 is a time chart showing a frame sequence in which the number of terminals responding to communication is two or more while secondary channels are additionally used to confirm responses with guard bands. This frame sequence is designed such that a legacy terminal sends back ACK (or BA) on a primary channel while an 11ax wireless communication terminal sends back BA on a secondary channel, which is distanced from the primary channel as far as possible, among secondary channels used to receive data. To achieve this process, the length of BA is adjusted to the transmission time of ACK by way of an MCS change while an 11ax wireless communication terminal is tuned to a center frequency (i.e. a carrier frequency) of a legacy terminal. Thus, it is possible to reduce interference between channels.

When the wireless base station AP1 transmits data to an 11a wireless communication terminal on Channel 1 while transmitting data to 11ax wireless communication terminals on Channels 2, 3, 4, the 11ax wireless communication terminal STA11 sends back an ACK frame F391 on Channel 1 (i.e. a primary channel) (time $t_{111}$). Concurrently, the 11ax wireless communication terminal STA14 sends back a BA frame F392 on a secondary channel which is distanced from Channel 1 as far as possible (time $t_{111}$). For example, the 11ax wireless communication terminal uses Channel 4 while the 11a wireless communication terminal uses Channel 1.

As described above, it is possible to prevent a negative influence on communication of a legacy terminal since the wireless base station confirms responses from secondary wireless communication stations on a single channel which is distanced from a primary channel as far as possible.

<C-5(1)>

Figure 39:
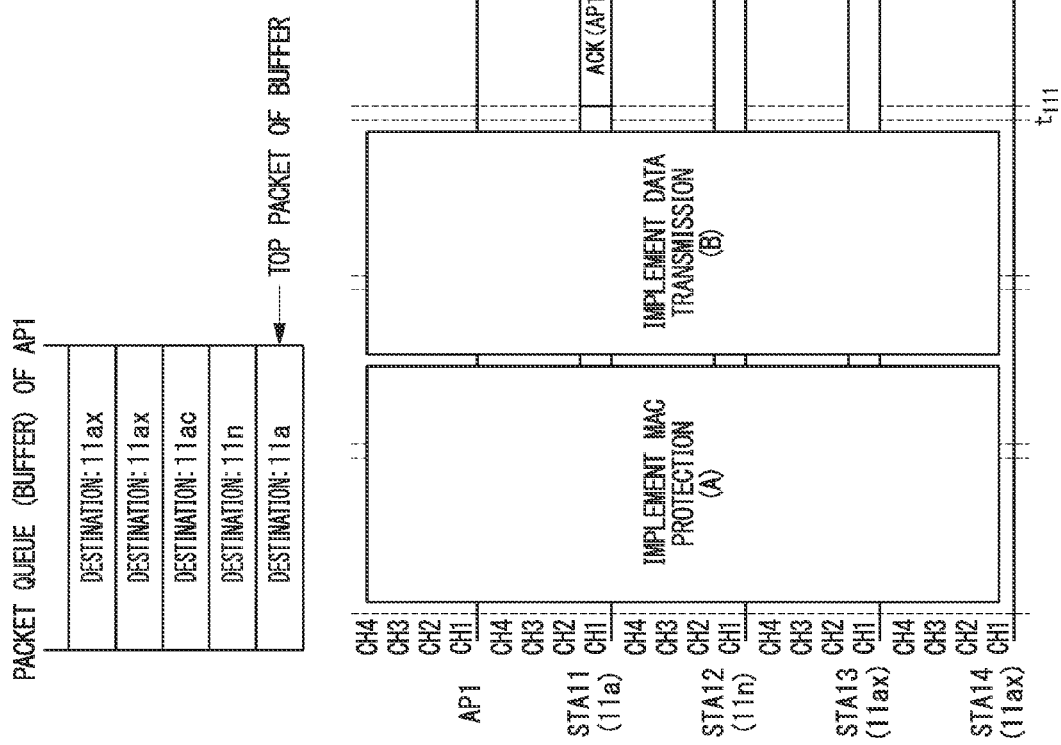
FIG. 39 is a time chart showing a frame sequence in which the number of terminals responding to communication is two or more; UL OFDMA are used for response confirmation.

Next, a frame sequence dedicated to the case (C-5 shown in FIG. 34) where the number of terminals responding to communication is two or more while UL-OFDMA is used for response confirmation will be described with reference to FIG. 39. FIG. 39 is a time chart showing a frame sequence in which the number of terminals responding to communication is two or more while UL-OFDMA is used for response confirmation. This frame sequence allows the wireless base station to send or receive BAR, BA on channels (which may include a primary channel as necessary) which are used to transmit data so as to confirm responses, wherein BAR is transmitted using DL-OFDMA while BA is transmitted using UL-OFDMA.

When the wireless base station AP1 transmits data to an 11a wireless communication terminal and an 11ax wireless communication terminal (i.e. the wireless communication terminals STA13 and STA14), the 11a wireless communication terminal STA11 sends back an ACK frame F401 on Channel 1 (time $t_{111}$). Next, the wireless base station AP1 transmits BAR to the wireless communication terminal STA14 on Channels 1, 4 while transmitting BAR frames F402 to F405 to the wireless communication terminal STA13 on Channels 2, 3 (time $t_{112}$). At this time, the wireless base station AP1 transmits BAR using DL-OFDMA. Accordingly, the wireless communication terminal STA13 sends back BA frames F406, F407 on Channels 2, 3 while the wireless communication terminal STA14 sends back BA frames F408, F409 on Channels 1, 4 (time $t_{113}$). At this time, the wireless communication terminals STA13 and STA14 send back BA using UL-OFDMA.

As described above, it is possible for the wireless base station to transmit BAR frames so as to call a plurality of secondary wireless communication stations, which in turn send back BA using uplink OFDMA.

<C-5(2)>

Next, a frame sequence dedicated to the case (C-5 shown in FIG. 34) where the number of terminals responding to communication is two or more while using UL-MU-MIMO and UL-OFDMA will be described with reference to FIG. 40. FIG. 40 is a time chart showing a frame sequence in which the number of terminals responding to communication is two or more while using UL-MU-MIMO and UL-OFDMA. This frame sequence is designed to confirm responses using UL-OFDMA and SDMA in which BAR is transmitted at a Duplicate mode while BA is transmitted using UL-OFDMA or UL-MU-MIMO.

When the wireless base station AP1 transmits data to an 11a wireless communication terminal and an 11ax wireless communication terminal (i.e. the wireless communication terminals STA13 and STA14), the 11a wireless communication terminal STA11 sends back an ACK frame F411 on Channel 1 (time $t_{111}$). Next, the wireless base station AP1 transmits BAR frames F412 to F415 on all channels by specifying a group ID (time $t_{112}$). At this time, the wireless base station AP1 transmits a BAR frame at a Duplicate mode. Accordingly, the wireless communication terminal STA13 sends back BA frames F416, F417 on Channels 2, 3 while the wireless communication terminal STA14 sends back BA frames F418 to F421 on all channels (time t113). At this time, the wireless communication terminal STA13 and STA14 send back BA using UL-OFDMA and UL MU-MIMO.

As described above, it is possible to use the uplink OFDMA and the uplink MU-MIMO when communication stations send back BA by use of channels which may partly overlap each other.

Next, various combinations of frame sequences for use in the foregoing MAC protection will be described with reference to FIG. 41. FIG. 41 shows frame sequences which can be combined together for use in MAC protection. In FIG. 41, symbols ⊚○ show combinable frame sequences while a symbol x shows uncombinable frame sequences. Herein, a symbol ⊚ particularly shows effective combinations among combinable frame sequences. Additionally, a symbol - shows the same combination of frame sequences which cannot be realized as practical combinations.

Figure 42:
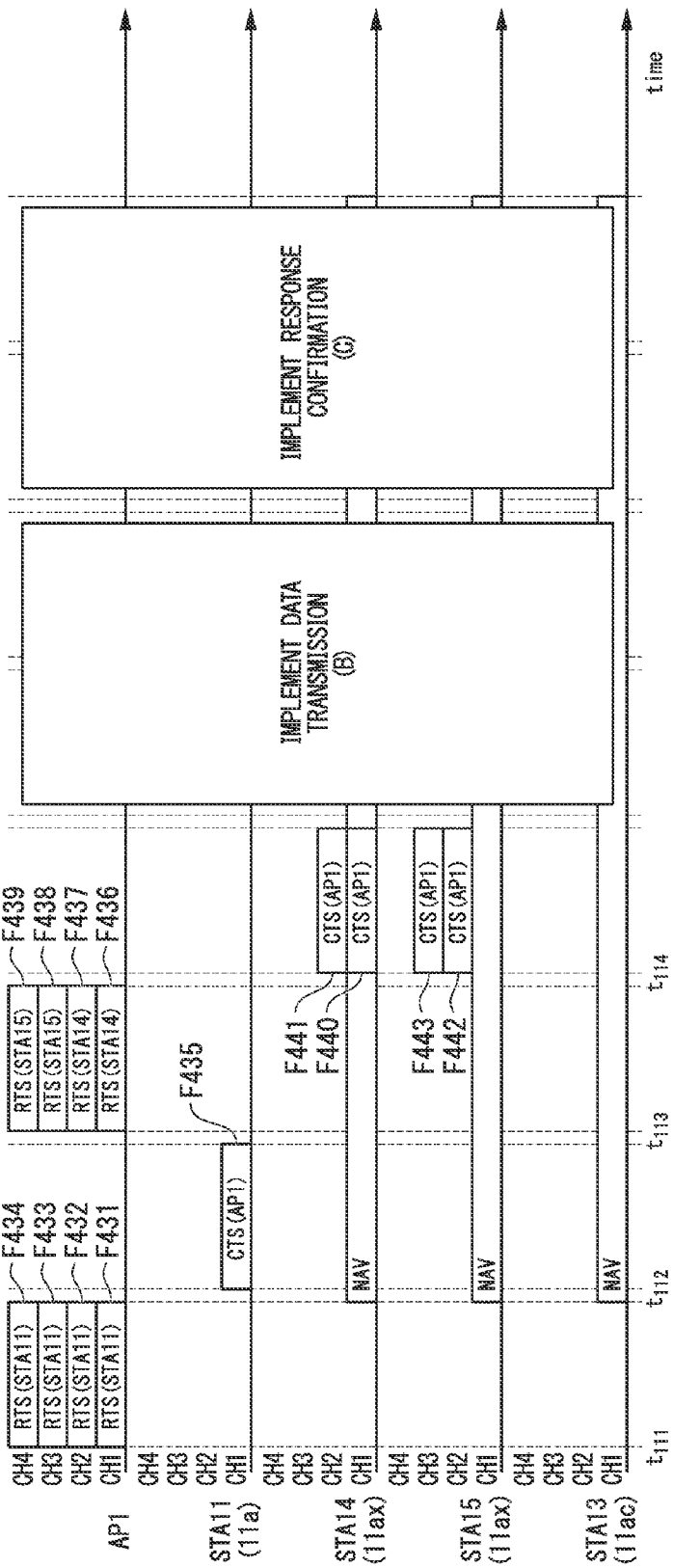
FIG. 42 is a time chart showing an example of combined frame sequences.

Next, an example of a frame sequence combining various frame sequences will be described with reference to FIG. 42. FIG. 42 is a time chart showing an example of a frame sequence combining various frame sequences. This frame sequence may implement RTS/CTS exchange involving legacy terminals, which aims to transmit RTS using the fixed bandwidth while reducing overheads as small as possible by simultaneously sending back multiplexed CTS frames to 11ax wireless communication terminals. The frame sequence shown in FIG. 42 combines the foregoing frame sequences of A1-3 and A1-6(1).

First, the wireless base station AP1 transmits RTS frames F431 to F434 (i.e. the Non-HT Duplicate mode, and the Dynamic BW mode) to the wireless communication terminal STA11 serving as a legacy terminal, thus reserving larger bands (time $t_{111}$). Accordingly, the wireless communication terminal STA11 sends back a CTS frame F435 (time $t_{112}$). On the other hand, the wireless base station AP1 transmits RTS frames F436 to F439 to 11ax wireless communication terminals (i.e. the wireless communication terminals STA14 and STA15) using OFDMA (time $t_{113}$). Accordingly, the wireless communication terminals STA14 and STA15 send back CTS frames F440-F441 and F442-F443 (time $t_{114}$).

As described above, when communication stations serving as destinations of RTS frames do not send back CTS frames on part of channels, the wireless base station transmits RTS frames to other wireless communication stations on all channels used for preceding transmission of RTS frames (i.e. the fixed bandwidth mode), and therefore it is possible to reconfirm whether or not any frames are transmitted on channels not used to send back CTS frames. Additionally, the wireless base station transmits RTS frames to different wireless communication terminals using downlink OFDMA. Accordingly, the wireless communication terminals STA14 and STA15 receiving RTS frames send back CTS frames using uplink OFDMA. Thus, it is possible for wireless communication terminals to simultaneously send back CTS frames on channels used to receive RTS frames.

Figure 43:
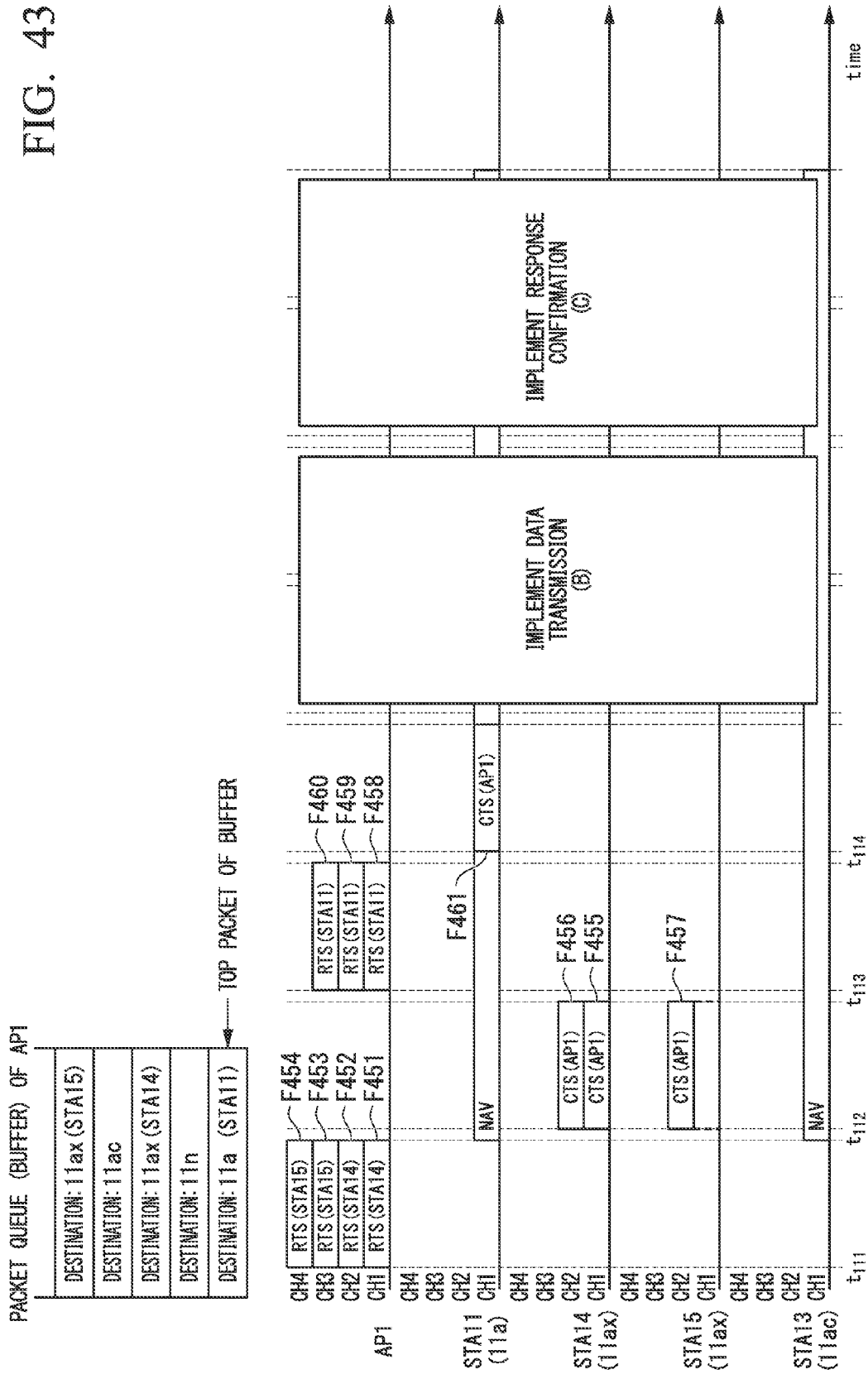
FIG. 43 is a time chart showing another example of combined frame sequences.

Next, another example of a frame sequence combining various frame sequences will be described with reference to FIG. 43. FIG. 43 is a time chart showing another frame sequence combining various frame sequences. This frame sequence may implement RTS/CTS exchange involving legacy terminals, which aims to transmit RTS using variable bandwidths while reducing overheads as small as possible by simultaneously sending back multiplexed CTS frames to 11ax wireless communication terminals. The frame sequence shown in FIG. 43 combines the foregoing frame sequences of A1-5 and A1-6(1).

The wireless base station AP1 transmits RTSA frames F451 to F454 (i.e. the Non-HT Duplicate mode, the Dynamic BW mode) to 11ax wireless communication terminals, irrespective of the top packet of a packet queue destined to legacy terminals (i.e. 11a wireless communication terminals), on all channels each having 20 MHz, thus reserving larger bands (time $t_{111}$). Then, the 11ax wireless communication terminals invoked by RTS simultaneously send back CTS frames F455-F456 and F457 using UL-OFDMA (time $t_{112}$). Next, he wireless base station AP1 transmits RTS frames F458 to F460 to 11a wireless communication terminals so as to confirm whether or not to transmit data thereto (time $t_{113}$). Accordingly, the wireless communication terminal STA11 sends back a CTS frame F461 (time $t_{114}$).

As described above, the former part of a sequence confirms whether or not to transmit frames to destination stations which can reply to communication by dynamically setting bands, and then the wireless base station using RTS frames confirms whether or not to transmit frames to destination stations based on the existing standards (11a, n) stipulating fixed bandwidths for reply, and therefore it is possible to confirm transmission bands which can be commonly used for all destination stations. Additionally, it is possible to transmit RTS frames to different wireless communication terminals using downlink OFDMA. The wireless communication terminals STA14 and STA15 receiving RTS frames send back CTS frames using uplink OFDMA. Thus, it is possible for wireless communication stations to simultaneously send back CTS frames used to receive RTS frames.

Figure 44:
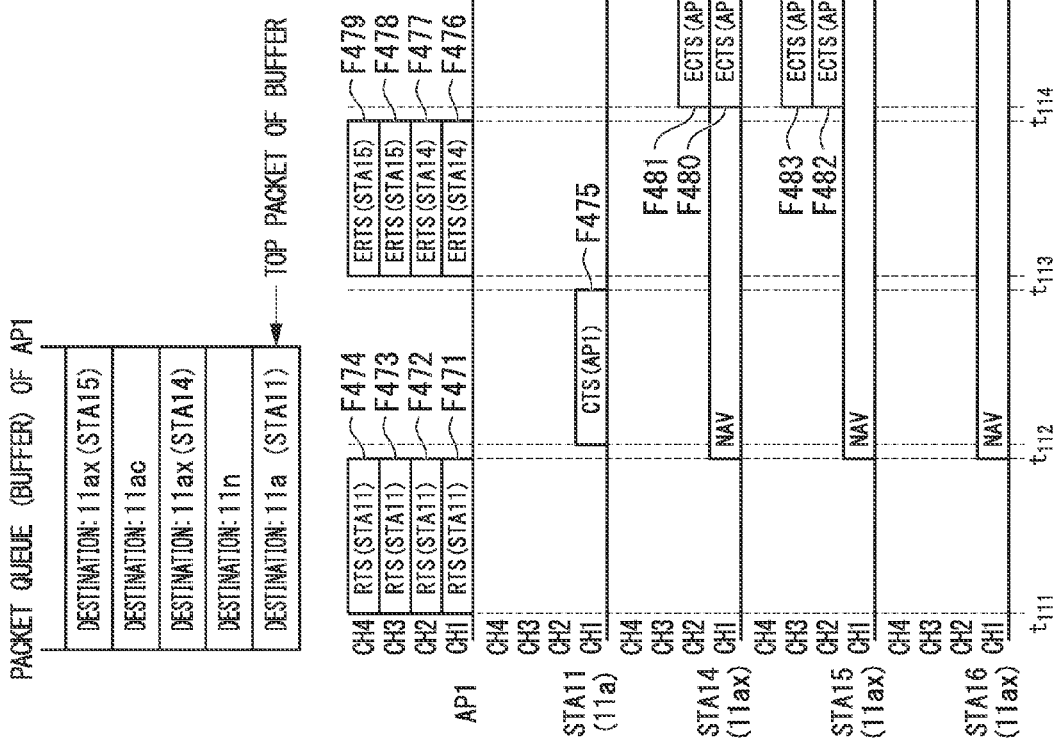
FIG. 44 is a time chart showing a further example of combined frame sequences.

Next, a further example of a frame sequence combining various frame sequences will be described with reference to FIG. 44. FIG. 44 is a time chart showing a further example of a frame sequence combining various frame sequences. This frame sequence may implement RTS/CTS exchange involving legacy terminals, which aims to exchange information not included in RTS/CTS such as channel information with 11ax wireless communication terminals by use of ERTS/ECTS.

The wireless base station AP1 transmits RTS frames F471 to F474 to the wireless communication terminal STA11 serving as a legacy terminal (time $t_{111}$), and therefore the wireless communication terminal STA11 sends back a CTS frame F475 (time $t_{112}$). After MAC protection with a legacy terminal, the wireless base station AP1 transmits ERTS frames F476 to F479 to 11ax wireless communication terminals (i.e. the wireless communication terminals STA14 and STA15) (time $t_{113}$), and therefore the wireless communication terminals STA14 and STA15 send back ECTS frames F480-F481 and F482-F483 (time $t_{114}$).

As described above, the top part of a sequence is used to transmit RTS frames via all bands so that destination stations supporting the existing standards (11a, n) can send back CTS frames, and therefore it is possible to include the whole process in a sequence without changing functions of terminal stations supporting the existing standards. Subsequent to receiving CTS frames, the wireless base station may use ERTS frames to request OFDMA-adapted destination stations to send back ECTS frames using UL OFDMA, and therefore it is possible for OFDMA-adapted destination stations to reduce times of transmitting ECTS frames, thus reducing overheads.

As shown in FIG. 45, it is possible to combine frame sequences used for MAC protection using ERTS/ECTS. FIG. 45 is a schematic illustration showing combinations of frame sequences used for MAC protection using ERTS/ECTS. In FIG. 45, a symbol ○ indicates combinable frame sequences while a symbol x indicates uncombinable frame sequences. Additionally, a symbol - indicates the same combination of frame sequences which cannot be realized as practical combinations.

Next, sequences which combine the foregoing frame sequences to implement MAC protection, data transmission, and response confirmation will be described with reference to FIGS. 46 to 51.

Figure 46:
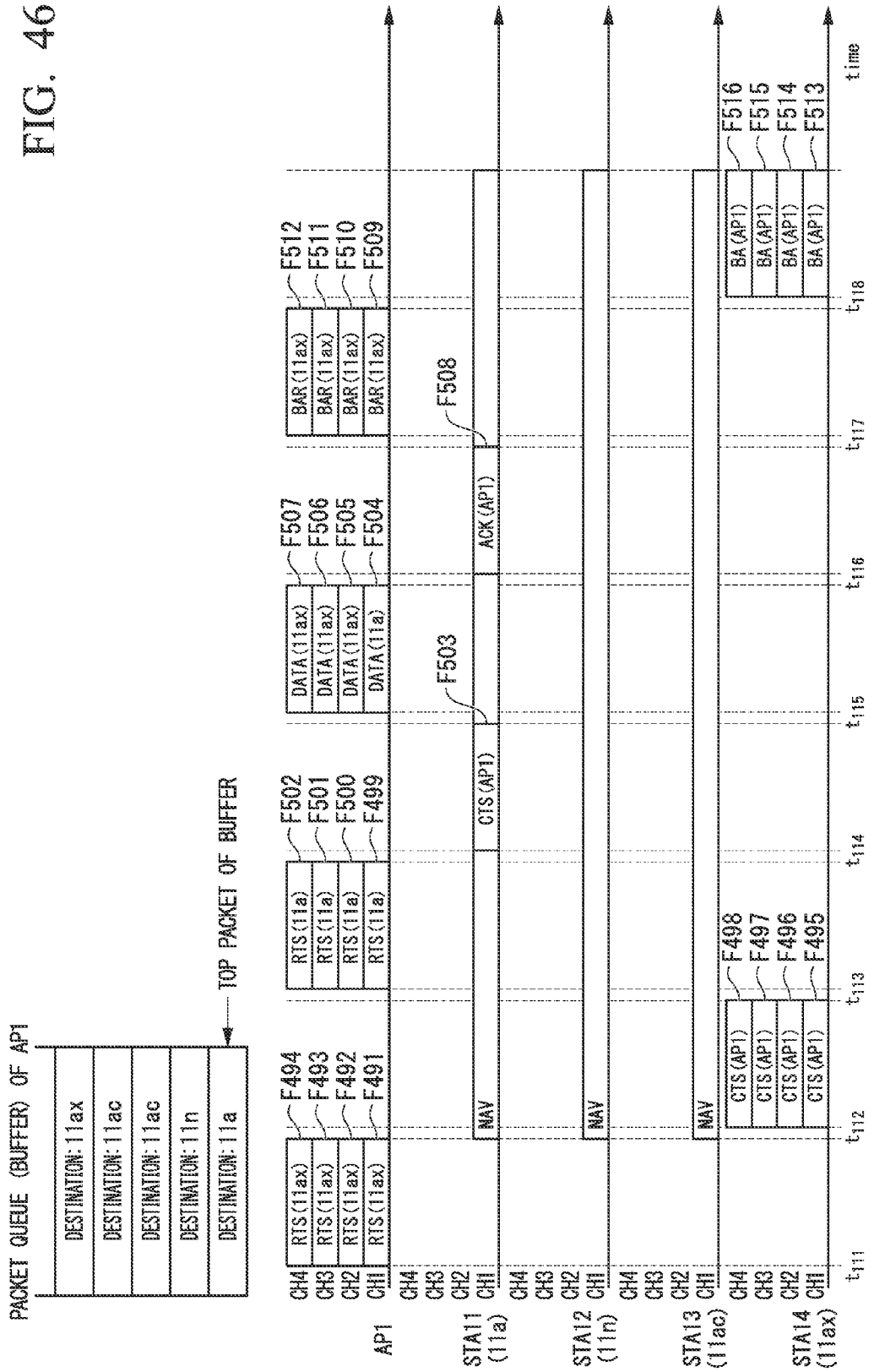
FIG. 46 is a time chart showing a sequence of implementing MAC protection, data transmission, and response confirmation using a combination of frame sequences.

FIG. 46 is a time chart showing a frame sequence combining frame sequences of A1-3(1) (or A1-5), B-1(1), and C-3. Owing to data destined to 11a wireless communication terminals and 11ax wireless communication terminals, the wireless base station AP1 transmits RTS frames F491 to F494 to an 11ax wireless communication terminal on all channels each having 20 MHz (time $t_{111}$). Accordingly, the 11ax wireless communication terminal STA14 sends back CTS frames F495 to F498 (time $t_{112}$). Next, the wireless base station AP1 transmits RTS frames F499 to F502 to 11a wireless communication terminals so as to confirm whether or not to transmit data thereto (time $t_{113}$). Accordingly, the wireless communication terminal STA11 sends back a CTS frame F503 (time $t_{114}$). Thereafter, the wireless base station AP1 transmits frames F504 to F507 to 11a wireless communication terminals and 11ax wireless communication terminals (time $t_{115}$). Accordingly, the wireless communication terminal STA11 sends back an ACK frame F508 (time $t_{116}$). Additionally, the wireless base station AP1 transmits BAR frames F509 to F512 to 11ax wireless communication terminals (time $t_{117}$), and therefore the 11ax wireless communication terminal STA14 sends back BA frames F513 to F516.

As described above, the present frame sequence is designed to allocate primary channels to destination stations solely supporting the existing standards while allocating secondary channels to OFDMA-adapted terminals, thus achieving MAC protection, data transmission, and ACK responses. That is, it is possible to achieve data transmission using secondary channels, which are not used for transmitting data to conventional destination stations solely supporting the existing standards, thus improving transmission efficiencies.

Figure 47:
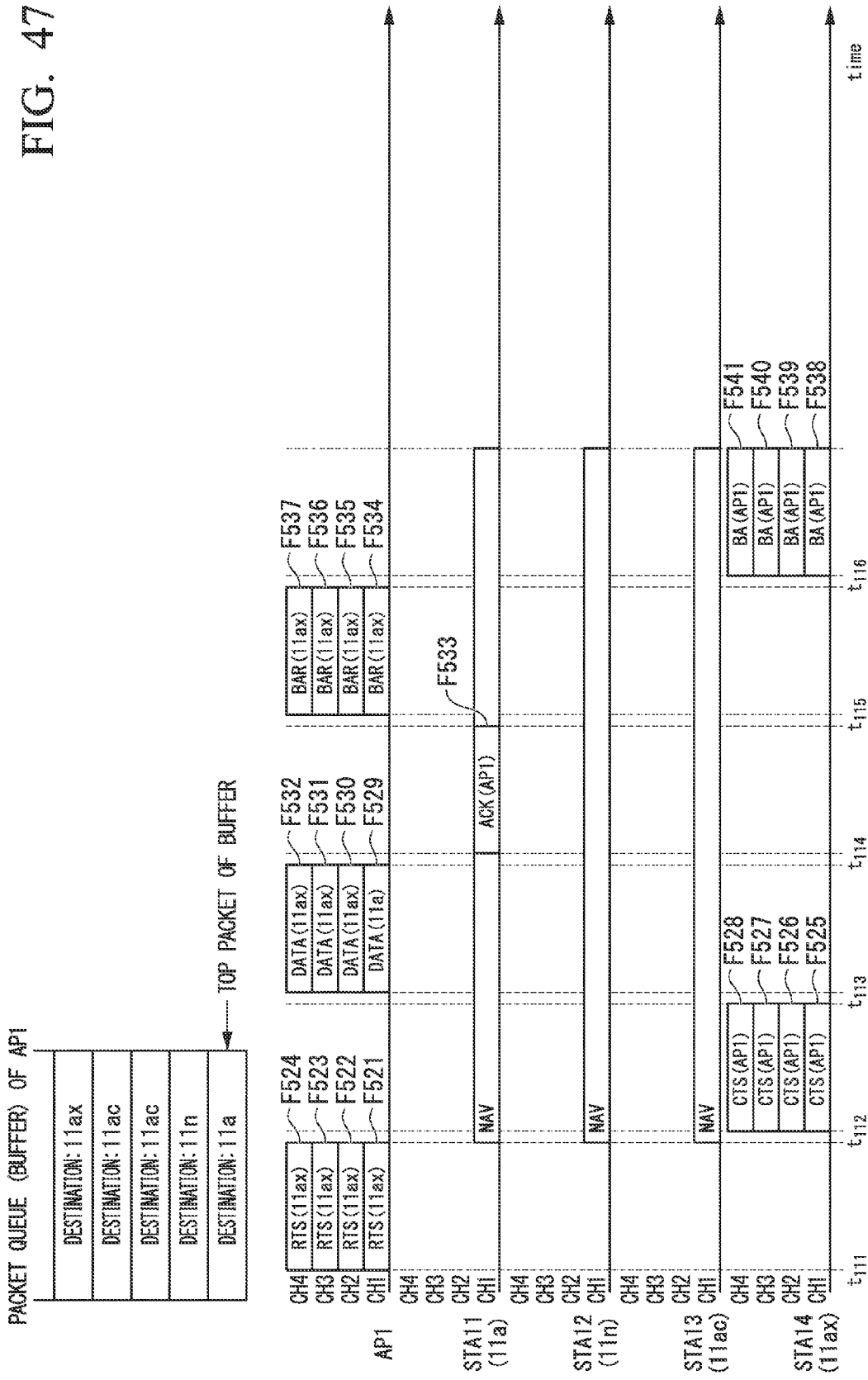
FIG. 47 is a time chart showing a sequence of implementing MAC protection, data transmission, and response confirmation using a combination of frame sequences.

FIG. 47 is a time chart showing a frame sequence combining the foregoing frame sequences of A1-1, B-1(1), and C-3. Owing to data destined to 11a wireless communication terminals and 11ax wireless communication terminals, the wireless base station AP1 transmits RTS frames F511 to F524 to 11ax wireless communication terminals on all channels each having 20 MHz (time $t_{111}$). Accordingly, the 11ax wireless communication terminal STA14 sends back CTS frames F525 to F528 (time $t_{112}$). Then, the wireless base station AP1 transmits a frame F529 to an 11a wireless communication terminal while transmitting frames F530 to F532 tog an 11ax wireless communication terminal (time $t_{113}$). Accordingly, the wireless communication terminal STA11 sends back an ACK frame F533 (time $t_{114}$). Then, the wireless base station AP1 transmits BAR frames F534 to F537 to an 11ax wireless communication terminal (time $t_{115}$). Accordingly, the 11ax wireless communication terminal STA14 sends back BA frames F538 to F541 (time $t_{116}$).

As described above, the present frame sequence is designed to transmit wireless frames to destination stations solely supporting the existing standards on primary channels upon applying MAC protection to OFDMA-adapted terminals. Additionally, the present frame sequence transmits wireless frames to OFDMA-adapted destination stations on secondary channels according to OFDMA transmission while transmitting BAR frames to sequentially request OFDMA-adapted destination stations to send back BA frames, wherein, for the sake of response confirmation, destination stations solely supporting the existing standards may firstly transmit ACK frames. This eliminates the necessity of applying additional functions to destination stations solely supporting the existing standards, and therefore it is possible to achieve OFDMA transmission towards both the OFDMA-adapted destination stations and the destination stations solely supporting the existing standards, thus improving usage efficiencies of secondary channels.

Figure 48:
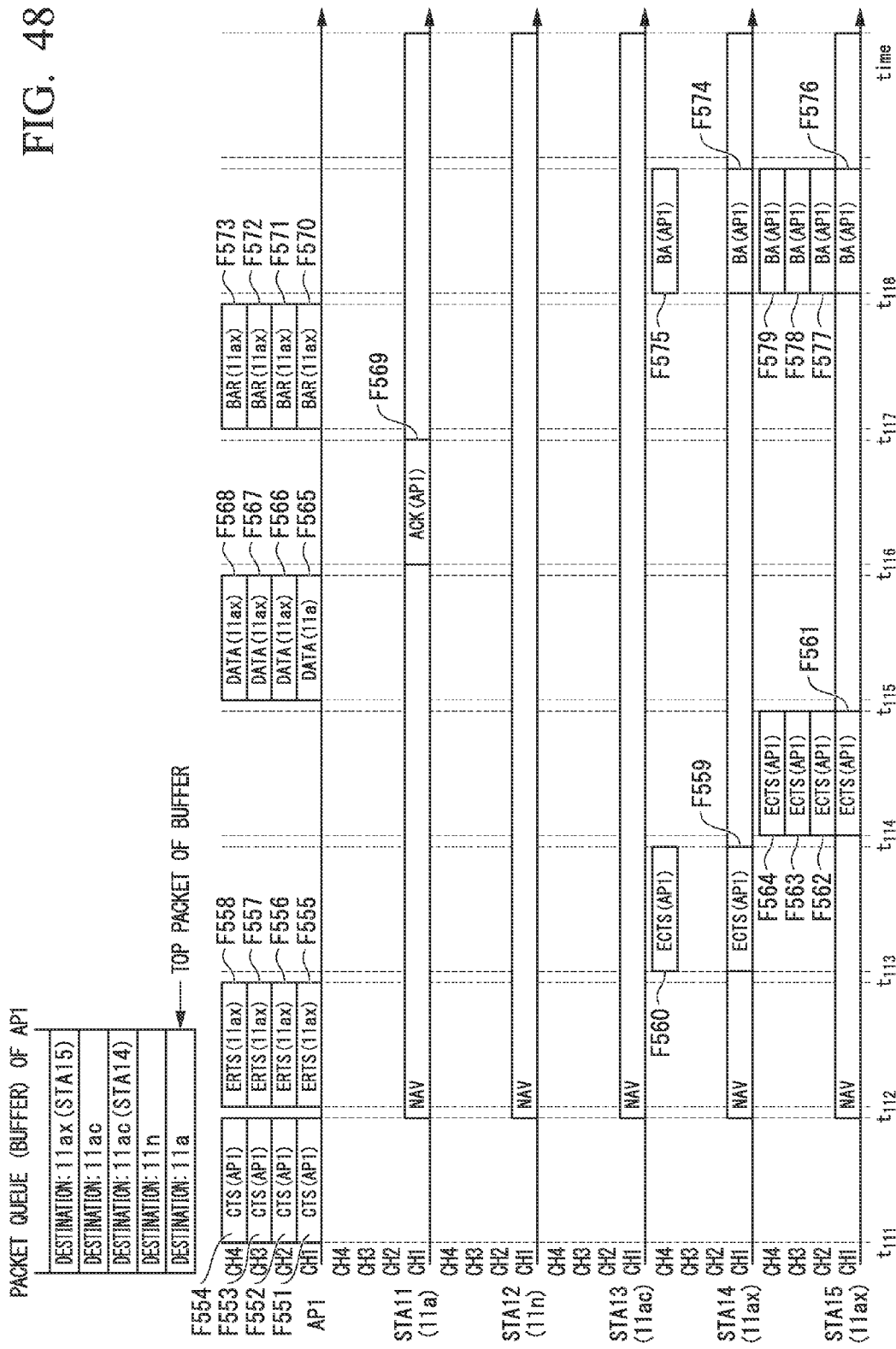
FIG. 48 is a time chart showing a sequence of implementing MAC protection, data transmission, and response confirmation using a combination of frame sequences.

FIG. 48 is a time chart showing a frame sequence combining various frame sequences of CTS-To-Self, A2-2, B-1(1), and C-5(2). For the sake of NAV settings with legacy terminals, the wireless base station AP1 transmits CTS frames F551 to F554 according to CTS-To-Self (time $t_{111}$). Subsequently, the wireless base station AP1 transmits ERTS frames F555 to F558 to 11ax wireless communication terminals (time $t_{112}$). Accordingly, the 11ax wireless communication terminal STA14 sends back ECTS frames F559 and F560 (time $t_{113}$). Additionally, the 11ax wireless communication terminal STA15 sends back ECTS frames F561 to F564 (time $t_{114}$). Then, the wireless base station AP1 transmits frames F565 to F568 to 11a wireless communication terminals and flax wireless communication terminals (time $t_{115}$).

Next, the wireless communication terminal STA11 sends back an ACK frame F569 (time $t_{116}$). Subsequently, the wireless base station AP1 transmits BAR frames F570 to F573 to 11ax wireless communication terminals (time $t_{117}$). Accordingly, the 11ax wireless communication terminals STA14 and STA15 send back BA frames F574-F575 and F576-F579 (time $t_{118}$).

As described above, the present frame sequence is designed to confirm available channels with OFDMA-adapted destination frames by use of ERTS frames upon establishing NAV settings by use of CTS frames readable in all terminals including terminals supporting the existing standards by way of the top portion of a sequence, and therefore it is possible to reliably handle exchanges of ERTS and ECTS frames. Additionally, the present frame sequence allocates primary channels to destination stations solely supporting the existing standards while allocating secondary channels to OFDMA-adapted terminals, thus achieving MAC protection, data transmission, and ACK responses. Thus, it is possible to achieve data transmission using secondary channels, which are not used for transmitting data to conventional destination stations solely supporting the existing standards, thus improving transmission efficiencies.

Figure 49:
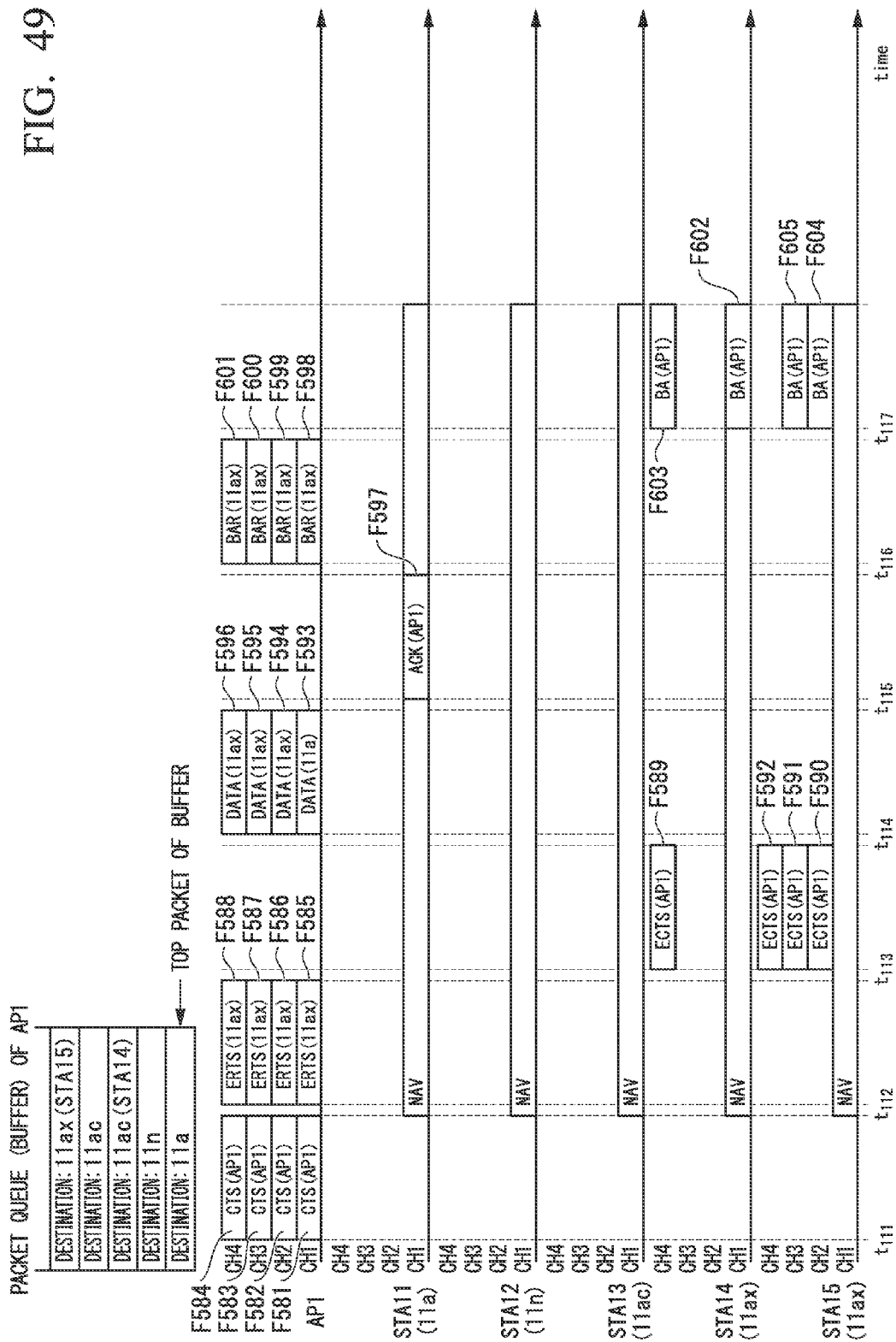
FIG. 49 is a time chart showing a sequence of implementing MAC protection, data transmission, and response confirmation using a combination of frame sequences.

FIG. 49 is a time chart showing a frame sequence combining various frame sequences of CTS-To-Self, A2-5(1), B-1(1), and C-5(1). For the sake of NAV settings with legacy terminals, the wireless base station AP1 transmits CTS frames F581 to F584 according to CTS-To-Self (time $t_{111}$). Subsequently, the wireless base station AP1 transmits ERTS frames F585 to F588 to 11ax wireless communication terminals (time $t_{112}$). Accordingly, the 11ax wireless communication terminals STA14 and STA15 send back ECTS frames F589, F590-F592 (time $t_{113}$). Using SDMA+ OFDMA (e.g. Channel 4 for SDMA), the wireless base station AP1 transits frames F593 to F596 to 11a wireless communication terminals and 11ax wireless communication terminals (time $t_{114}$).

Next, the wireless communication terminal STA11 sends back an ACK frame F597 (time $t_{115}$). Subsequently, the wireless base station AP1 transmits BAR frames to 11ax wireless communication terminals (time $t_{116}$). Accordingly, the 11ax wireless communication terminals STA14 and STA15 send back BA frames F602-F603 and F604-F605 (time $t_{117}$).

As described above, the present frame sequence is designed to confirm available channels with OFDMA-adapted destination stations by use of ERTS frames upon establishing NAV settings by use of CTS frames readable in all terminals including terminals supporting the existing standards by way of the top portion of a sequence, and therefore it is possible to reliably achieve exchanges between ERTS frames and ECTS frames. By using uplink OFDMA transmission in replying ECTS frames, it is possible to reduce transmission times compared to transmission times according to time division transmission, thus improving transmission efficiencies. The present frame sequence allocates primary channels to destination stations solely supporting the existing standards while allocating secondary channels to OFDMA-adapted terminals, thus achieving MAC protection, data transmission, and ACK responses. Thus, it is possible to achieve data transmission using secondary channels, which are not used for transmitting data to conventional destination stations solely supporting the existing standards, thus improving transmission efficiencies.

Figure 50:
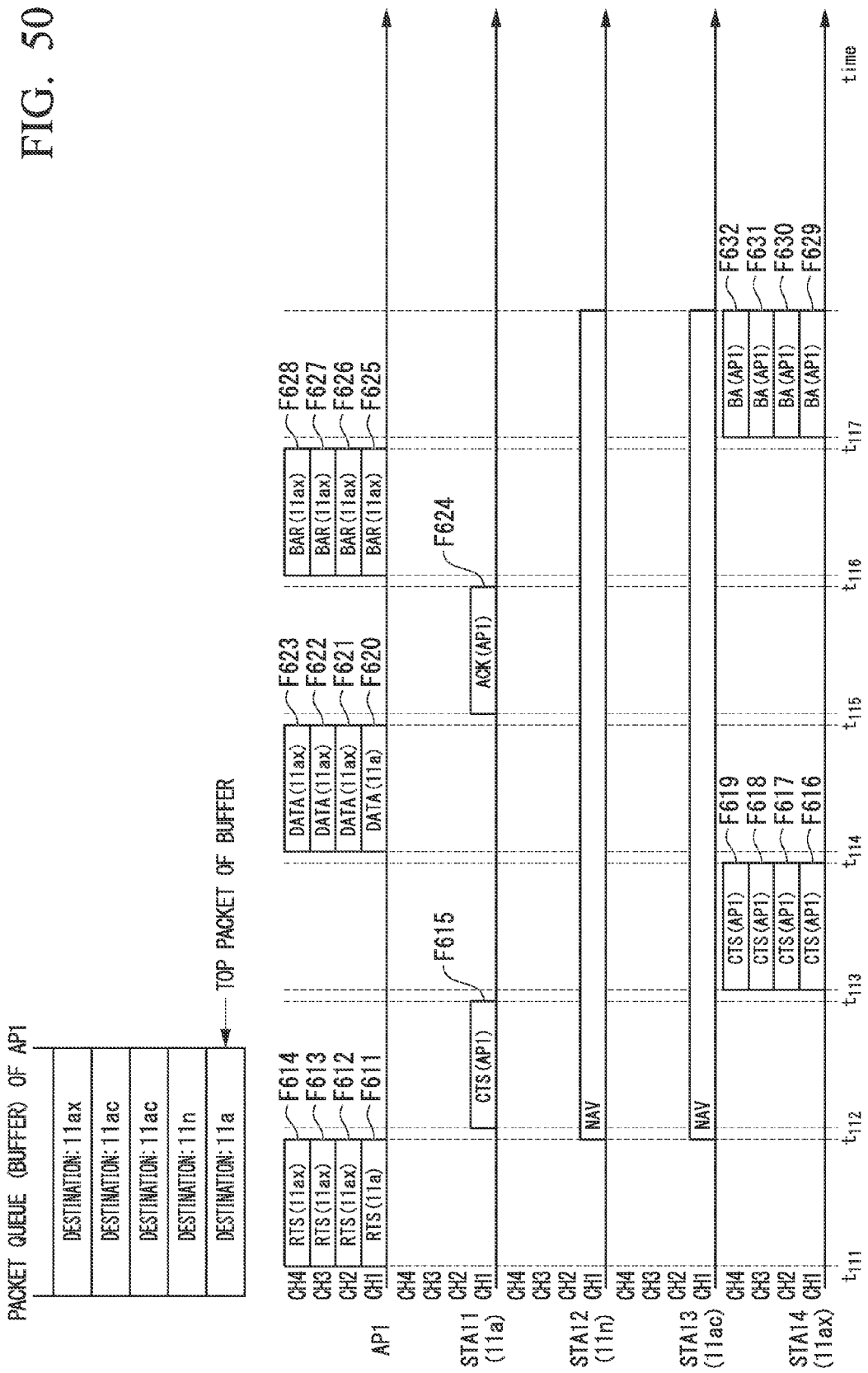
FIG. 50 is a time chart showing a sequence of implementing MAC protection, data transmission, and response confirmation using a combination of frame sequences.

FIG. 50 is a time chart showing a frame sequence combining various frame sequences of A1-8, B-1(1), and C-3. Owing to data destined to 11a wireless communication terminals and 11ax wireless communication terminals, the wireless base station AP1 transmits RTS frames F611 to F614 to 11a wireless communication terminals on primary channels and to 11ax wireless communication terminals on secondary channels (time $t_{111}$). Accordingly, the wireless communication terminal STA11 sends back a CTS frame F615 (time $t_{112}$). Additionally, the 11ax wireless communication terminal STA14 sends back CTS frames F616 to F619 (time $t_{113}$).

Next, the wireless base station AP1 transmits frames F620 to F623 to 11a wireless communication terminals and 11ax wireless communication terminals (time $t_{114}$). Accordingly, the wireless communication terminal STA11 sends back an ACK frame F624 (time $t_{115}$). Subsequently, the wireless base station AP1 transmits BAR frame F625 to F628 to an 11ax wireless communication terminal (time $t_{116}$). Accordingly, the 11ax wireless communication terminal STA14 sends back BA frames F629 to F632 (time $t_{117}$).

As described above, the present frame sequence is able to achieve MAC protection, data transmission, and ACK responses and to achieve data transmission using secondary channels which are not used for transmitting data to conventional destination stations solely supporting the existing standards, thus improving transmission efficiencies. Additionally, the present frame sequence allocates primary channels to destination stations solely supporting the existing standards while allocating secondary channels to OFDMA-adapted terminals, wherein destination stations solely supporting the existing standards firstly send back CTS frames, and then OFDMA-adapted destination stations successively send back CTS frames. This process can be implemented without changing destination stations solely supporting the existing standards. Additionally, it is possible to request a plurality of CTS frames upon one-time transmission of RTS frames, thus improving transmission efficiencies.

Figure 51:
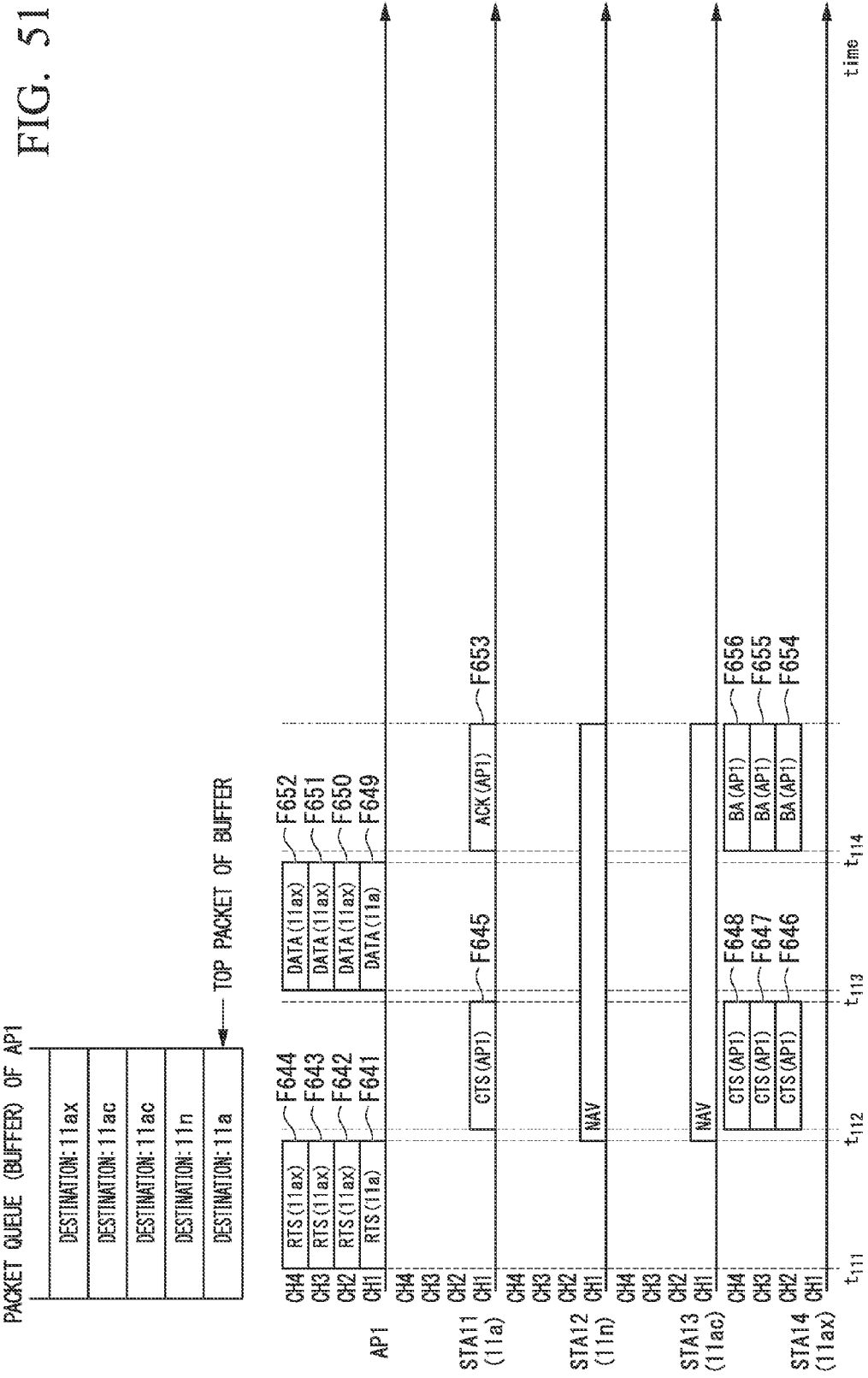
FIG. 51 is a time chart showing a sequence of implementing MAC protection, data transmission, and response confirmation using a combination of frame sequences.
Figure 52:
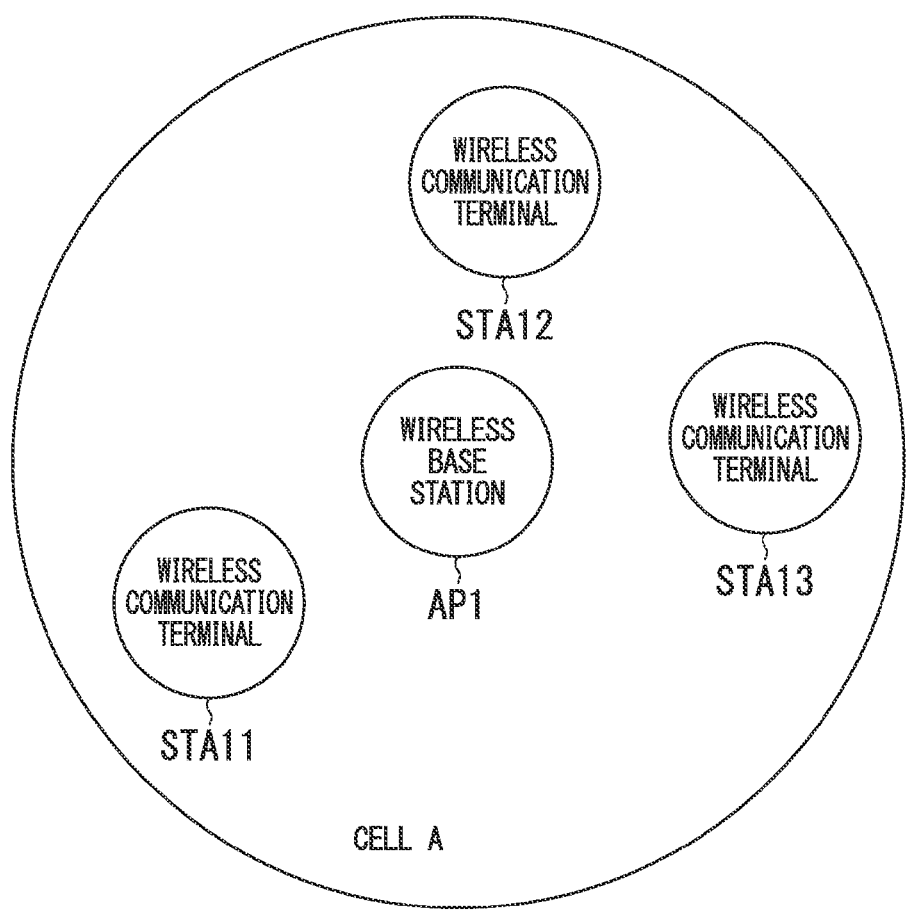
FIG. 52 is a schematic illustration of a wireless LAN cell A configured of one wireless base station AP1 and three wireless communication terminals STA11 to STA13.
Figure 53:
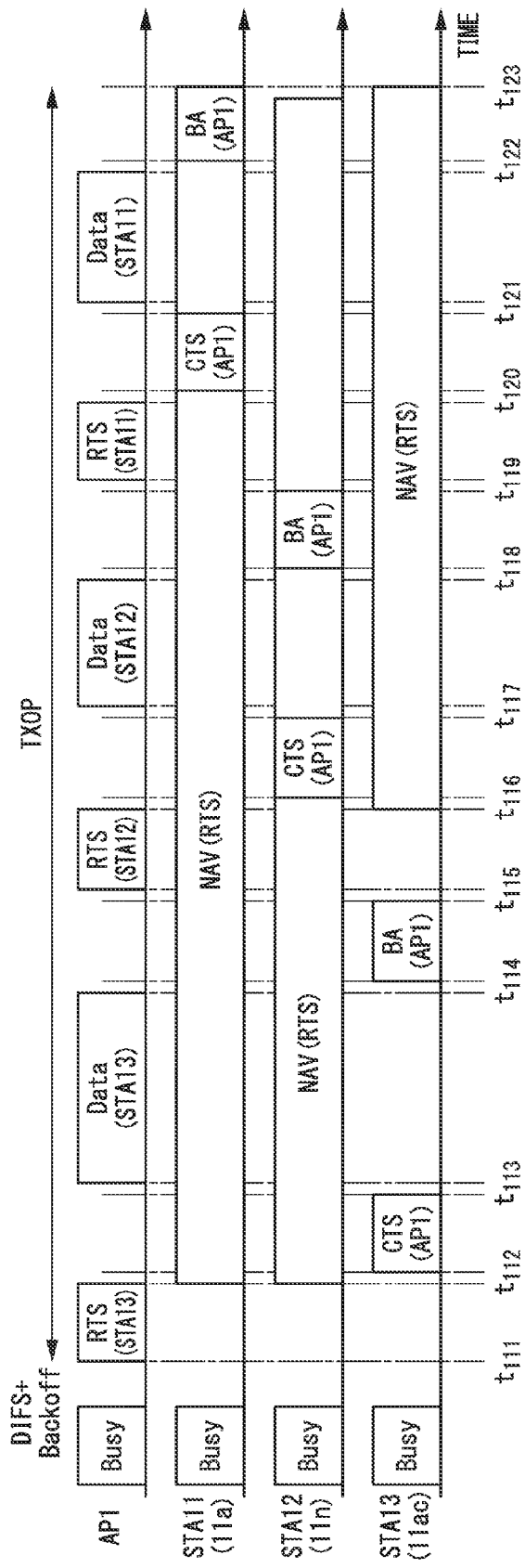
FIG. 53 is a time chart showing the timings of transmitting frames when a TXOP-Holder wireless communication station transmits a plurality of frames to other wireless communication stations in TXOP.
Figure 54:
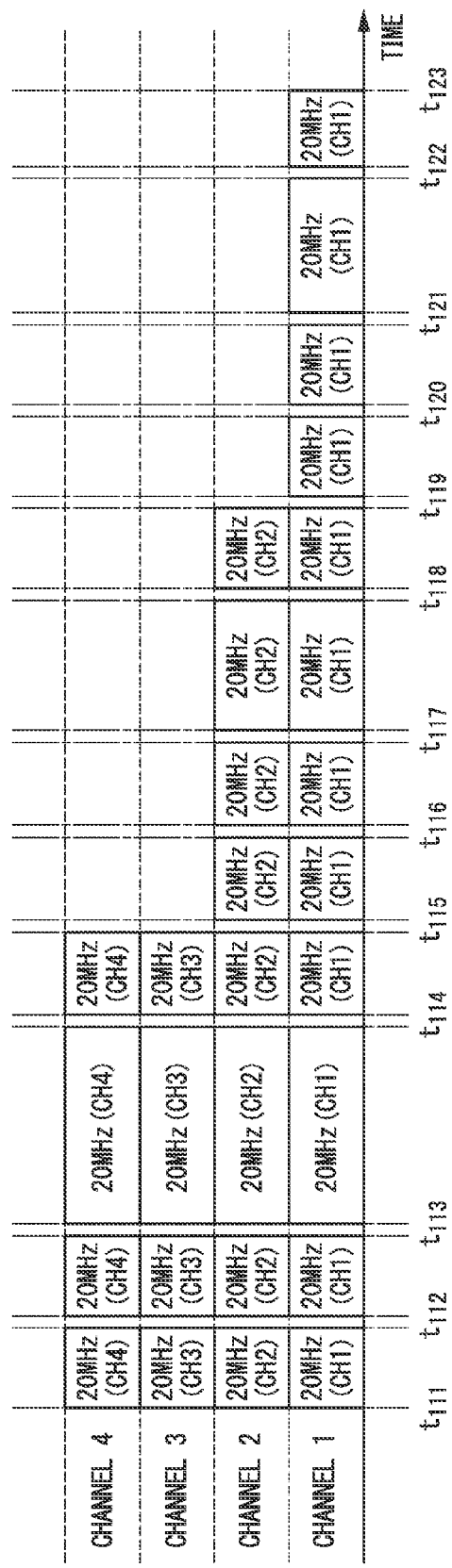
FIG. 54 shows channel bandwidths used for data transmission between the wireless base station AP1 and the wireless communication terminals STA11 to STA13.
Figure 55:
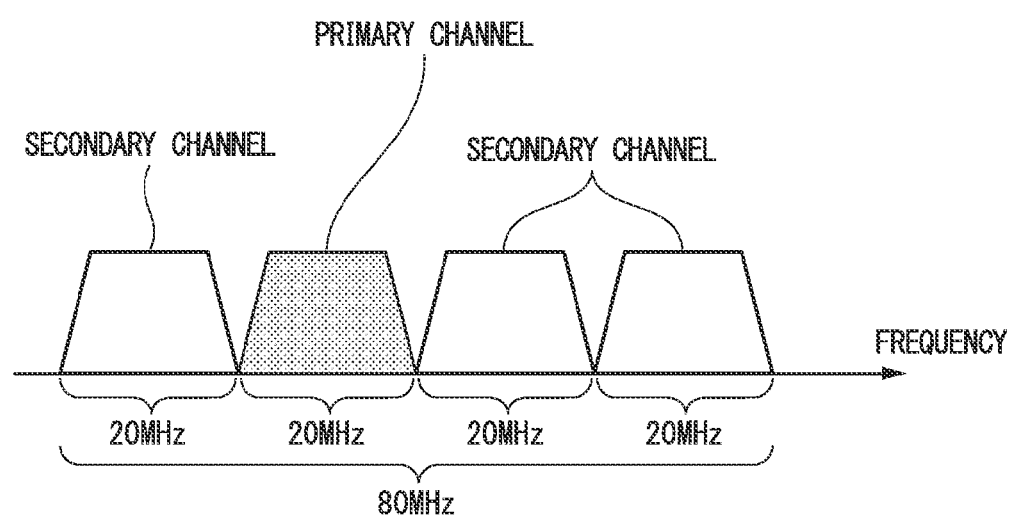
FIG. 55 is an explanatory illustration showing an example of a primary channel and secondary channels each using a unit channel of 20 MHz in the entire band of 80 MHz for each cell.

FIG. 51 is a time chart showing a frame sequence combining various frame sequences of A1-7(1), B-1(1), and C-4. Owing to data destined to 11a wireless communication terminals and 11ax wireless communication terminals, the wireless base station AP1 transmits RTS frames F641 to F644 to 11a wireless communication terminals on primary channels and to 11ax wireless communication terminals on secondary channels (time $t_{111}$). Accordingly, the wireless communication terminal STA11 sends back a CTS frame F645 while simultaneously the 11ax wireless communication terminal STA14 sends back CTS frames F646 to F648 (time $t_{112}$).

Next, the wireless base station AP1 transmits frames F649 to F652 to 11a wireless communication terminals and 11ax wireless communication terminals (time $t_{113}$). Accordingly, the wireless communication terminal STA11 sends back an ACK frame F653 while simultaneously the 11ax wireless communication terminal STA14 sends back BA frames F654 to F656 (time $t_{114}$).

As described above, the present frame sequence is designed to carry out OFDMA transmission in both downlink and uplink with both the terminals solely supporting the existing standards and the OFDMA-adapted destination stations with respect to MAC protection, thus reducing overheads in control frames. Additionally, it is possible to achieve data transmission using secondary channels which are not used for transmitting data to conventional destination stations solely supporting the existing standards, thus improving transmission efficiencies.

As described above, wireless communication stations serving as TXOP-Holder wireless communication stations are able to simultaneously transmit data to a plurality of wireless communication stations on a plurality of channels, thus improving system throughputs and frequency usage efficiencies.

It is possible to carry out wireless communication processes in such a way that programs implementing functions of wireless base stations and wireless communication terminals shown FIG. 1 are stored in computer-readable storage media, and then computer systems read programs stored in storage media so as to load and execute programs. Herein, "computer systems" may embrace OS and hardware such as peripheral devices. Additionally, "computer-readable storage media" may refer to flexible disks, magneto-optic disks, ROM, portable media such as CD-ROM, and storage devices such as hard disks installed in computer systems. Moreover, "computer-readable storage media" may embrace any measures having an ability of temporarily storing programs, such as volatile memory (RAM) inside computer systems serving as servers and clients receiving programs transmitted thereto via communication lines, telephone lines, and networks such as the Internet.

The foregoing programs may be transferred from computer systems with storage devices used to store programs to other computer systems via transmission media or transmission waves propagating through transmission media. Herein, "transmission media" used to transmit programs refer to any media having a function of transmitting information, such as communication lines, telephone lines, and networks (communication networks) such as the Internet. The foregoing programs may be drafted as ones implementing part of the foregoing functions. Additionally, it is possible to employ differential files (or differential programs) which can be combined with preinstalled programs of computer systems so as to implement the foregoing functions.

The present embodiment of the present invention has been described with reference to the drawings, however, it is apparent that the present embodiment may exemplify the present invention, and therefore the present invention should not be limited to the present embodiment. Therefore, it is possible to add, omit, replace, or change constituent elements without departing from the technological thought and the scope of the present invention.

INDUSTRIAL APPLICABILITY

The present invention is applicable to any applications which need to carry out wireless communication by effectively using frequency resources.

REFERENCE SIGNS LIST

AP1 . . . wireless base station, 11 . . . wireless communication part, 12 . . . transmission opportunity acquisition part, 13 . . . information manager, 14 . . . controller, STA11, STA12, STA13, STA14, STA15 . . . wireless communication terminal, 21 . . . wireless communication part, 22 . . . transmission opportunity acquisition part, 23 . . . information manager, 24 . . . controller

The invention claimed is:

1. A wireless communication system including a plurality of wireless communication stations including a plurality of wireless communication terminals and a wireless base station implementing an orthogonal frequency division multiple access (OFDMA), wherein the wireless base station communicates with the plurality of wireless communication terminals including a primary wireless communication station on a primary channel and a secondary wireless communication station on a secondary channel different from the primary channel, and wherein each of the plurality of wireless communication stations comprises:
 an acquisition means configured to acquire a transmission opportunity (TXOP) for at least one wireless communication station in a predetermined period upon generating transmitting data,
 a determination means configured to determine a first condition indicating unavailability of the primary channel and a second condition indicating availability of the second channel for the orthogonal frequency division multiple access (OFDMA), and
 a data transmission means configured to transmit data destined to the primary wireless communication station on the primary channel, wherein the data transmission means transmits data destined to the secondary wireless communication station on the secondary channel according to the orthogonal frequency division multiple access (OFDMA) upon satisfying the first and second conditions.

2. The wireless communication system according to claim 1, wherein the plurality of wireless communication stations implementing the orthogonal frequency division multiple access are grouped using a group identification.

3. The wireless communication system according to claim 1, wherein the data transmission means transmits data with different data lengths representing times necessary to transmit frames to the plurality of wireless communication stations such that a data length used for data transmission on the secondary channel is adjusted to a data length used for data transmission on the primary channel.

4. The wireless communication system according to claim 1, wherein the data transmission means transmits data with different data lengths representing times necessary to transmit frames the plurality of wireless communication stations such that data lengths used for data transmission on the plurality of channels are adjusted to a longest data length used for data transmission.

5. A wireless communication system including a plurality of wireless communication stations including a plurality of wireless communication terminals and a wireless base station implementing an orthogonal frequency division multiple access (OFDMA), wherein the wireless base station communicates with the plurality of wireless communication terminals including a primary wireless communication station on a primary channel and a secondary wireless communication station on a secondary channel different from the primary channel, and wherein each of the wireless communication stations comprises:
 a data receiving means configured to receive a plurality of data destined to the plurality of wireless communication stations a plurality of channels including the primary channel and the secondary channel for the orthogonal frequency division multiple access (OFDMA), and
 an acknowledgement transmitting means configured to transmit acknowledgement upon successfully receiving data with the data receiving means.

6. The wireless communication system according to claim 5, wherein the acknowledgement is solely transmitted on the secondary channel with respect to the secondary wireless communication station adapted to the OFDMA.

7. The wireless communication system according to claim 5, wherein the acknowledgement is transmitted in a time-division manner on the primary channel with respect to the primary wireless communication station.

8. The wireless communication system according to claim 5, wherein the acknowledgement is transmitted by the primary wireless communication station on the primary channel, and then the acknowledgement is transmitted by the wireless communication station on the secondary channel according to the OFDMA.

9. The wireless communication system according to claim 5, wherein the acknowledgement is transmitted on the primary channel and the secondary channel with a guard band interposed therein.

10. The wireless communication system according to claim 5, wherein the acknowledgement is transmitted on a channel using uplink OFDMA among the plurality of channels.

11. The wireless communication system according to claim 5, wherein the acknowledgement is transmitted on mutually overlapped channels using uplink OFDMA and uplink multiuser MIMO among the plurality of channels.

12. A wireless communication system including a plurality of wireless communication stations including a plurality of wireless communication terminals and a wireless base station implementing an orthogonal frequency division multiple access (OFDMA), wherein the wireless base station communicates with the plurality of wireless communication terminals including a primary wireless communication station on a primary channel and a secondary wireless communication station on a secondary channel different from the primary channel, and wherein each of the wireless communication stations comprises:
 an acquisition means configured to acquire a transmission opportunity (TXOP) for at least one wireless communication station in a predetermined period upon generating transmitting data,
 a determination means configured to determine a first condition indicating unavailability of the primary channel and a second condition indicating availability of the second channel for the orthogonal frequency division multiple access (OFDMA), and
 a MAC protection implementing means configured to exchange a transmission request using an RTS frame and a transmission permission using a CTS frame between the plurality of wireless communication stations before transmitting data destined to the primary wireless communication station on the primary channel and/or data destined to the secondary wireless communication station on the secondary channel according to the OFDMA upon satisfying the first and second conditions.

13. The wireless communication system according to claim 12, wherein the MAC protection implementing means transmits the transmission request preferentially to the wireless communication station, to which the transmission request can be transmitted using a relatively large number of channels, and then sends back transmission permission.

14. The wireless communication system according to claim 12, wherein with respect to the secondary wireless communication station, the MAC protection implementing means duplicates and transmits the transmission request on all channels and then sends back the transmission permission on an unbusy channel among the plurality of channels.

15. A wireless communication system including a plurality of wireless communication stations including a plurality of wireless communication terminals and a wireless base station implementing an orthogonal frequency division multiple access (OFDMA), wherein each of the wireless communication stations comprises:
- an acquisition means configured to acquire a transmission opportunity (TXOP) for at least one wireless communication station in a predetermined period according to the orthogonal frequency division multiple access upon generating transmitting data,
- a determination means configured to determine whether or not the wireless base station is able to concurrently communicate with the plurality of wireless communication terminals on a plurality of channels upon obtaining the transmission opportunity, and
- a MAC protection implementing means configured to exchange a transmission request using an RTS frame and a transmission permission using a CTS frame between the plurality of wireless communication stations according to the orthogonal frequency division multiple access based on a determination result of the determination means,
- wherein when the plurality of wireless communication stations are each adapted to the orthogonal frequency division multiple access (OFDMA), upon not receiving the transmission permission from part of the plurality of wireless communication terminals on part of channels, the MAC protection implementing means transmits the transmission request to another part of the plurality of wireless communication stations on all channels used for preceding transmission of the transmission request so as to reconfirm whether or not frames can be transmitted on the part of channels not used to send back the transmission permission.

16. A wireless communication system including a plurality of wireless communication stations including a plurality of wireless communication terminals and a wireless base station implementing an orthogonal frequency division multiple access (OFDMA), wherein each of the wireless communication stations comprises:
- an acquisition means configured to acquire a transmission opportunity (TXOP) for at least one wireless communication station in a predetermined period according to the orthogonal frequency division multiple access upon generating transmitting data,
- a determination means configured to determine whether or not the wireless base station is able to concurrently communicate with the plurality of wireless communication terminals on a plurality of channels upon obtaining the transmission opportunity, and
- a MAC protection implementing means configured to exchange a transmission request using an RTS frame and a transmission permission using a CTS frame between the plurality of wireless communication stations according to the orthogonal frequency division multiple access based on a determination result of the determination means,
- wherein when the plurality of wireless communication stations include at least one wireless communication station not adapted to the orthogonal frequency division multiple access (OFDMA), the MAC protection implementing means transmits the transmission request to the part of the plurality of wireless communication stations adapted to the OFDMA on all channels, and then after reply of the transmission permission, the MAC protection implementing means transmits the transmission request to another part of the plurality of wireless communication stations not adapted to the OFDMA on all channels, thus replying the transmission permission in response to the transmission request.

17. A wireless communication system including a plurality of wireless communication stations including a plurality of wireless communication terminals and a wireless base station implementing an orthogonal frequency division multiple access (OFDMA), wherein each of the wireless communication stations comprises:
- an acquisition means configured to acquire a transmission opportunity (TXOP) for at least one wireless communication station in a predetermined period according to the orthogonal frequency division multiple access upon generating transmitting data,
- a determination means configured to determine whether or not the wireless base station is able to concurrently communicate with the plurality of wireless communication terminals on a plurality of channels upon obtaining the transmission opportunity, and
- a MAC protection implementing means configured to exchange a transmission request using an RTS frame and a transmission permission using a CTS frame between the plurality of wireless communication stations according to the orthogonal frequency division multiple access based on a determination result of the determination means,
- wherein when the plurality of wireless communication stations include at least one wireless communication station not adapted to the OFDMA, such that the MAC protection implementing means transmits the transmission request to part of the plurality of wireless communication stations not adapted to the OFDMA on all channels, and then after reply of the transmission permission, the MAC protection implementing means transmits the transmission request to another part of the plurality of wireless communication stations adapted to the OFDMA on all channels, thus replying the transmission permission upon-in response to the transmission request.

18. A wireless communication system including a plurality of wireless communication stations including a plurality of wireless communication terminals and a wireless base station implementing an orthogonal frequency division multiple access (OFDMA), wherein each of the wireless communication stations comprises:
- an acquisition means configured to acquire a transmission opportunity (TXOP) for at least one wireless communication station in a predetermined period according to the orthogonal frequency division multiple access upon generating transmitting data,
- a determination means configured to determine whether or not the wireless base station is able to concurrently communicate with the plurality of wireless communication terminals on a plurality of channels upon obtaining the transmission opportunity, and
- a MAC protection implementing means configured to exchange a transmission request using an RTS frame and a transmission permission using a CTS frame between the plurality of wireless communication stations according to the orthogonal frequency division multiple access based on a determination result of the determination means, wherein when the plurality of wireless communication stations include at least one wireless communication station not adapted to the OFDMA, the MAC protection implementing means transmits the transmission request to part of the plurality of wireless communication stations not adapted to the OFDMA on a primary channel while transmitting the transmission request to another part of the plurality of wireless communication stations adapted to the OFDMA on a secondary channel, thus replying the transmission permission in a time-division manner on the primary channel and the secondary channel.

19. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein when the plurality of wireless communication stations are each adapted to the OFDMA, such that the MAC protection implementing means transmits the transmission request on all channels and then retransmits the transmission request without using part of the plurality of channels not used for reply of the transmission permission, thus replying the transmission permission in response to the transmission request.

20. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means, wherein when the plurality of wireless communication stations include at least one wireless communication station not adapted to the OFDMA, such that the MAC protection implementing means transmits the transmission request to part of the plurality of wireless communication stations adapted to the OFDMA on all channels and then transmits the transmission request to another part of the plurality of wireless communication stations not adapted to the OFDMA without using part of the plurality of channels not used for reply of the transmission permission, thus replying the transmission permission upon in response to the transmission request.

21. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein when the plurality of wireless communication stations are each adapted to the OFDMA, the MAC protection implementing means transmits the transmission request simultaneously to the plurality of wireless communication stations on different channels, and wherein the plurality of wireless communication stations receiving the transmission request simultaneously reply the transmission permission using uplink OFDMA.

22. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means, wherein when the plurality of wireless communication stations are each adapted to the OFDMA, the MAC protection implementing means transmits the transmission request simultaneously to the plurality of wireless communication stations on different channels, and wherein the plurality of wireless communication stations receiving the transmission request simultaneously reply the transmission permission on unused channels using uplink OFDMA.

23. A wireless communication system including a plurality of wireless communication stations including a plurality of wireless communication terminals and a wireless base station implementing an orthogonal frequency division multiple access (OFDMA), wherein each of the wireless communication stations comprises:

an acquisition means configured to acquire a transmission opportunity (TXOP) for at least one wireless communication station in a predetermined period according to the orthogonal frequency division multiple access upon generating transmitting data, a determination means configured to determine whether or not the wireless base station is able to concurrently communicate with the plurality of wireless communication terminals on a plurality of channels upon obtaining the transmission opportunity, and a MAC protection implementing means configured to exchange a transmission request using an RTS frame and a transmission permission using a CTS frame between the plurality of wireless communication stations according to the orthogonal frequency division multiple access based on a determination result of the determination means, wherein the transmission permission includes list information, representing the wireless communication stations subjected to simultaneous transmission, and a number of spatial streams used for data transmission from the wireless communication stations.

24. A wireless communication system including a plurality of wireless communication stations including a plurality of wireless communication terminals and a wireless base station implementing an orthogonal frequency division multiple access (OFDMA), wherein each of the wireless communication stations comprises:

an acquisition means configured to acquire a transmission opportunity (TXOP) for at least one wireless communication station in a predetermined period according to the orthogonal frequency division multiple access upon generating transmitting data, a determination means configured to determine whether or not the wireless base station is able to concurrently communicate with the plurality of wireless communication terminals on a plurality of channels upon obtaining the transmission opportunity, and a MAC protection implementing means configured to exchange a transmission request using an RTS frame and a transmission permission using a CTS frame between the plurality of wireless communication stations according to the orthogonal frequency division multiple access based on a determination result of the determination means, wherein the transmission permission is transmitted using a predetermined pattern representing an inverse matrix for each of subcarriers included in the transmission permission.

25. A wireless communication system including a plurality of wireless communication stations including a plurality of wireless communication terminals and a wireless base station implementing an orthogonal frequency division multiple access (OFDMA), wherein each of the wireless communication stations comprises:

an acquisition means configured to acquire a transmission opportunity (TXOP) for at least one wireless communication station in a predetermined period according to the orthogonal frequency division multiple access upon generating transmitting data, a determination means configured to determine whether or not the wireless base station is able to concurrently communicate with the plurality of wireless communication terminals on a plurality of channels upon obtaining the transmission opportunity, and a MAC protection implementing means configured to exchange a transmission request using an RTS frame and a transmission permission using a CTS frame between the plurality of wireless communication stations according to the orthogonal frequency division multiple access based on a determination result of the determination means, wherein when the plurality of wireless communication stations include at least one wireless communication station not adapted to the OFDMA, the MAC protection implementing means transmits the transmission request to part of the plurality of wireless communication stations not adapted to the OFDMA on a primary channel while transmitting the transmission request to another part of the plurality of wireless communication stations adapted to the OFDMA on a secondary channel, and wherein the plurality of wireless communication stations receiving the transmission request reply the transmission permission on either the primary channel or the secondary channel used to receive the transmission request.

26. A wireless communication system including a plurality of wireless communication stations including a plurality of wireless communication terminals and a wireless base station implementing an orthogonal frequency division multiple access (OFDMA), wherein each of the wireless communication stations comprises:

an acquisition means configured to acquire a transmission opportunity (TXOP) for at least one wireless communication station in a predetermined period according to the orthogonal frequency division multiple access upon generating transmitting data, a determination means configured to determine whether or not the wireless base station is able to concurrently communicate with the plurality of wireless communication terminals on a plurality of channels upon obtaining the transmission opportunity, and a MAC protection implementing means configured to exchange a transmission request using an RTS frame and a transmission permission using a CTS frame between the plurality of wireless communication stations according to the orthogonal frequency division multiple access based on a determination result of the determination means, wherein when the plurality of wireless communication stations include at least one wireless communication station not adapted to the OFDMA, the MAC protection implementing means transmits the transmission request to the part of the plurality of wireless communication stations not adapted to the OFDMA on a primary channel while transmitting the transmission request to another part of the plurality of wireless communication stations adapted to the OFDMA on a secondary channel, and wherein part of the plurality of wireless communication stations not adapted to the OFDMA reply the transmission permission on the primary channel while another part of the plurality of wireless communication stations adapted to the OFDMA simultaneously reply the transmission permission using uplink OFDMA.

27. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein when the plurality of wireless communication stations are each adapted to the OFDMA, the MAC protection implementing means transmits the transmission request on all channels and then reply the transmission permission on noncontiguous unused secondary channels.

28. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein when the plurality of wireless communication stations are each adapted to the OFDMA, the MAC protection implementing means temporarily uses a secondary channel as a primary channel so as to transmit the transmission request when the primary channel is busy and then reply the transmission permission on the secondary channel.

29. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein the plurality of wireless communication stations each adapted to the OFDMA are grouped in advance, wherein the MAC protection implementing means transmits the transmission request to each group of the wireless communication stations on all channels, and wherein each group of the wireless communication stations receiving the transmission request reply the transmission permission in a time-division manner on each channel.

30. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein when the plurality of wireless communication stations are each adapted to the OFDMA, the MAC protection implementing means transmits the transmission request using a fixed bandwidth and then replies the transmission permission in response to the transmission request.

31. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein when the plurality of wireless communication stations are each adapted to the OFDMA, the MAC protection implementing means transmits the transmission request using a variable bandwidth and then then replies the transmission permission for in response to the transmission request.

32. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein when the plurality of wireless communication stations are each adapted to the OFDMA, the MAC protection implementing means transmits the transmission request including scheduled channel numbers, and then each of the plurality of wireless communication stations receiving the transmission request replies the transmission permission including at least one available channel number among the scheduled channel numbers.

33. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein the plurality of wireless communication stations each adapted to the OFDMA are grouped in advance, wherein the MAC protection implementing means transmits the transmission request including scheduled channel numbers to each group of the wireless communication stations, and wherein each of the plurality of the wireless communication stations receiving the transmission request replies the transmission permission including at least one available channel number among the scheduled channel numbers.

34. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data,
a determination means configured to determine whether or not the wireless base station is able to concurrently communicate with the plurality of wireless communication terminals on a plurality of channels upon obtaining the transmission opportunity, and
a MAC protection implementing means configured to exchange a transmission request using an RTS frame and a transmission permission using a CTS frame between the plurality of wireless communication stations according to the orthogonal frequency division multiple access based on a determination result of the determination means,
wherein the plurality of wireless communication stations each adapted to the OFDMA are grouped in advance, wherein the MAC protection implementing means transmits the transmission request including scheduled channel numbers to each group of the wireless communication stations, and wherein each of the plurality of wireless communication stations receiving the transmission request replies the transmission permission including at least one available channel number among the scheduled channel numbers by way of uplink multiuser MIMO.

35. A wireless communication system including a plurality of wireless communication stations including a plurality of wireless communication terminals and a wireless base station implementing an orthogonal frequency division multiple access (OFDMA), wherein each of the wireless communication stations comprises:
an acquisition means configured to acquire a transmission opportunity (TXOP) for at least one wireless communication station in a predetermined period according to the orthogonal frequency division multiple access upon generating transmitting data, a determination means configured to determine whether or not the wireless base station is able to concurrently communicate with the plurality of wireless communication terminals on a plurality of channels upon obtaining the transmission opportunity, and a MAC protection implementing means configured to exchange a transmission request using an RTS frame and a transmission permission using a CTS frame between the plurality of wireless communication stations according to the orthogonal frequency division multiple access based on a determination result of the determination means, wherein the plurality of wireless communication stations each adapted to the OFDMA are grouped in advance, wherein the MAC protection implementing means transmits the transmission request including scheduled channel numbers to each group of the wireless communication stations, and wherein each of the plurality of wireless communication stations receiving the transmission request replies the transmission permission including at least one available channel number among the scheduled channel numbers using by way of uplink OFMDA.

36. A wireless communication method adapted to a wireless communication system including a plurality of wireless communication stations including a plurality of wireless communication terminals and a wireless base station implementing an orthogonal frequency division multiple access (OFDMA), wherein the wireless base station communicates with the plurality of wireless communication terminals including a primary wireless communication station on a primary channel and a secondary wireless communication station on a secondary channel different from the primary channel, and wherein each of the wireless communication stations implements acquiring a transmission opportunity (TXOP) allowing the wireless base station to communicate with at least one wireless communication terminal in a predetermined period upon generating transmitting data, determining a first condition indicating unavailability of the primary channel and a second condition indicating availability of the second channel for the orthogonal frequency division multiple access (OFDMA), and transmitting data destined to the primary wireless communication station on the primary channel and/or data destined to the secondary wireless communication station on the secondary channel according to the OFDMA upon satisfying the first and second conditions.

37. A wireless communication method adapted to a wireless communication system including a plurality of wireless communication stations including a plurality of wireless communication terminals and a wireless base station implementing an orthogonal frequency division multiple access (OFDMA), wherein the wireless base station communicates with the plurality of wireless communication terminals including a primary wireless communication station on a primary channel and a secondary wireless communication station on a secondary channel different from the primary channel, and wherein each of the wireless communication station implements receiving a plurality of data destined to the plurality of wireless communication stations on a plurality of channels including the primary channel and the secondary channel for the OFDMA, and transmitting acknowledgement upon successfully receiving data from the plurality of wireless communication stations.

38. A wireless communication method adapted to a wireless communication system including a plurality of wireless communication stations including a plurality of wireless terminal devices and a wireless base station implementing an orthogonal frequency division multiple access (OFDMA), wherein the wireless base station communicates with the plurality of wireless communication terminals including a primary wireless communication station on a primary channel and a secondary wireless communication station on a secondary channel different from the primary channel, and wherein each of the wireless communication stations implements acquiring a transmission opportunity (TXOP) for at least one wireless communication station in a predetermined period upon generating transmitting data, determining a first condition indicating unavailability of the primary channel and a second condition indicating availability of the second channel for the orthogonal frequency division multiple access (OFDMA), and exchanging a transmission request using an RTS frame and a transmission permission using a CTR frame between the plurality of wireless communication stations before transmitting data destined to the primary wireless communication station on the primary channel and/or data destined to the secondary wireless communication station on the secondary channel according to the OFDMA upon satisfying the first and second conditions.

* * * * *